United States Patent
Pearman

(10) Patent No.: US 10,749,296 B2
(45) Date of Patent: *Aug. 18, 2020

(54) ELECTRICAL CONNECTOR HOLDING APPARATUS AND METHOD FOR LOCKING AND PROTECTING ELECTRICAL CONNECTORS

(71) Applicant: Alpha/Omega Energy Solutions, LLC, Cumberland Gap, TN (US)

(72) Inventor: Bradley Lance Pearman, Cumberland Gap, TN (US)

(73) Assignee: Alpha/Omega Energy Solutions, LLC, Cumberland Gap, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,136

(22) Filed: Sep. 30, 2019

(65) Prior Publication Data

US 2020/0144768 A1    May 7, 2020

Related U.S. Application Data

(63) Continuation-in-part of application No. 16/561,854, filed on Sep. 5, 2019, which is a continuation-in-part of application No. 16/402,387, filed on May 3, 2019, now Pat. No. 10,431,930, which is a continuation of application No. 16/180,540, filed on Nov. 5, 2018.

(51) Int. Cl.
*H01R 13/639* (2006.01)
*H01R 105/00* (2006.01)

(52) U.S. Cl.
CPC ....... *H01R 13/639* (2013.01); *H01R 2105/00* (2013.01)

(58) Field of Classification Search
CPC . F16L 21/08; F16L 21/06; F16L 25/01; F16L 58/18; F16L 58/185
USPC ................ 285/1, 80, 81, 419, 373
See application file for complete search history.

(56) References Cited

U.S. PATENT DOCUMENTS

| | | | |
|---|---|---|---|
| 122,396 A * | 1/1872 | McIlhenny | F16B 41/007 292/307 B |
| 142,388 A * | 9/1873 | Goble | F16L 21/002 285/398 |
| 2,518,289 A | 4/1950 | Cox | |
| 2,873,357 A | 2/1959 | Landis | |
| 2,980,790 A | 4/1961 | Bracken | |
| 4,300,373 A * | 11/1981 | Camos | E21B 33/03 166/113 |

(Continued)

FOREIGN PATENT DOCUMENTS

| CA | 552341 | 1/1958 |
|---|---|---|
| EP | 0918590 | 12/2002 |

(Continued)

OTHER PUBLICATIONS

Non-Final Office Action, U.S. Appl. No. 16/180,540 dated (Oct. 2, 2019).

(Continued)

*Primary Examiner* — Aaron M Dunwoody
(74) *Attorney, Agent, or Firm* — Robinson IP Law, PLLC

(57) ABSTRACT

An apparatus for locking electrical connectors together and for protecting such electrical connectors. A method of locking electrical connectors together.

9 Claims, 56 Drawing Sheets

(56) References Cited

U.S. PATENT DOCUMENTS

| | | | |
|---|---|---|---|
| 4,458,923 A * | 7/1984 | Burroughs | F16L 35/00 285/8 |
| 4,541,256 A * | 9/1985 | Green | F16B 41/005 16/386 |
| 4,826,215 A * | 5/1989 | Sullivan | F16B 41/005 285/373 |
| 5,015,013 A * | 5/1991 | Nadin | F16L 25/0045 285/419 |
| 5,052,939 A | 10/1991 | Koch | |
| 5,061,194 A | 10/1991 | Herman et al. | |
| 5,129,839 A | 7/1992 | Vanskiver | |
| 5,139,429 A | 8/1992 | Herman et al. | |
| 5,193,366 A * | 3/1993 | Brinkman | E05B 73/00 70/178 |
| 5,217,387 A | 6/1993 | Hull et al. | |
| 5,379,836 A * | 1/1995 | Jordan | E21B 17/1035 166/241.6 |
| 5,525,073 A | 6/1996 | Sampson | |
| 5,821,462 A | 10/1998 | Raleigh | |
| 5,844,171 A | 12/1998 | Fitzgerald | |
| 6,171,132 B1 * | 1/2001 | Schmidt | F16L 57/00 439/367 |
| 6,184,492 B1 | 2/2001 | Busopulos | |
| 6,913,294 B2 * | 7/2005 | Treverton | F16L 21/06 285/334.5 |
| 7,285,725 B1 | 10/2007 | Saman | |
| 7,384,297 B2 | 6/2008 | King, Jr. et al. | |
| 7,431,611 B2 | 10/2008 | King, Jr. et al. | |
| 7,628,428 B2 * | 12/2009 | Rampton | F16L 58/02 285/45 |
| 7,722,086 B2 * | 5/2010 | Ishiki | F16L 37/0987 285/319 |
| 8,408,929 B2 | 4/2013 | Solon | |
| 8,875,792 B2 * | 11/2014 | Whitelaw | E21B 17/1035 166/345 |
| 9,211,602 B1 | 12/2015 | Carney et al. | |
| 10,056,745 B2 | 8/2018 | Nooner et al. | |
| 2002/0092837 A1 | 7/2002 | Keats | |
| 2004/0097120 A1 | 5/2004 | Limber et al. | |
| 2004/0144758 A1 | 7/2004 | Onishi | |
| 2012/0064744 A1 | 3/2012 | Messner | |
| 2013/0119041 A1 | 5/2013 | Humenik | |
| 2013/0212842 A1 | 8/2013 | Rigollet et al. | |
| 2015/0069114 A1 | 3/2015 | Sunger et al. | |
| 2015/0354730 A1 * | 12/2015 | Plunkett | H02G 3/0462 138/155 |
| 2017/0087658 A1 | 3/2017 | Townsend | |
| 2018/0166871 A1 | 6/2018 | Nooner et al. | |

FOREIGN PATENT DOCUMENTS

| | | |
|---|---|---|
| GB | 907905 | 10/1962 |
| GB | 931500 | 7/1963 |
| GB | 1327584 | 8/1973 |
| WO | 9749519 | 12/1997 |
| WO | 2015047552 | 4/2015 |

OTHER PUBLICATIONS

International Search Report and Written Opinion of the International Searching Authority, Int. App. No. PCT/US19/59341, dated Jan. 21, 2020.

International Search Report and Written Opinion of the International Searching Authority, Int. App. No. PCT/US19/59339, dated Jan. 21, 2020.

* cited by examiner

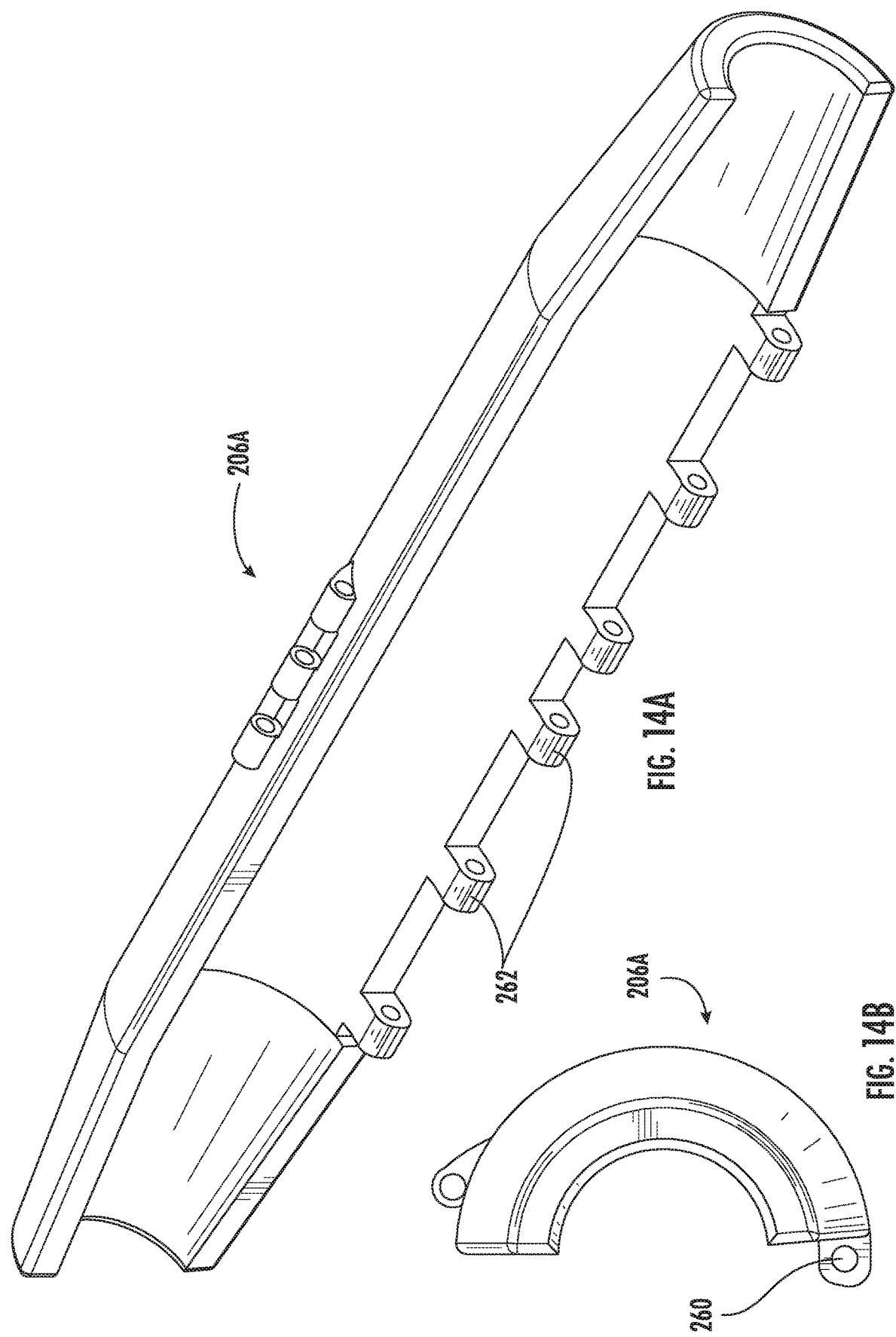

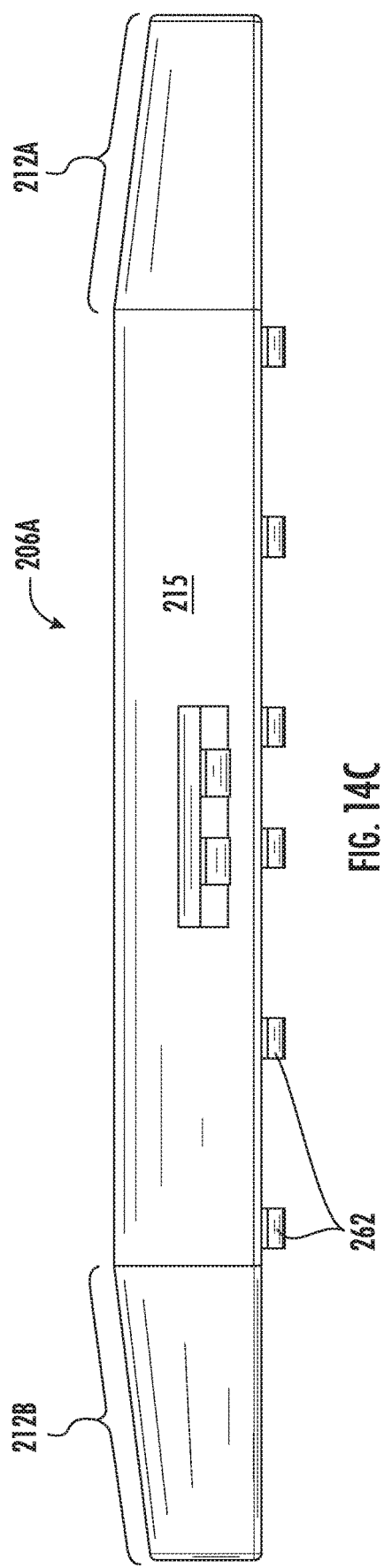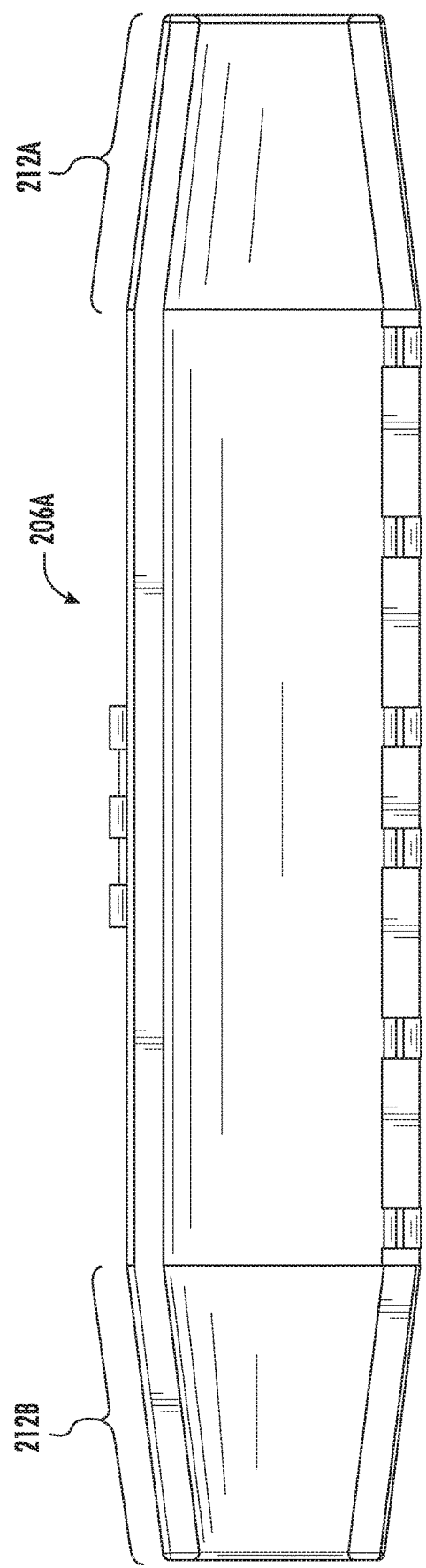

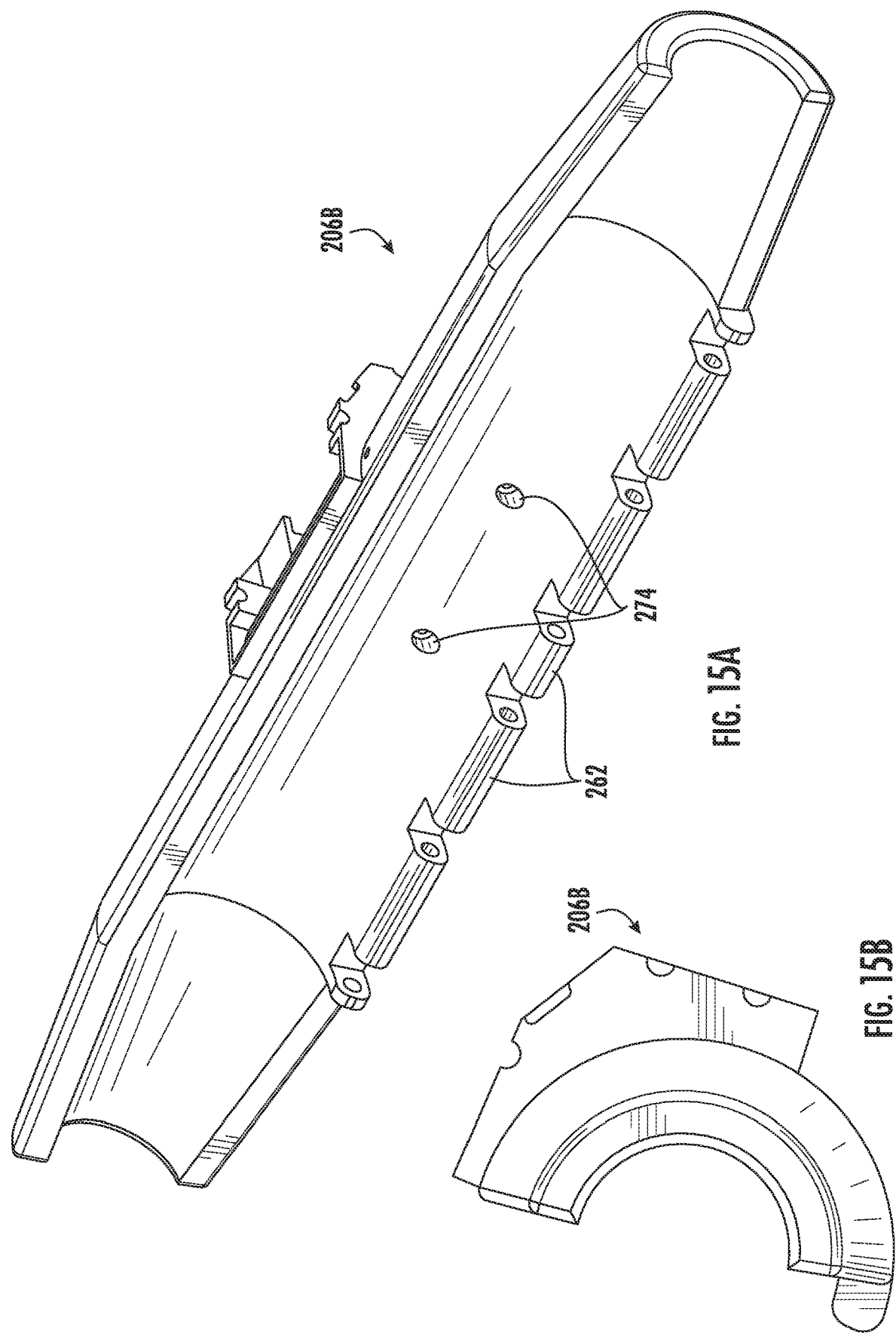

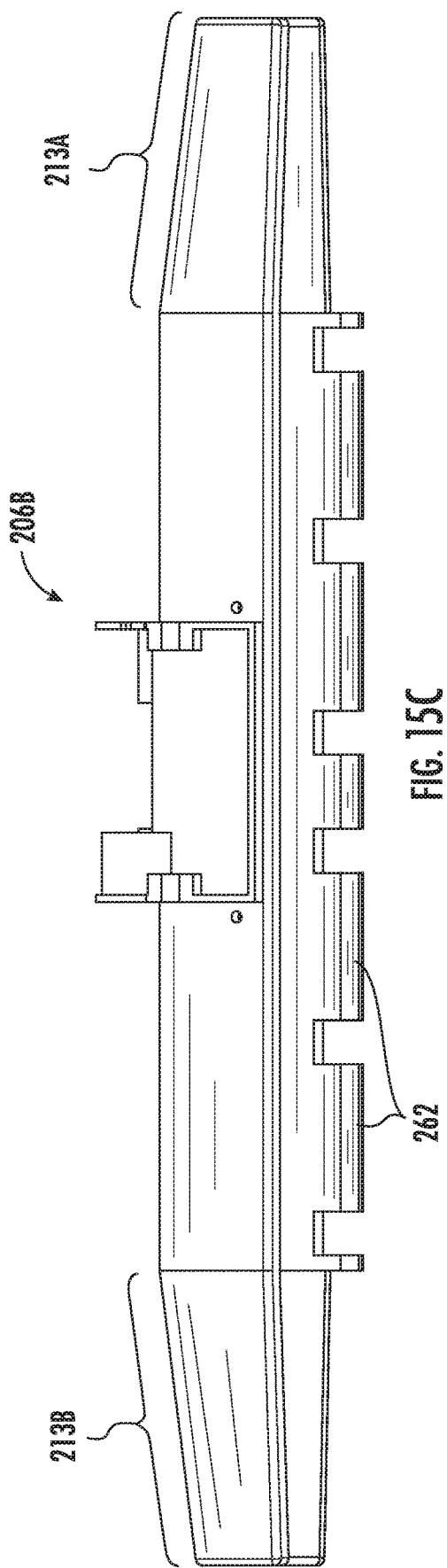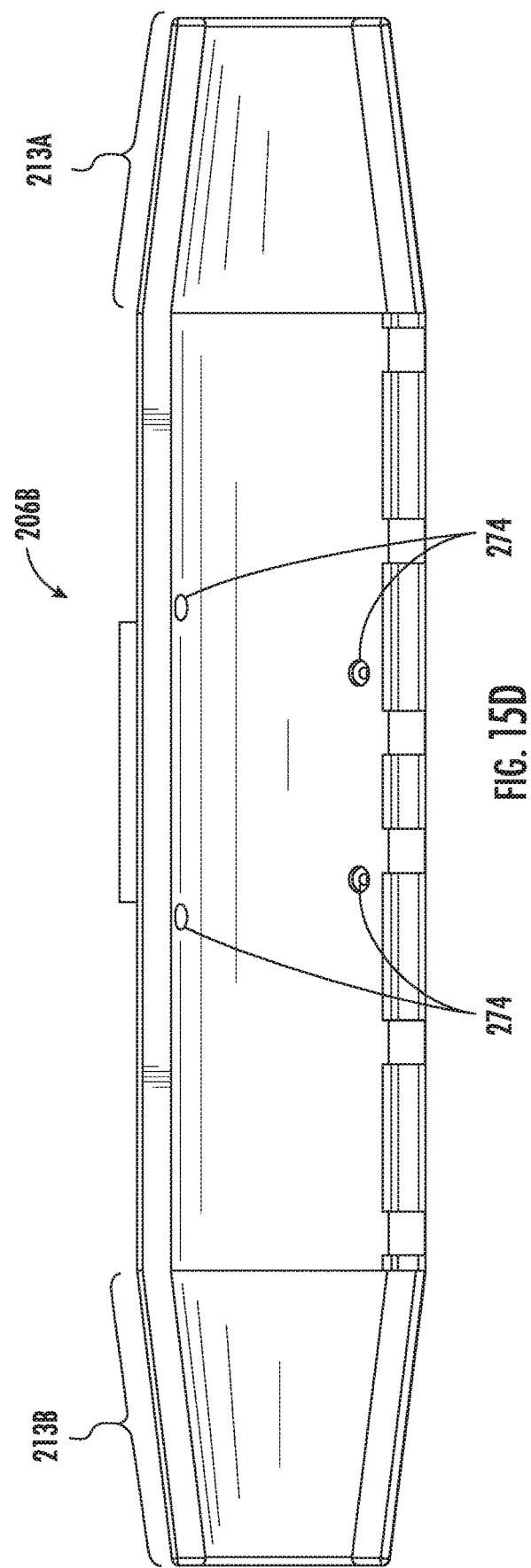

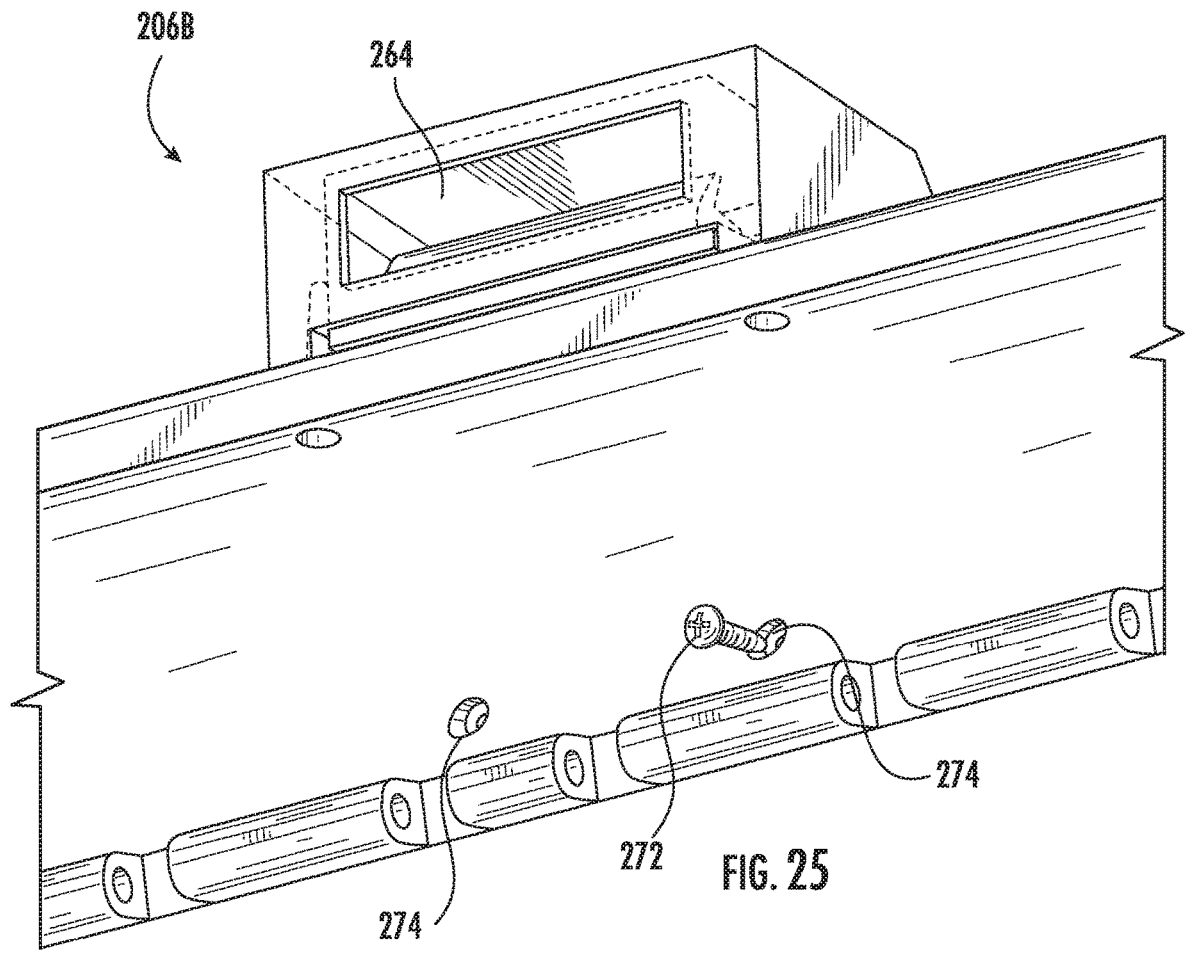

ELECTRICAL CONNECTOR HOLDING APPARATUS AND METHOD FOR LOCKING AND PROTECTING ELECTRICAL CONNECTORS

CROSS-REFERENCE TO RELATED APPLICATION

This application is a continuation-in-part of and claims priority to U.S. Nonprovisional application Ser. No. 16/561,854 entitled "AIR HOSE COUPLING SECURING APPARATUS FOR SECURING AIR HOSES AND ASSOCIATED COUPLINGS TOGETHER" which was filed on Sep. 5, 2019 which is a continuation-in-part of and claims priority to U.S. Nonprovisional application Ser. No. 16/402,387 entitled "WELDING LEAD CABLE CONNECTOR HOLDING APPARATUS FOR LOCKING AND PROTECTING WELDING LEADS" which was filed on May 3, 2019 and which is a continuation-in-part of and claims priority to U.S. Nonprovisional application Ser. No. 16/180,540 entitled "WELDING LEAD CABLE CONNECTOR HOLDING APPARATUS FOR LOCKING AND PROTECTING WELDING LEADS" which was filed on Nov. 5, 2018, wherein all three applications listed above are incorporated herein by reference in their respective entireties.

FIELD

This disclosure relates to an apparatus for securing electrical connectors together and for protecting such electrical connectors.

BACKGROUND

Welding leads (or "welding cable") is an electrical conductor for transmitting a welding current used for welding materials together (e.g., for arc welding or resistance welding). Welding leads typically include small copper strands wrapped together inside a nonconductive outer layer. Such leads typically have enlarged ends in the form of cable connectors wherein one end is typically a male end and the other a female end with both male and female features being highly conductive.

480 volt three phase power cords and associated connectors are electrical conductors for transmitting electrical current from one device to another. 480 volt three phase power cord connectors have large ends with either three male extensions or three female holes for receiving male extensions.

Welding leads and 480 volt three phase power cords can be both dangerous and expensive. Some dangers include potential electrocution if the connection between a first electrical connector connected to a second electrical connector becomes loose and conductive material is exposed outside or otherwise being the nonconductive outer layer of the electrical connectors. Although some welding leads and 480 volt three phase power cords have features that help to better secure a connection between other welding leads or 480 cords, connections between electrical connectors can still easily become loose or become disengaged altogether. The relative ease at which such devices can be disconnected also makes them susceptible to theft. All of these potential problems also occur when maintaining attachment between male electrical connectors and female electrical connectors. Female terminal connectors are often attached to a welding machine post and provide the interface between a welding lead cable connector and a welding machine.

What is needed, therefore, are devices and methods to overcome the issues mentioned above related to common welding leads and 480 volt three phase power cords and associated connectors.

SUMMARY

The above and other needs are met by an electrical connector securing apparatus for securing an electrical connector to another device and for protecting such electrical connector is disclosed. The apparatus comprises a shell defining a primary cavity therein, the shell further comprising a first shell member and a second shell member wherein the first shell member is hingedly attached to the second shell member; and an appendage extending from the first shell member wherein at least part of the appendage extends through a shell member hole in the second shell member when the shell is in a closed configuration, and wherein the appendage includes an appendage aperture. A pivoted hook of a padlock can be inserted through the appendage aperture to lock and secure the electrical connector securing apparatus in the closed configuration. In some embodiments, the other device may be another electrical connector or a different type of device. The term "electrical connector" may refer to, for example, a 480 volt three phase power cord connector or a welding lead cable connector. In some embodiments, the first shell member further comprises a substantially flat face along one side of the outer surface of the first shell member.

In some embodiments, the electrical connector securing apparatus further comprises a secondary cavity along an outer surface of the second shell member wherein the secondary cavity is configured to house a padlock for locking and securing the connector securing apparatus in the closed configuration. The electrical connector securing apparatus may also further include a lid hingedly attached to the second shell member, wherein the lid can be in an open position or a closed position and wherein the lid conceals the secondary cavity when the lid is in the closed position.

In some embodiments, the electrical connector securing apparatus comprises a first shell aperture along a first end of the electrical connector securing apparatus and a second shell aperture along a second end of the electrical connector securing apparatus and wherein the primary cavity is configured for holding a first welding lead cable connector of a first welding lead cable and a second welding lead cable connector of a second welding lead cable together in a manner wherein, if present, (a) the first welding lead cable would extend out the first shell aperture, (b) the second welding lead cable would extend out the second shell aperture, and (c) electricity would be able to flow from the first welding lead cable to the second welding lead cable. Preferably, the electrical connector securing apparatus further comprises outer tapered regions that are tapered to fit the contour of welding lead cable connectors so that two welding lead cable connectors can be confined within the shell when the shell is in the closed configuration.

In another aspect, in some embodiments, the electrical connector securing apparatus comprises a first shell aperture along a first end of the electrical connector securing apparatus and a second shell aperture along a second end of the electrical connector securing apparatus and wherein the primary cavity is configured for holding a first welding lead cable connector of a first welding lead cable and a main body of a welding machine terminal connector together in a manner wherein, if present, (a) the first welding lead cable would extend out the second shell aperture, (b) the welding machine terminal connector would extend out the first shell aperture, and (c) electricity would be able to flow from the welding machine terminal connector to the first welding lead cable. In some embodiments, the shell further comprises an outer tapered region that is tapered to fit the contour of a welding lead cable connector so that a welding lead cable connector can be confined within the shell when the shell is in the closed configuration. In some embodiments, the electrical connector securing apparatus further comprises an inward facing ridge defining the first shell aperture along the first end of the electrical connector wherein the inward facing ridge helps confine a main body of a welding machine terminal connector inside the primary cavity if a main body of a welding machine terminal connector is located inside the primary cavity.

In another aspect, in some embodiments, the electrical connector securing apparatus comprises a first shell aperture along a first end of the electrical connector securing apparatus and a second shell aperture along a second end of the electrical connector securing apparatus and wherein the primary cavity is configured for holding a first 480 volt three phase power cord connector of a first 480 volt three phase power cord and a second 480 volt three phase power cord connector of a second 480 volt three phase power cord together in a manner wherein, if present, (a) the first 480 volt three phase power cord would extend out the first shell aperture, (b) the second 480 volt three phase power cord would extend out the second shell aperture, and (c) electricity would be able to flow from the first 480 volt three phase power cord to the second 480 volt three phase power cord.

In some embodiments, the electrical connector securing apparatus further comprises a first inward facing ridge defining the first shell aperture along the first end of the electrical connector securing apparatus and a second inward facing ridge defining the second shell aperture along the second end of the electrical connector securing apparatus, wherein the first inward facing ridge helps confine the first 480 volt three phase power cord connector inside the primary cavity and wherein the second inward facing ridge helps confine the second 480 volt three phase power cord connector inside the primary cavity.

In another aspect, a method of locking two electrical connectors together inside an electrical connector securing apparatus is disclosed, the method comprising the steps of attaching a first electrical connector to a second electrical connector to form combined electrical connectors; placing the combined electrical connectors into a shell of an electrical connector securing apparatus, the shell including a first shell member hingedly attached to a second shell member; and closing the shell to a closed configuration wherein a primary cavity is defined inside the shell, wherein an appendage extends from the first shell member at least partially through a shell member hole in the second shell member when the shell is in the closed configuration, and wherein the appendage includes an appendage aperture. In some embodiments, the method further comprises the steps of inserting a pivoted hook of a padlock through the appendage aperture and locking the padlock, thereby locking the combined electrical connectors inside the shell.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 14A a drawing of a perspective view of a first shell member from the welding lead cable connector holding apparatus shown in FIG. 13;

FIG. 14B shows a drawing of an end view of the first shell member shown in FIG. 14A;

FIG. 14C shows a drawing of a side view of the first shell member shown in FIG. 14A and FIG. 14B;

FIG. 14D shows a drawing of a bottom view looking into the first shell member shown in FIGS. 14A-14C;

FIG. 15A shows a drawing of a perspective view of a second shell member from the welding lead cable connector holding apparatus shown in FIG. 13;

FIG. 15B shows a drawing of an end view of the second shell member shown in FIG. 15A;

FIG. 15C shows a drawing of a side view of the second shell member shown in FIG. 15A and FIG. 15B;

FIG. 15D shows a drawing of a bottom view looking into the second shell member shown in FIGS. 15A-15C;

FIG. 25 shows a drawing of a partially exploded view looking into the second shell member shown in FIGS. 15A-15D and showing an example of a screw and sunken screw holes;

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
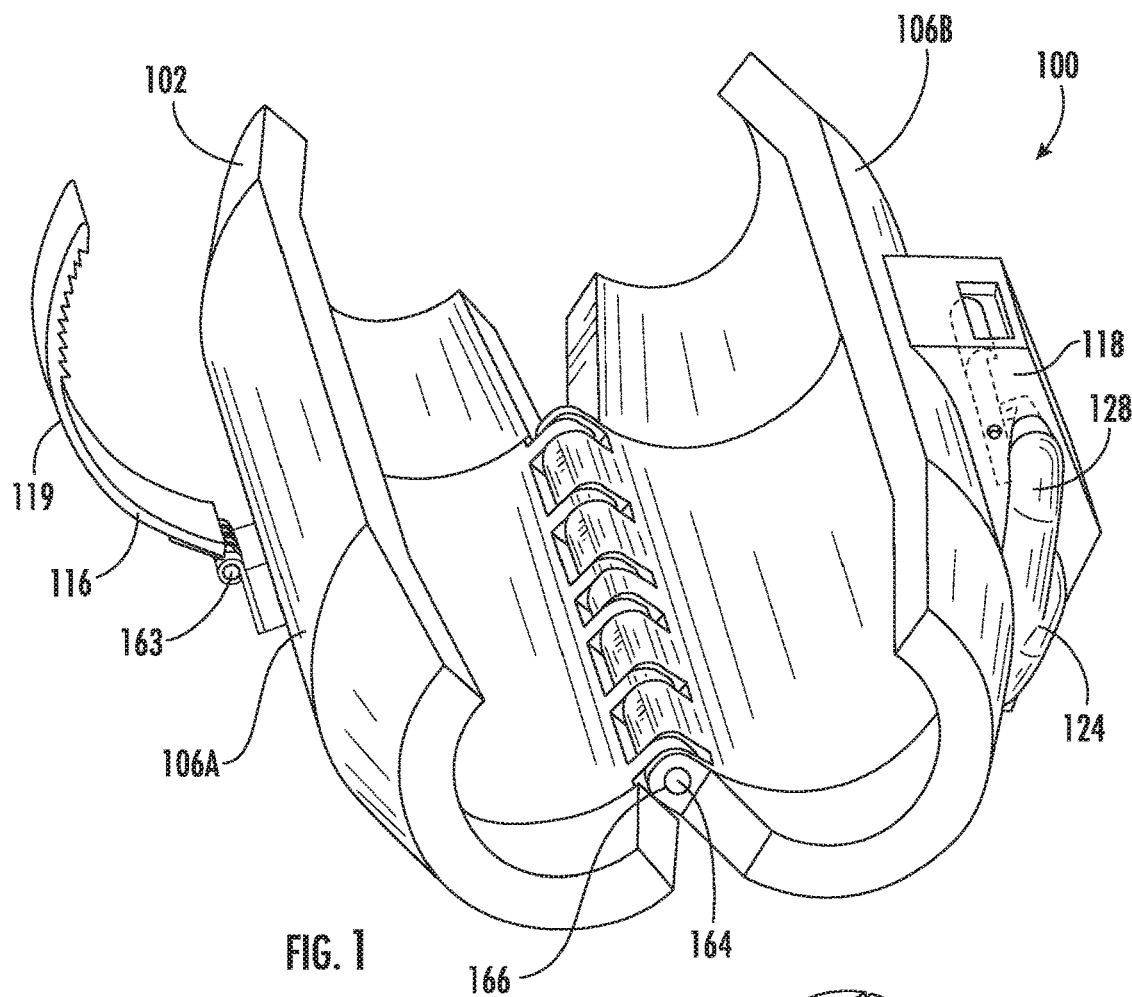
FIG. 1 shows a drawing of an embodiment of a welding lead cable connector holding apparatus shown in an open position wherein some internal components are shown in dashed lines.
Figure 2:
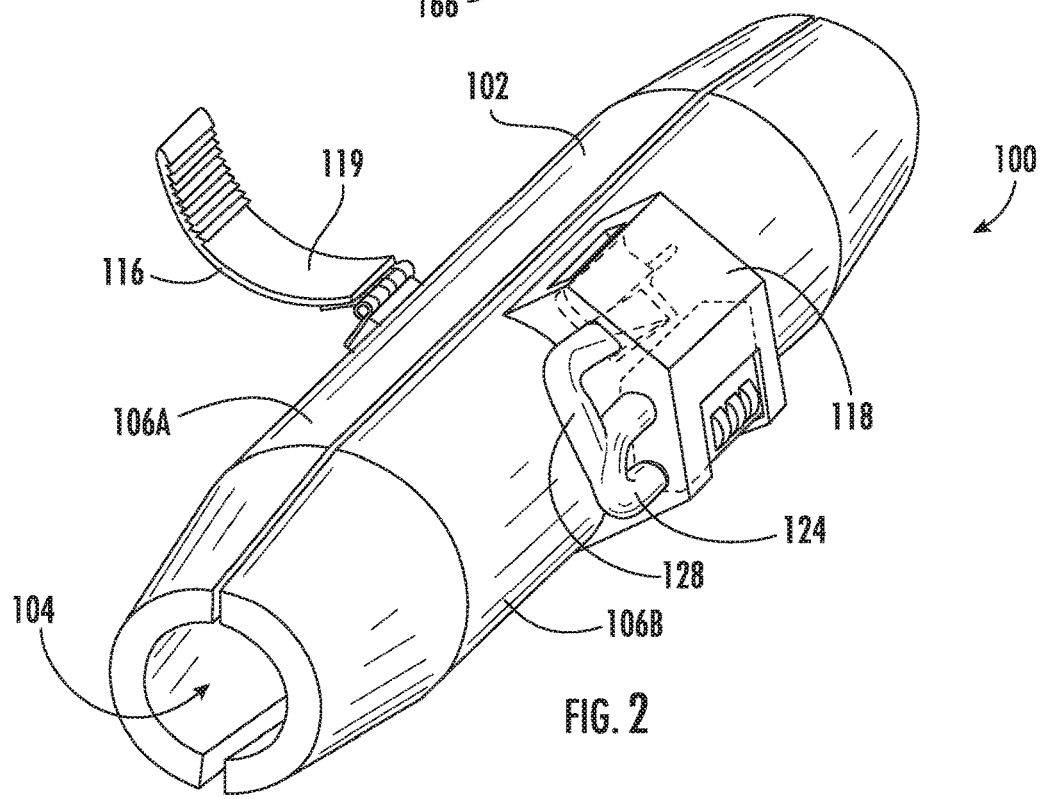
FIG. 2 shows a drawing of an embodiment of the welding lead cable connector holding apparatus from FIG. 1 shown in a closed but unlocked position wherein some internal components are shown in dashed lines.
Figure 3:
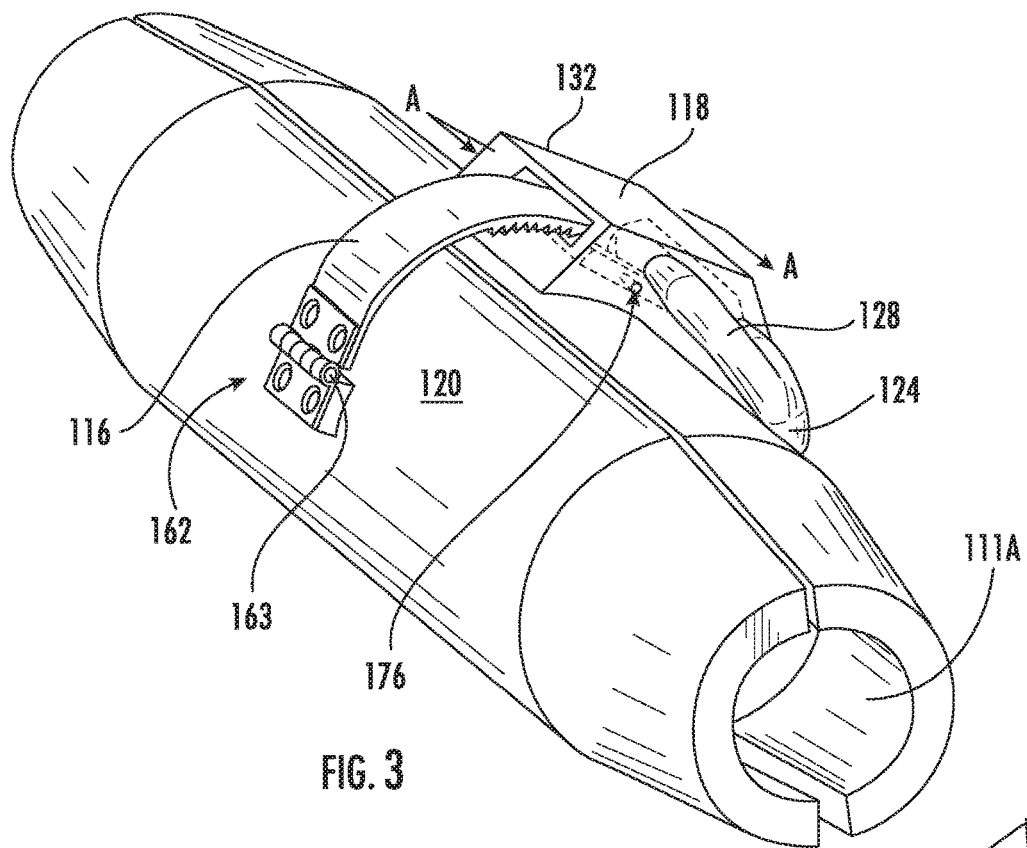
FIG. 3 shows a drawing of an embodiment of the welding lead cable connector holding apparatus from FIG. 1 and FIG. 2 shown in a closed and locked position wherein some internal components are shown in dashed lines.
Figure 4:
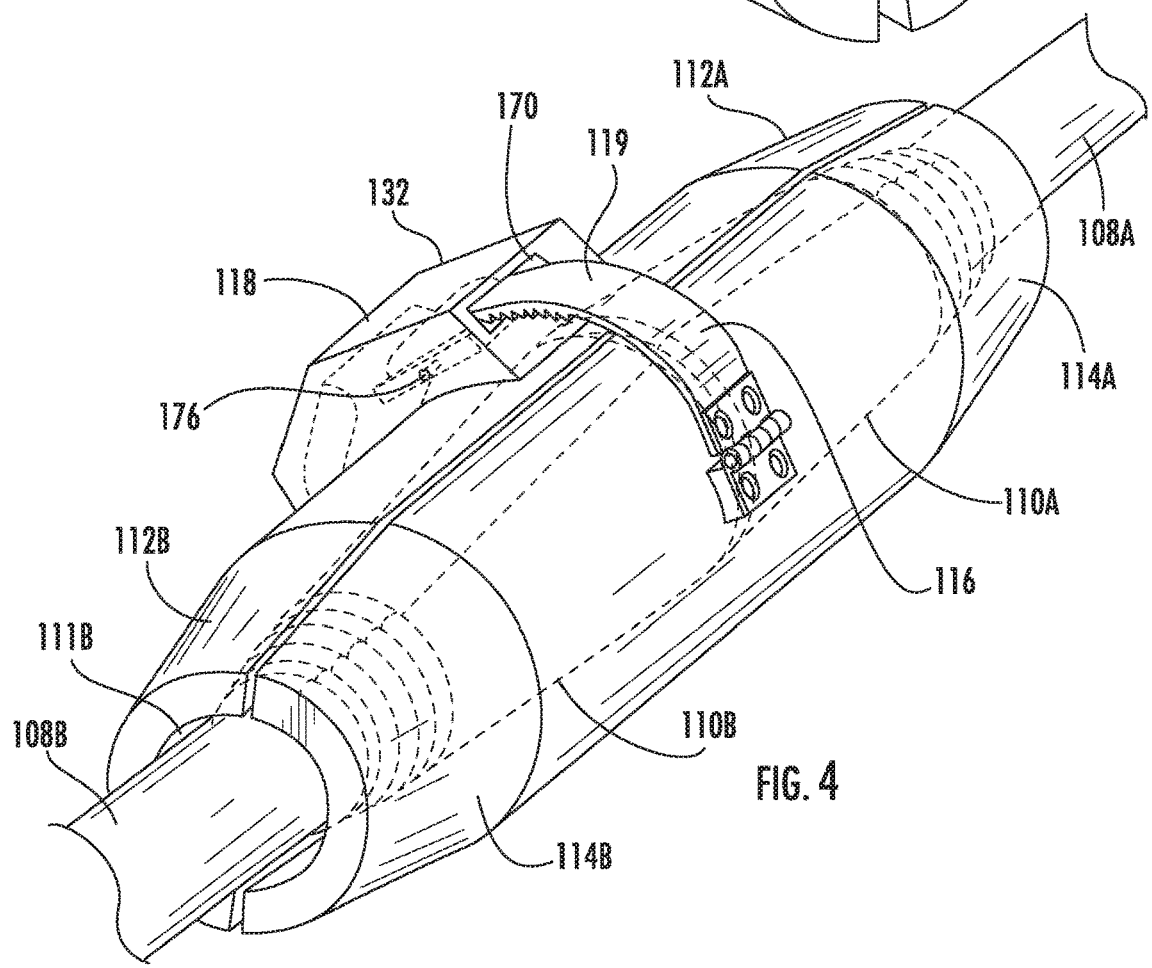
FIG. 4 shows a drawing of an embodiment of the welding lead cable connector holding apparatus from FIGS. 1-3 shown in a closed and locked position with two cable connectors from two different welding leads locked in a shell of the welding lead cable connector holding apparatus wherein some internal components including the cable connectors are shown in dashed lines.
Figure 5:
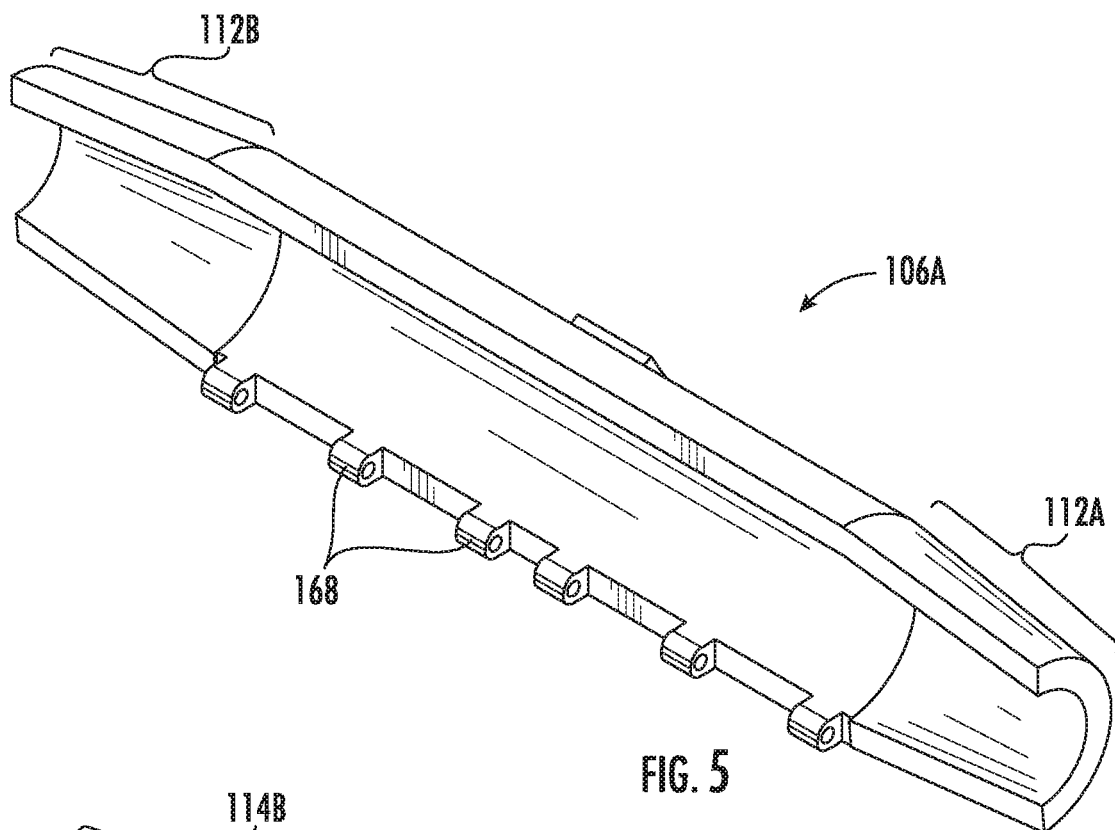
FIG. 5 shows a drawing of an embodiment of a first shell member of the welding lead cable connector holding apparatus shown in FIGS. 1-4.
Figure 6:
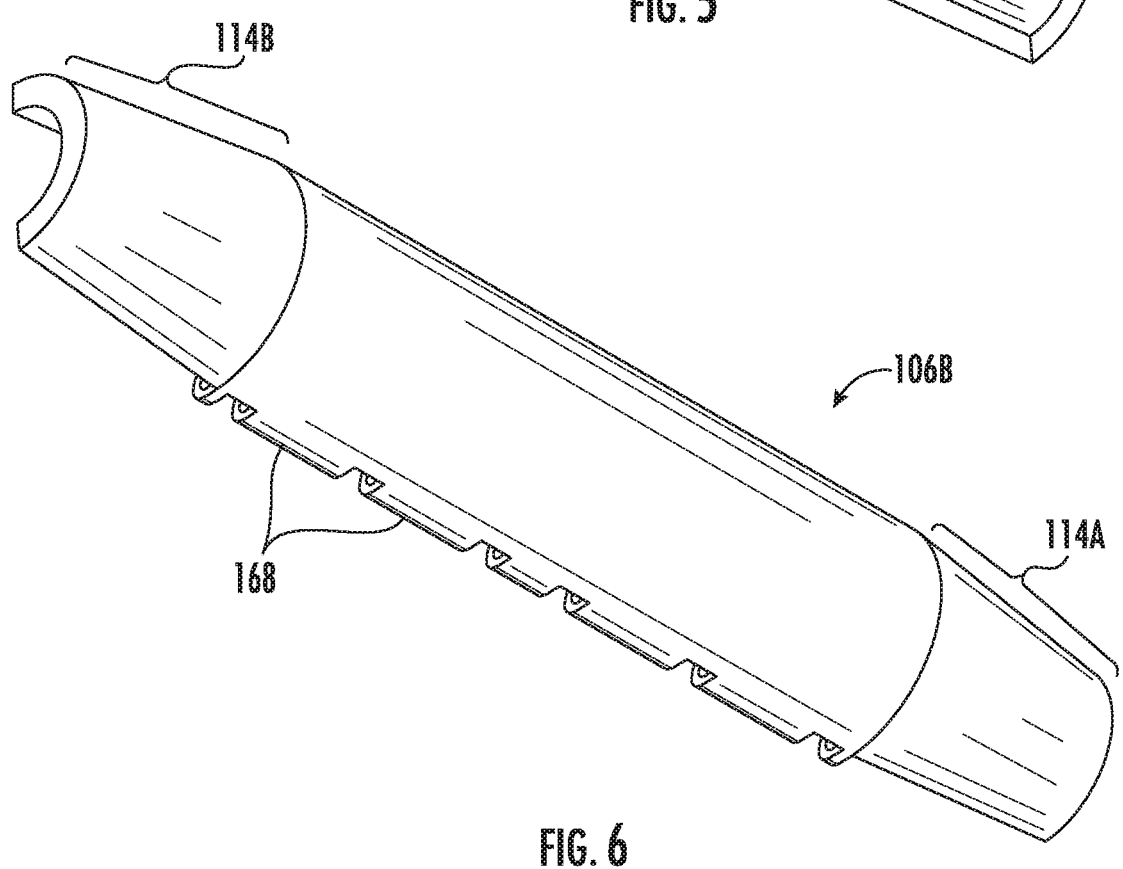
FIG. 6 shows a drawing of an embodiment of a second shell member of the welding lead cable connector holding apparatus shown in FIGS. 1-4.

FIGS. 1-4 show a welding lead cable connector holding apparatus 100 for holding welding lead cable connectors together and for protecting such leads. The apparatus 100 includes a shell 102 preferably made of a sturdy, non-conductive material defining a primary cavity 104. The shell 102 includes a first shell member 106A and a second shell member 106B (collectively, "shell members" 106) attached to one another (preferably via a hinge configuration) so that the shell members 106 can be rotated to a closed position shown in FIG. 3, defining the primary cavity 104 where a first welding lead 108A and a second welding lead 108B can be attached and held together in place by the apparatus 100 as shown, for example, in FIG. 4. The first welding lead 108A includes a first welding lead cable connector 110A held inside the shell 102 when the shell 102 is in a closed position, and the second welding lead 108B includes a second welding lead cable connector 110B held inside the shell 102 when the shell 102 is in a closed position. As further shown in FIG. 4, the first welding lead 108A extends out of a first shell aperture 111A and the second welding lead 108B extends out of a second shell aperture 111B. The first shell member 106A is shown by itself in FIG. 5 and the second shell member 106B is shown by itself in FIG. 6.

The first shell member 106A preferably includes outer regions 112 including a first outer region 112A and a second outer region 112B that are tapered to hold welding lead cable connectors in place inside the shell 102. Similarly, the second shell member 106B preferably includes outer regions 114 including a first outer region 114A and a second outer region 114B that are also tapered to hold welding lead cable connectors in place inside the shell 102. In various embodiments described and suggested herein, the shell members 106 are fastened together using some form of a locking mechanism. The complexity of the locking mechanism may vary in different embodiments but in each embodiment, such mechanism is used to hold the shell members 106 together and thereby hold welding lead cable connectors in place inside the shell 102.

The apparatus 100 includes an appendage 116 attached to the first shell member 106A and an engagement member 118 attached to the second shell member 106B. In the embodiment shown in FIGS. 1-10, the appendage 116 includes a solid strip 119 that is preferably attached to the first shell member 106A and is configured to extend beyond the first shell member 106A when the appendage 116 is oriented adjacent to an outer surface 120 of the first shell member 106A. The solid strip 119 is preferably shaped to curve with the outer surface 120 of the first shell member 106A. The engagement member 118 is configured to receive and engage with the appendage 116.

Figure 7:
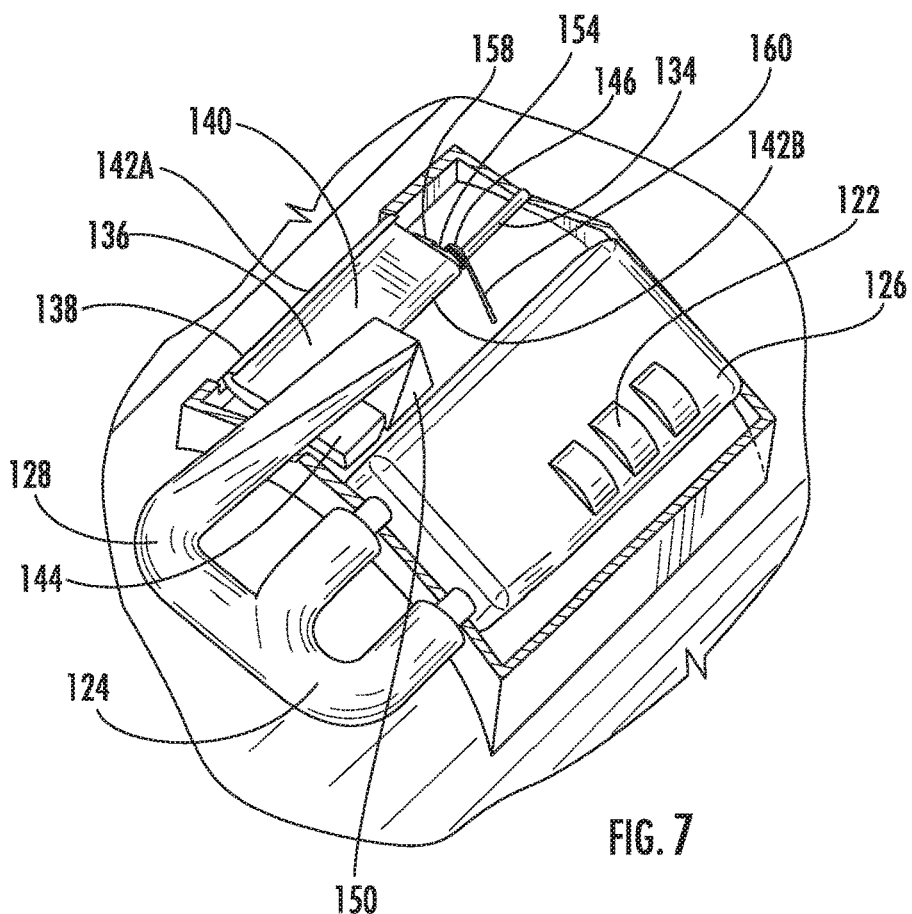
FIG. 7 shows a drawing of a close-up view of an embodiment of an engagement member from the welding lead cable connector holding apparatus shown in FIGS. 1-4 wherein a bar of the engagement member is situated in a locked (first) position and wherein an outer housing of the engagement member is removed to reveal certain internal components.
Figure 8:
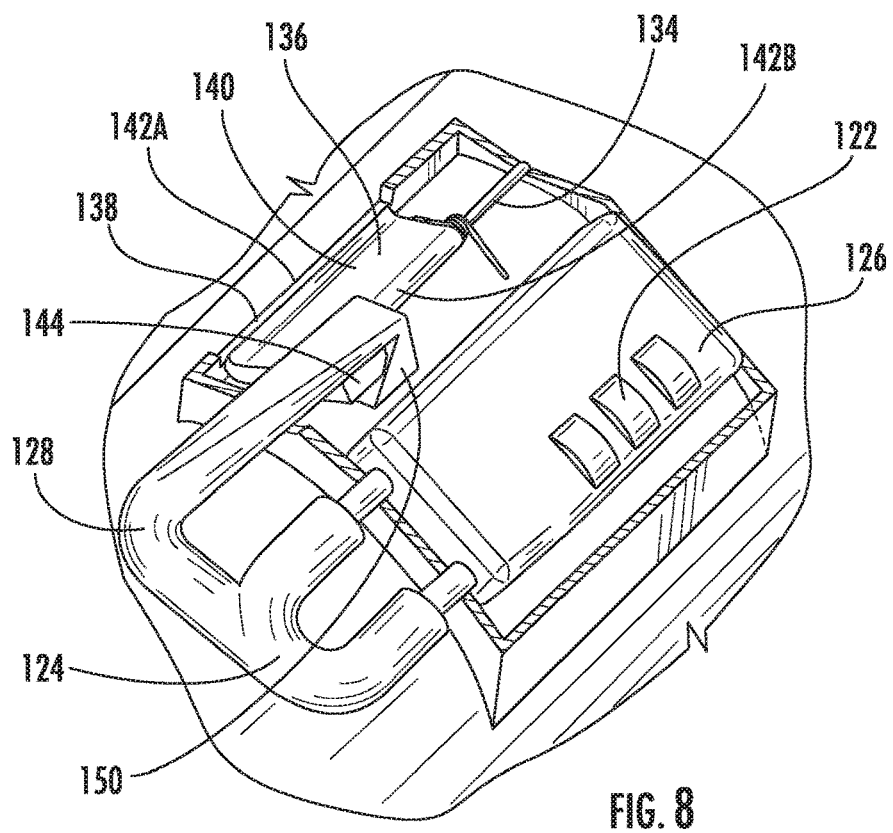
FIG. 8 shows a drawing of close-up view of an embodiment of an engagement member from the welding lead cable connector holding apparatus shown in FIGS. 1-4 wherein the bar of the engagement member is situated in an unlocked (second) position and wherein an outer housing of the engagement member is removed to reveal certain internal components.

The example engagement member 118 shown in FIGS. 1-4 and 7-10 includes a combination lock 122. A close-up view of the engagement member 118 including the combination lock 122 is shown in FIGS. 7-8. The combination features and associated mechanical components of such combination features of combination locks are well-known to a person having ordinary skill in the art and, therefore, such features are not described in detail here. In addition to such basic internal combination mechanical features, the combination lock 122 includes a bar 124 extending from a main body 126 of the combination lock 122 wherein the combination lock 122 is configured so that the bar 124 can be released from a locked position (a first position) and moved from the first position (see FIG. 7) to an unlocked position (a second position; see FIG. 8) if a proper combination is input to the combination lock 122. The engagement member 118 further includes an arm 128 extending from the bar 124 of the combination lock 122 wherein if the bar 124 is in the first position, the arm 128 engages the engagement member 118 with the appendage 116, thereby locking the appendage 116 to the engagement member 118 and, if two welding lead cable connectors are located in the primary cavity, locking the two welding lead cable connectors inside the shell 102.

FIGS. 7-10 show a specific example of how the appendage 116 engages with the engagement member 118. In the embodiment shown in FIGS. 1-10, the appendage 116 includes a plurality of teeth 130 facing down toward the shell members 106. The engagement member 118 shown in FIGS. 1-4 and 7-10 preferably further includes an outer housing 132 (also referred to herein as "lock housing") attached to the second shell member 106B. The outer housing 132 can be attached to the second shell member 106B by different methods known to persons having ordinary skill in the art such as welding, screws, pins, glue, or combinations thereof. The engagement member 118 shown in FIGS. 1-4 and 7-10 preferably further includes a rod 134 extending through the outer housing 132 and attached to the outer housing 132. The engagement member 118 shown in FIGS. 1-4 and 7-10 also preferably includes a rotation member 136 attached along the rod 134 so that the rotation member 136 is configured to rotate along the rod 134 back and forth from a first orientation (see FIG. 7) to a second orientation (see FIG. 8) and wherein the rotation member 136 includes a tongue 138 extending out from a main body 140 of the rotation member 136 proximate a first edge 142A of the rotation member and a leg 144 extending out from the main body 140 of the rotation member 136 proximate a second edge 142B of the rotation member 136. The engagement member 118 shown in FIGS. 1-4 and 7-10 also preferably includes at least one biasing member 146 engaged with the rotation member 136 for biasing the rotation member 136 toward the first orientation when the bar 124 is in the first position (see FIG. 7). The at least one biasing member 146 preferably includes a torsion spring 148 as shown in FIGS. 7-10. The arm 128 shown in FIGS. 7-8 further includes a wedge-shaped extension 150 for biasing the rotation member 136 toward the second orientation when the bar 124 is in the second position (see FIG. 8). The plurality of teeth 130 of the appendage 116 form a ratchet track 152 facing the tongue 138 of the rotation member 136 wherein the tongue 138 engages with one of the teeth 130 when the bar 124 is in the first position and the rotation member is in the first orientation (see FIG. 7 and FIG. 9), and wherein the tongue 138 is released from the teeth 130 when the bar 124 is moved to the second position and the rotation member is situated in the second orientation (see FIG. 8 and FIG. 10). The bar 124 is released by inputting a proper combination code into the combination lock 122.

Figure 9:
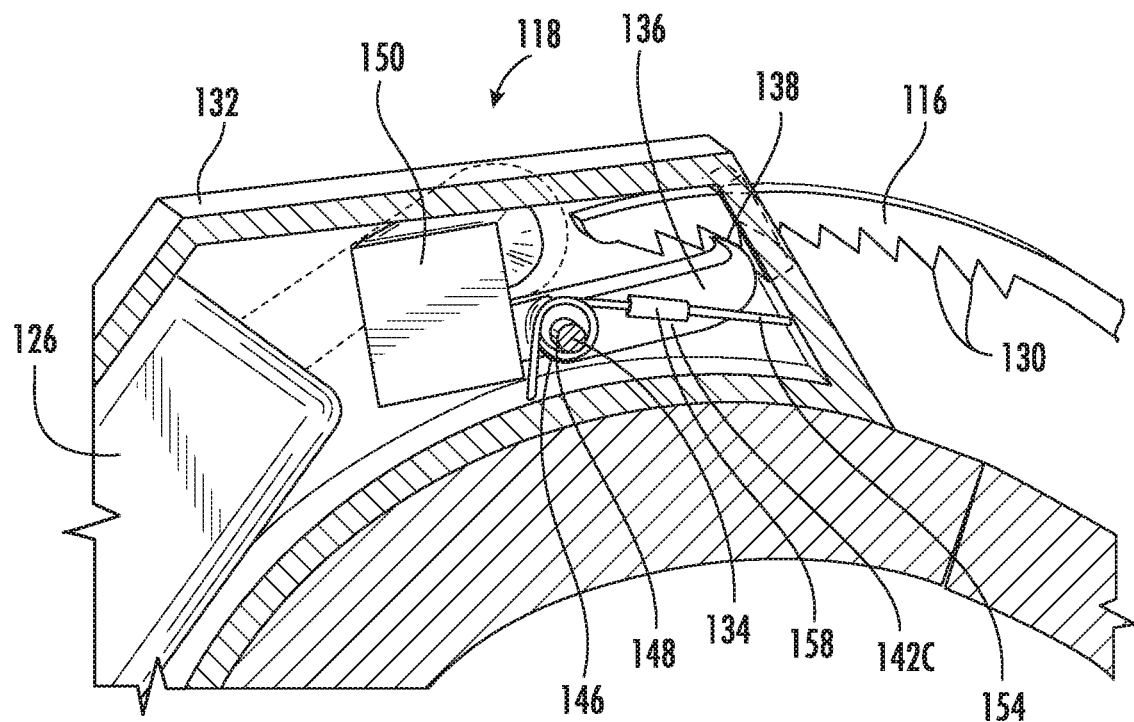
FIG. 9 shows a drawing of a close-up cutaway view (cut along line A-A of FIG. 3) of an embodiment of the engagement member shown in FIG. 7 wherein the bar of the engagement member is situated in a locked (first) position and a rotation member is situated in a first orientation.
Figure 10:
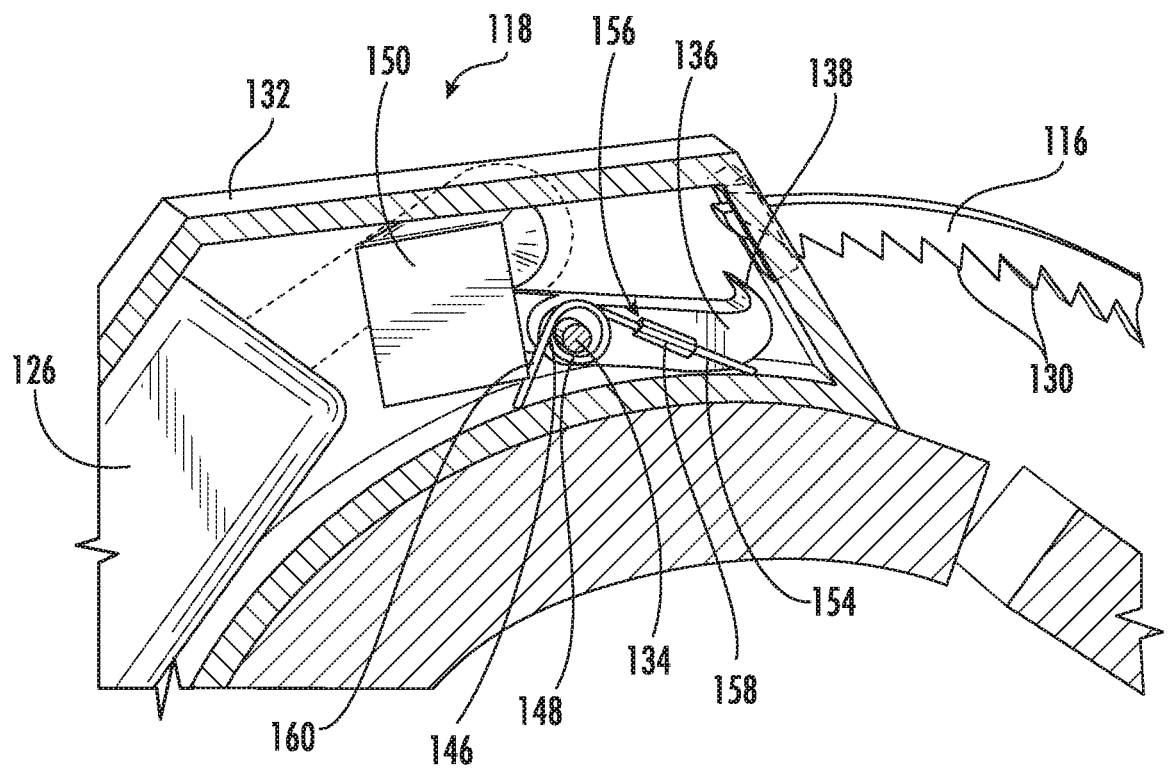
FIG. 10 shows a drawing of a close-up cutaway view (cut along line A-A of FIG. 3) of an embodiment of the engagement member shown in FIG. 8 wherein the bar of the engagement member is situated in an unlocked (second) position and the rotation member is situated in a second orientation.

As shown in FIGS. 9-10, the torsion spring 148 includes a first branch 154 that is preferably attached proximate to a third edge 142C of the rotation member 136 through a bulge borehole 156 in a bugle 158 along the third edge 142C of the rotation member 136. A second branch 160 of the torsion spring 148 is preferably pressed against or otherwise engaged with the housing 132 or other solid fixed object inside the housing 132.

Appendage 116 preferably includes a hinge joint 162 including an appendage pin 163 for attaching the solid strip 119 to the first shell member 106A as shown in FIGS. 1-4. The hinge joint 162 can be attached to the first shell member 106A by welding, screws, glue or other similar attachment means known to persons having ordinary skill in the art. The first shell member 106A is preferably attached to the second shell member 106B via a hinge mechanism including a shell pin 164 extending through a shell borehole 166 formed by combining interlocking projections 168 from the first shell member 106A and the second shell member 106B.

Figure 11A:
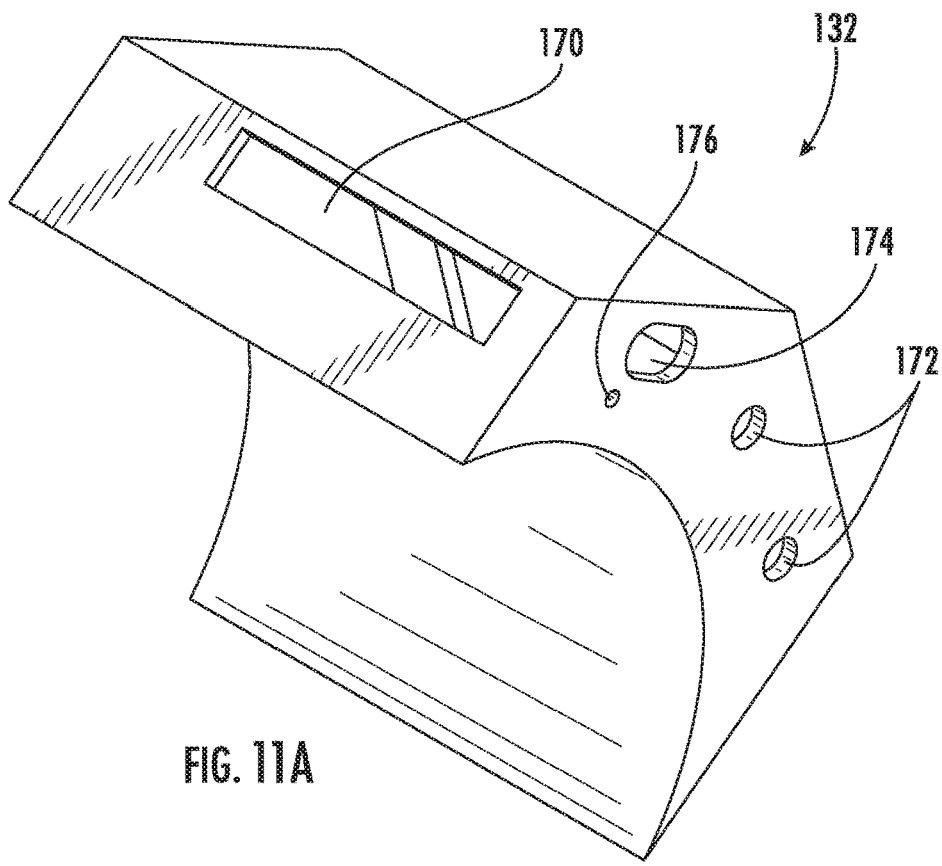
FIG. 11A shows a drawing of a perspective view of an embodiment of a lock housing for use with the welding lead cable connector holding apparatus shown in FIGS. 1-10.
Figure 11B:
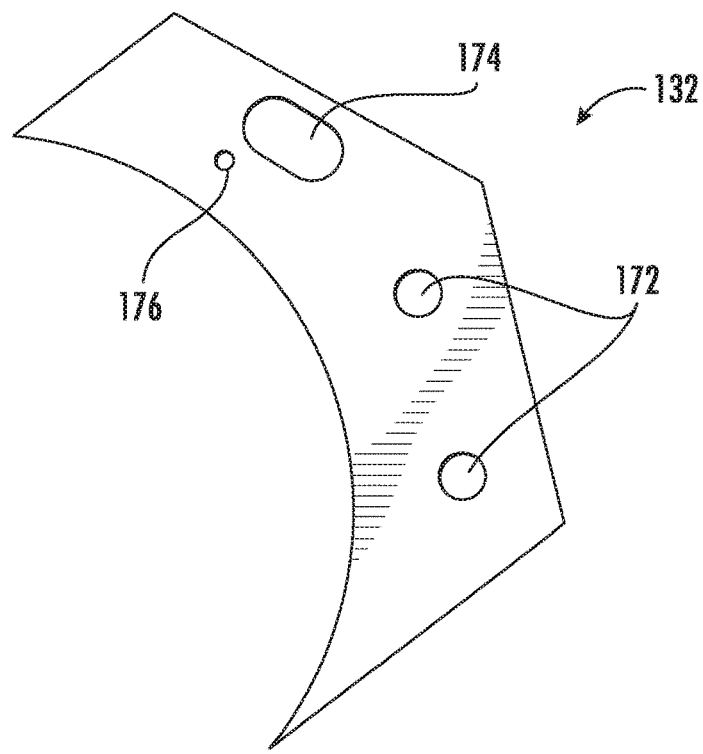
FIG. 11B shows a drawing of a side view of an embodiment of a lock housing for use with the welding lead cable connector holding apparatus shown in FIGS. 1-10.
Figure 12A:
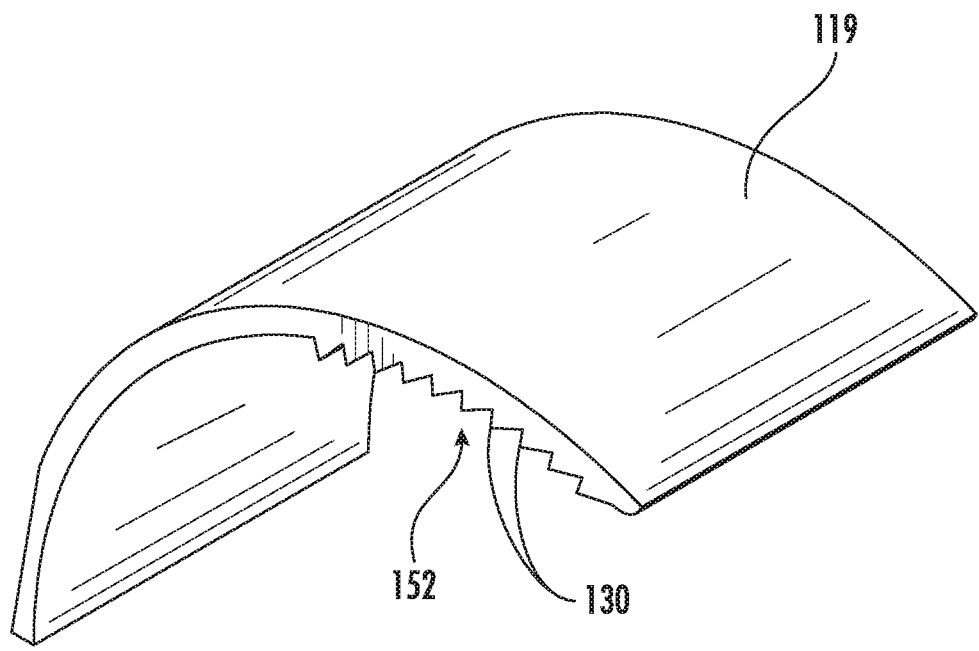
FIG. 12A shows a drawing of a perspective view of an embodiment of a solid strip for use with the welding lead cable connector holding apparatus shown in FIGS. 1-10.
Figure 12B:
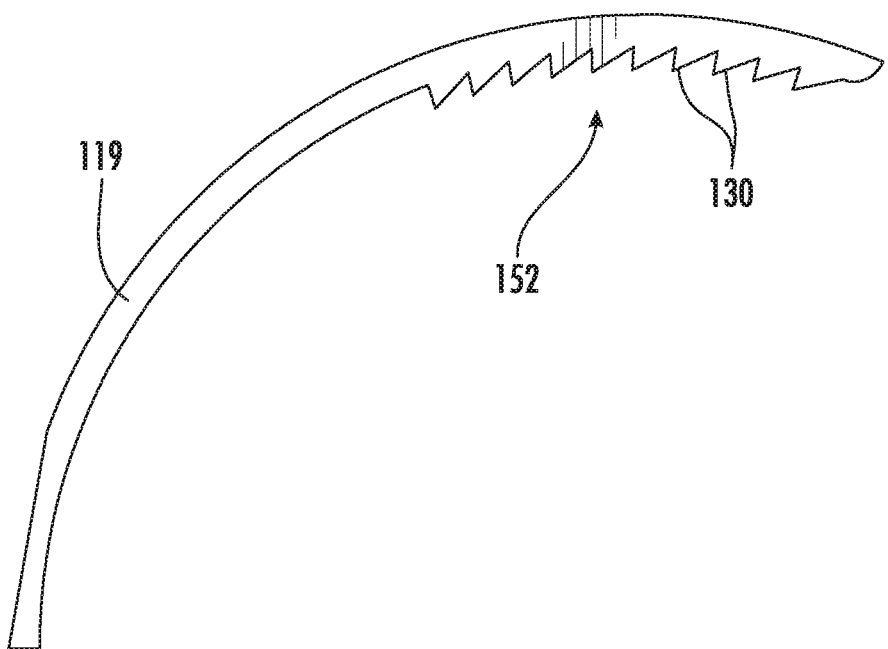
FIG. 12B shows a drawing of a side view of an embodiment of a solid strip for use with the welding lead cable connector holding apparatus shown in FIGS. 1-10.

FIGS. 11A-11B show an embodiment of the lock housing 132 by itself including a first lock housing aperture 170 through which part of the solid strip 119 extends. Also shown are a plurality of second lock housing apertures 172 through which the bar 124 extends. A third lock housing aperture 174 is shown through which the arm 128 extends. Finally, a plurality of fourth lock housing apertures 176 are shown on opposite sides of the housing 132 wherein the rod 134 extends into each of the fourth lock housing apertures 176. FIGS. 12A-12B show an embodiment of the solid strip 119 by itself.

FIGS. 13 and 16-20 show a welding lead cable connector holding apparatus 200 which includes a shell 202 defining a cavity 204 wherein the shell 202 further includes a first shell member 206A (see FIGS. 20A-20D) and a second shell member 206B (see FIGS. 21A-21D) (hereinafter, collectively, "shell members 206"). The apparatus 200 further includes an appendage 208 attached to the first shell member 206A and an engagement member 210 attached to the second shell member 206B wherein the apparatus 200 is configured to engage the engagement member 210 with the appendage 208 in order to lock the first shell member 206A and the second shell member 206B together so that the apparatus 200 is in a closed position. If welding lead cable connectors are present inside the primary cavity 204, such welding lead cable connectors are effectively locked inside the shell 202, thereby locking and protecting the associated welding leads. The wires of the welding lead cables can extend out of a first shell aperture 211A and a second shell aperture 211B.

The first shell member 206A preferably includes outer regions 212 including a first outer region 212A and a second outer region 212B that are tapered to hold welding lead cable connectors in place inside the shell 202. Similarly, the second shell member 206B preferably includes outer regions 213 including a first outer region 213A and a second outer region 213B that are also tapered to hold welding lead cable connectors in place inside the shell 202. In various embodiments described and suggested herein, the shell members 206 are fastened together using some form of a locking mechanism. The complexity of the locking mechanism may vary in different embodiments but in each embodiment, such mechanism is used to hold the shell members 206 together and thereby hold welding lead cable connectors in place inside the shell 202.

In the embodiment shown in FIGS. 13 and 16-20, the appendage 208 includes a solid strip 214 that is preferably attached to the first shell member 206A and is configured to extend beyond the first shell member 206A when the appendage 208 is oriented adjacent to an outer surface 215 of the first shell member 206A. The solid strip 214 is preferably shaped to curve with the outer surface 215 of the first shell member 206A.

The engagement member 210 is configured to receive and engage with the appendage 208. The example engagement member 210 shown in FIGS. 13 and 16-20 includes a combination lock 216. A close-up view of the engagement member 210 including the combination lock 216 is shown in FIGS. 16-20. The combination features and associated mechanical components of such combination features of combination locks are well-known to a person having ordinary skill in the art and, therefore, such features are not described in detail here. In addition to such basic internal combination mechanical features, the combination lock 216 includes a bar 218 extending from a main body 220 of the combination lock 216 wherein the combination lock 216 is configured so that the bar 218 can be released from a locked position (a first position) and moved from the first position (see FIGS. 17 an 19) to an unlocked position (a second position; see FIGS. 18 and 20) if a proper combination is input to the combination lock 216. The engagement member 210 further includes an arm 222 extending from the bar 218 of the combination lock 216 wherein if the bar 218 is in the first position, the arm 222 engages the engagement member 210 with the appendage 208, thereby locking the appendage 208 to the engagement member 210 and, if two welding lead cable connectors are located in the primary cavity 204, locking the two welding lead cable connectors inside the shell 202.

Figure 19:
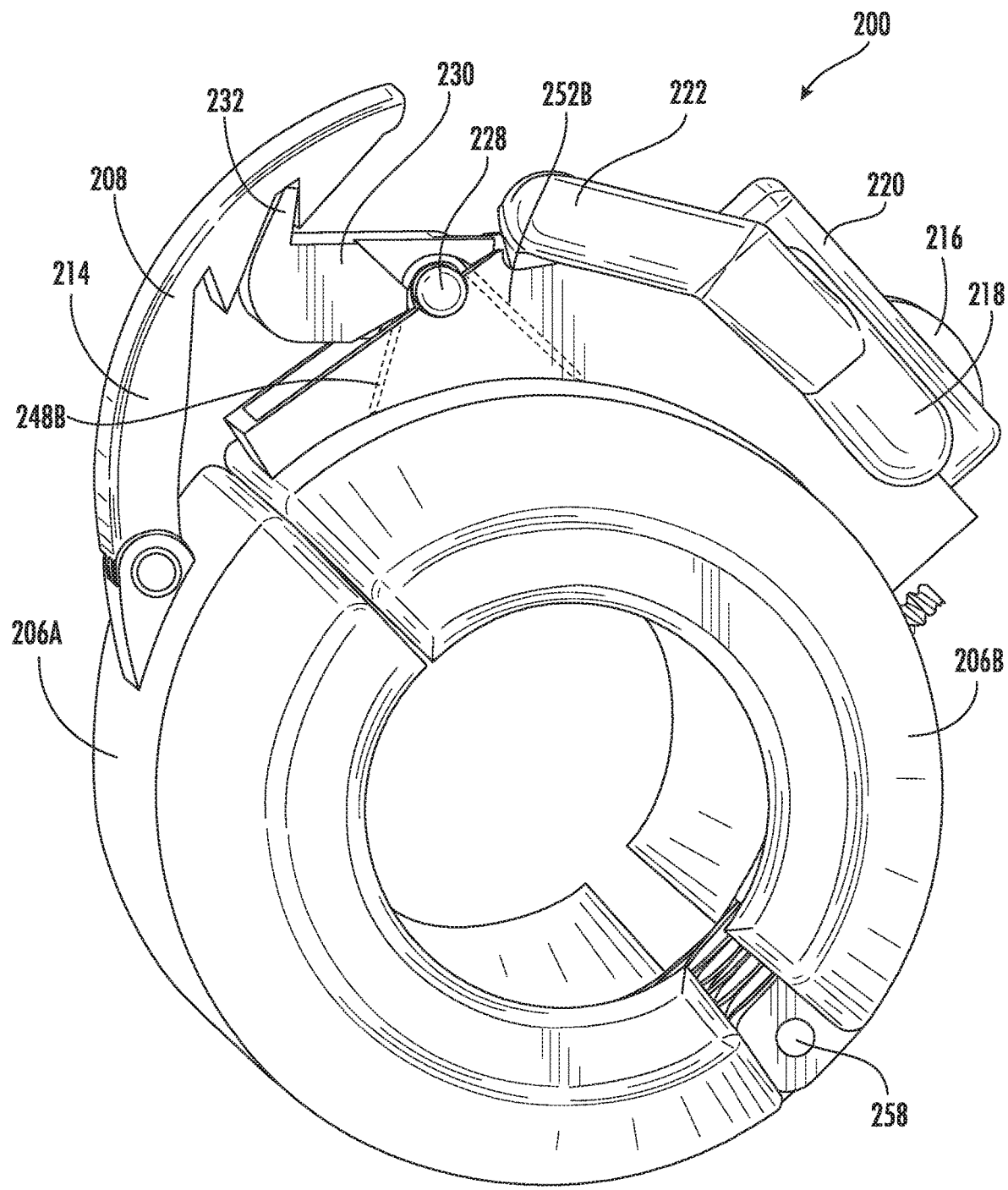
FIG. 19 shows a drawing of an end view of the welding lead cable connector holding apparatus shown in FIG. 16 with the outer housing removed showing an appendage engaged with a rotation member of the engagement member while the bar is situated in the locked (first) position and the rotation member is situated in the first orientation.
Figure 20:
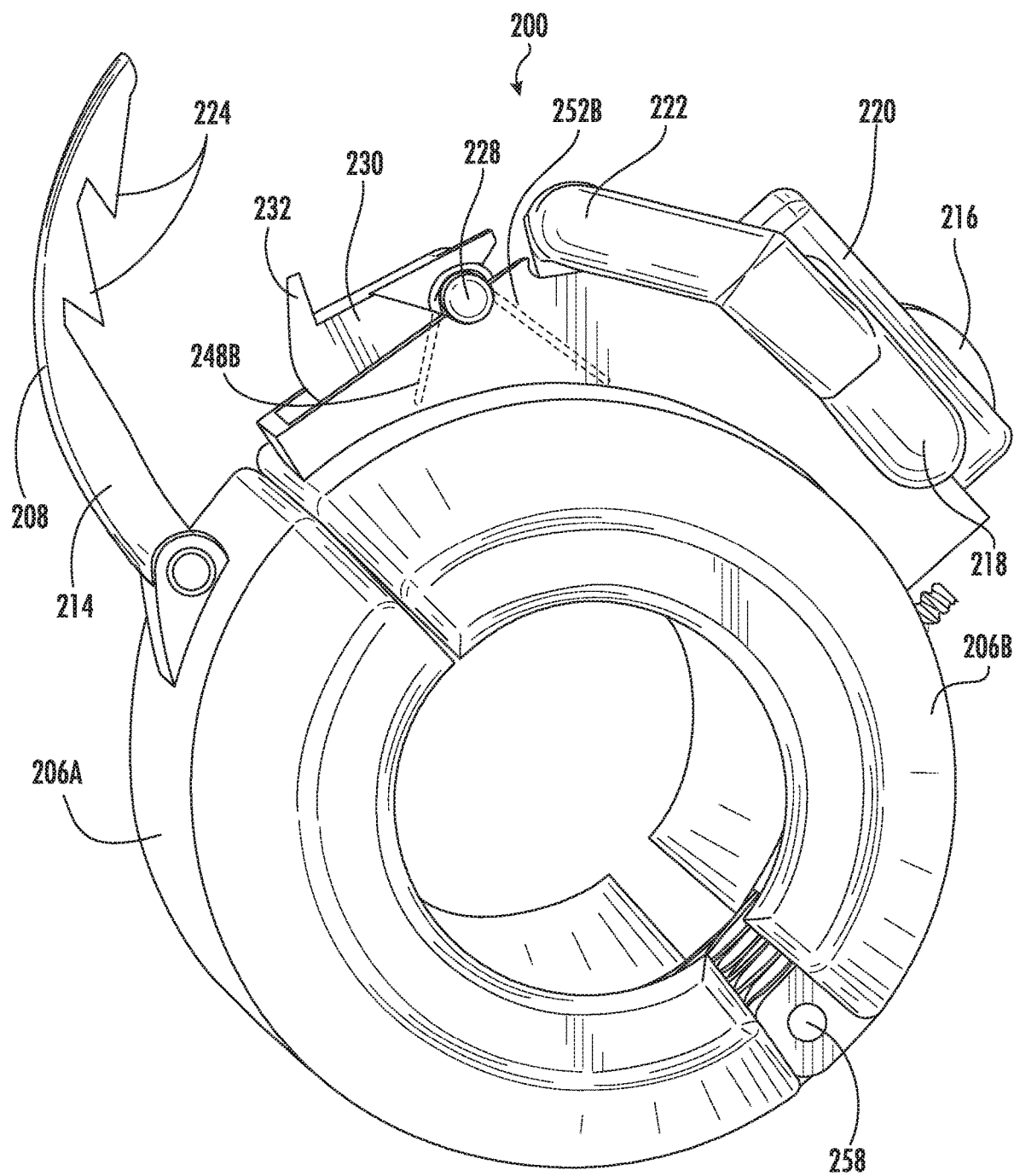
FIG. 20 shows a drawing of an end view of the welding lead cable connector holding apparatus shown in FIG. 17 with the outer housing removed showing an appendage disengaged with a rotation member of the engagement member while the bar is situated in the unlocked (second) position and the rotation member is situated in the second orientation.
Figure 21A:
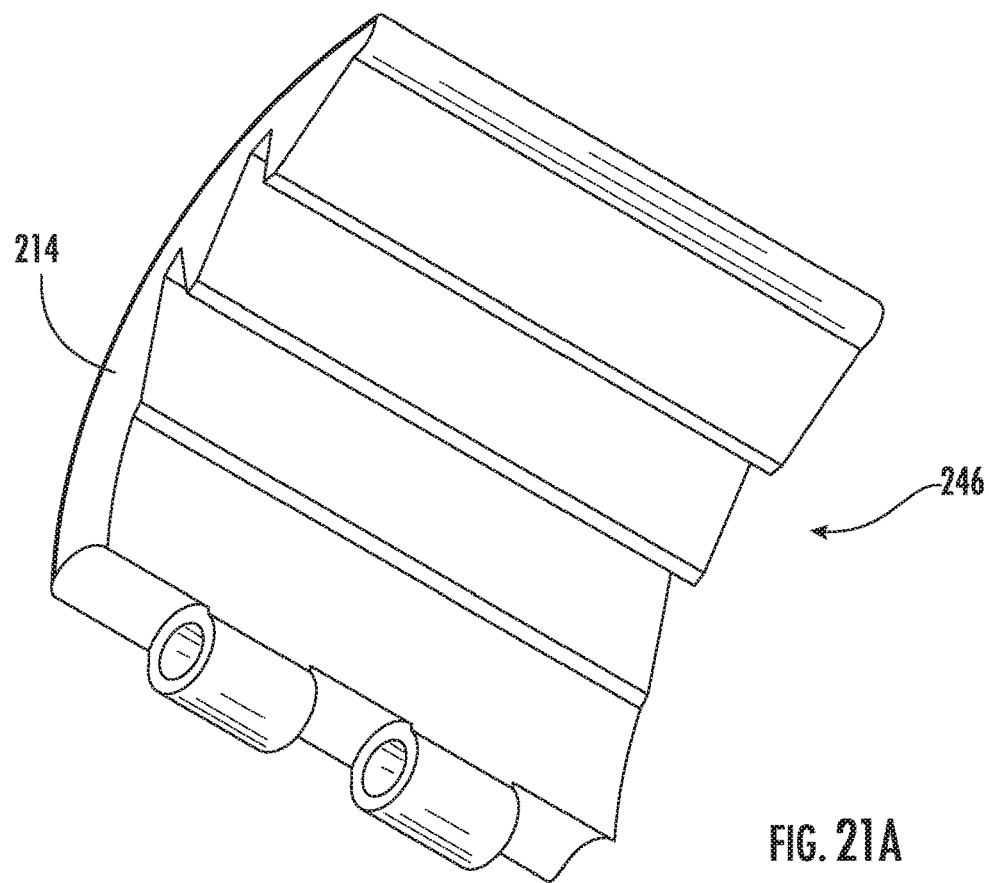
FIG. 21A shows a drawing of a perspective view of an embodiment of an appendage used with the welding lead cable connector holding apparatus shown in FIG. 13.
Figure 21B:
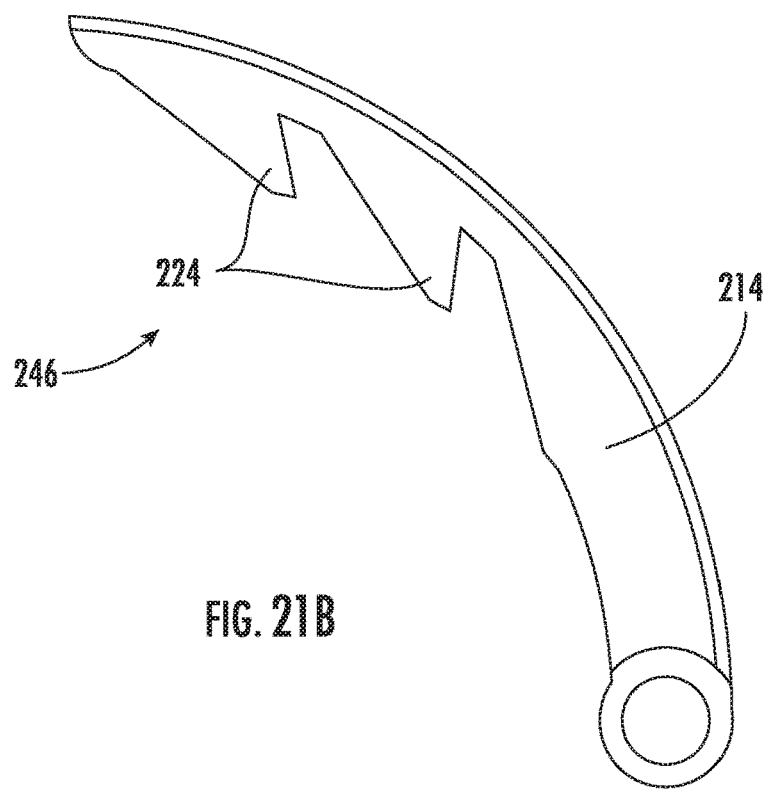
FIG. 21B shows a drawing of a perspective view of an embodiment of the appendage used with the welding lead cable connector holding apparatus shown in FIG. 13.

FIGS. 19-20 show a specific example of how the appendage 208 engages with the engagement member 210. In the embodiment shown in FIGS. 13 and 16-20, the appendage 208 includes a plurality of teeth 224 facing down toward the shell members 206. The engagement member 210 shown in FIGS. 13 and 16 preferably further includes an outer housing 226 (also referred to herein as "lock housing") attached to the second shell member 206B. The outer housing 226 can be attached to the second shell member 206B by different methods known to persons having ordinary skill in the art such as welding, screws, pins, glue, or combinations thereof. The engagement member 210 shown in FIGS. 13 and 16-20 preferably further includes a rod 228 extending through the outer housing 226 and attached to the outer housing 226. The rod is preferably ⅛ inches in diameter, but other sized rods can be used in this and other embodiments. The engagement member 210 shown in FIGS. 13 and 16-20 also preferably includes a rotation member 230 configured along the rod 228 so that the rod extends through a rotation member borehole 231. In this way, the rotation member 230 is configured to rotate along the rod 228 back and forth from a first orientation (see FIGS. 17 and 19) to a second orientation (see FIGS. 18 and 20) and wherein the rotation member 230 includes a tongue 232 extending out from a main body 234 of the rotation member 230 proximate a first edge 236A of the tab and a leg 238 extending out from the main body 234 of the rotation member 230 proximate a second edge 236B of the rotation member 230. The engagement member 210 shown in FIGS. 13 and 16-20 also preferably includes at least one biasing member 240 engaged with the rotation member 230 for biasing the rotation member 230 toward the first orientation when the bar 218 is in the first position (see FIGS. 17 and 19). The at least one biasing member 240 preferably includes a plurality of torsion springs 242 as shown as a first torsion spring 242A and a second torsion spring 242B in FIGS. 17 and 18. The arm 222 shown in FIGS. 17 and 18 further includes a wedge-shaped extension 244 for biasing the rotation member 230 toward the second orientation when the bar 218 is in the second position (see FIGS. 18 and 20). The plurality of teeth 224 of the appendage 208 form a ratchet track 246 facing the tongue 232 of the rotation member 230 wherein the tongue 232 engages with one of the teeth 224 when the bar 218 is in the first position (see FIGS. 17 and 19) and wherein the tongue 232 is released from the teeth 224 when the bar 218 is moved to the second position (see FIGS. 18 and 20). The bar 218 is released by inputting a proper combination code into the combination lock 216.

As shown in FIGS. 17-20, the first torsion spring 242A includes a first branch 248A attached proximate to a third edge 236C of the rotation member 230 and the second torsion spring 242B includes a first branch 248B attached proximate to a fourth edge 236D of the rotation member 230. The first branch 248A of the first torsion spring 242A extends into a first slot 250A inside the rotation member 230. The first branch 248B of the second torsion spring 242B extends into a second slot 250B inside the rotation member 230. A second branch 252A of the first torsion spring 242A is preferably pressed against or otherwise engaged with the housing 226 or other solid fixed object inside the housing 226. Similarly, a second branch 252B of the second torsion spring 242B is preferably pressed against or otherwise engaged with the housing 226 or other solid fixed object inside the housing 226.

Figure 13:
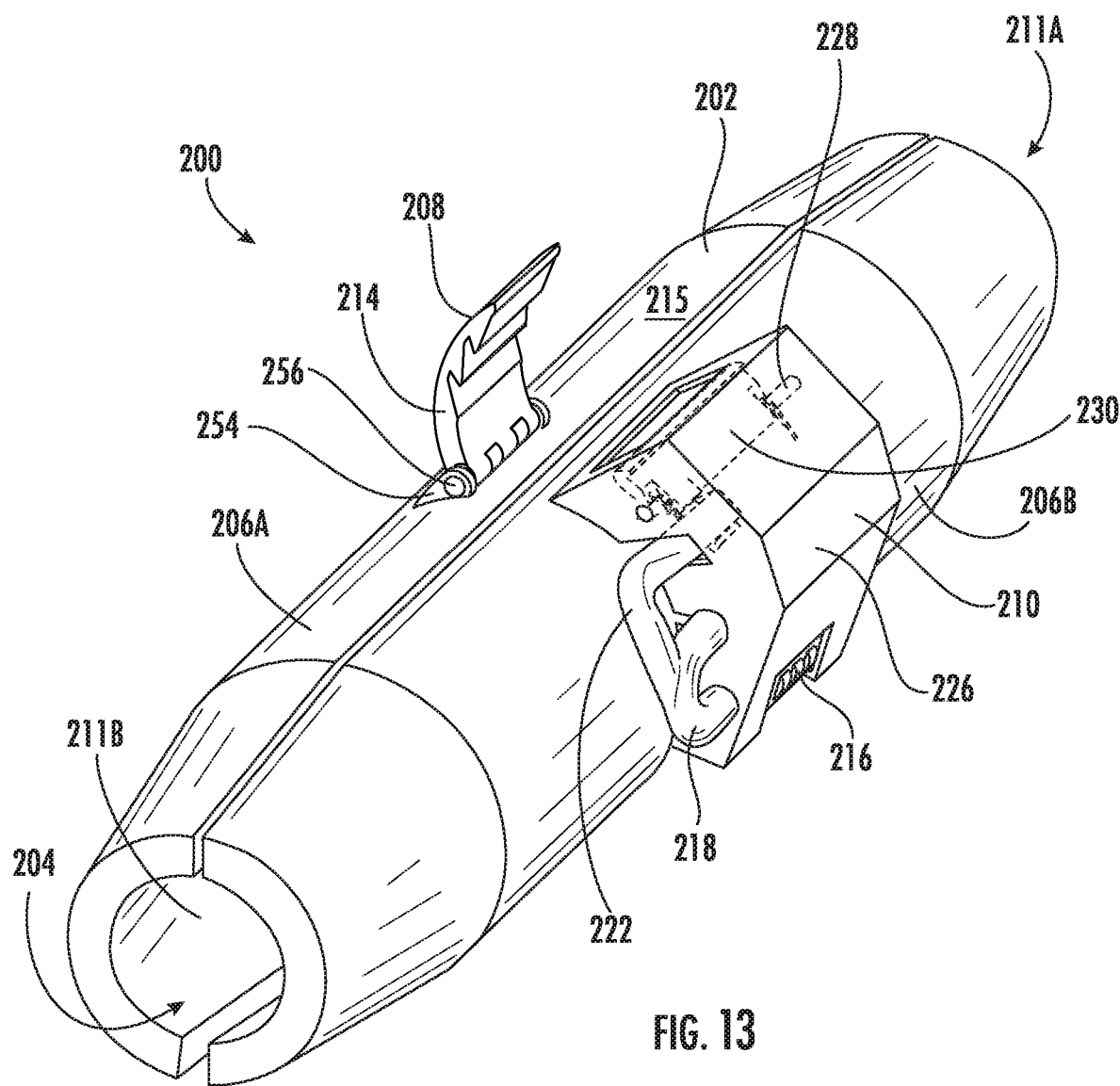
FIG. 13 shows a drawing of an embodiment of a welding lead cable connector holding apparatus shown in a closed but unlatched and unlocked position.
Figure 16:
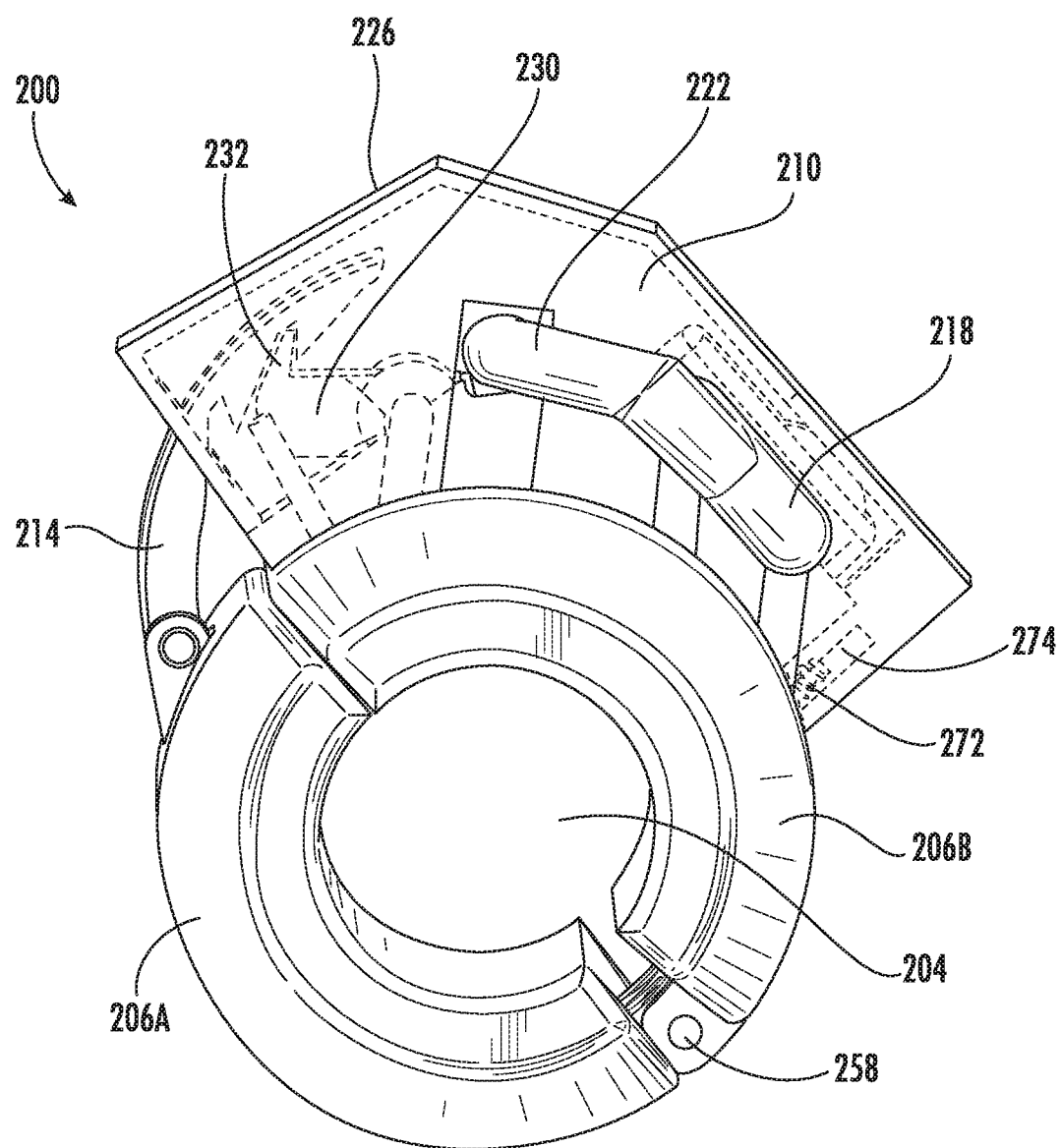
FIG. 16 shows a drawing of an end view of the welding lead cable connector holding apparatus shown in FIG. 13 including an engagement member with certain components inside an outer housing of the engagement member shown as dashed lines.
Figure 17:
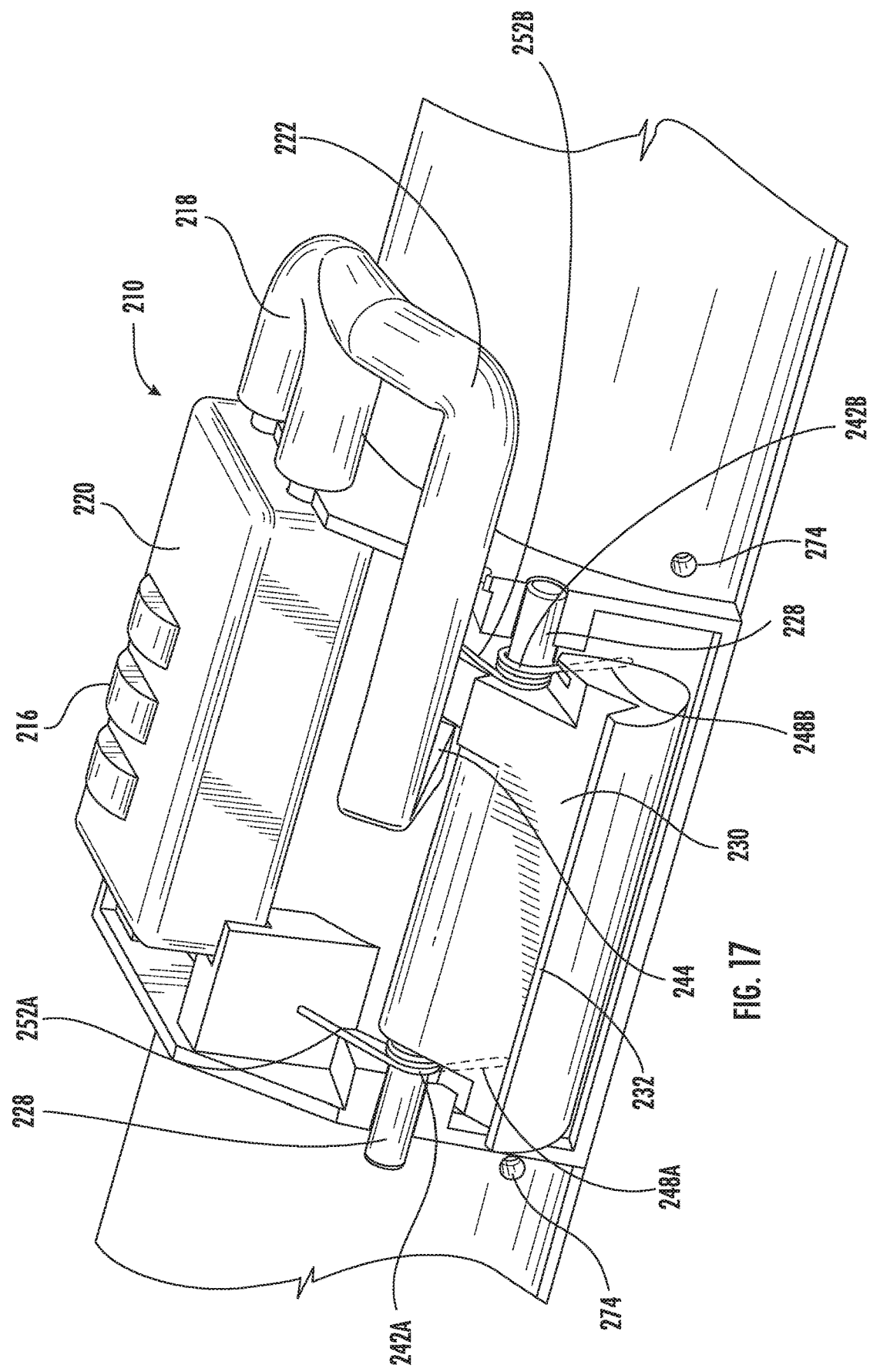
FIG. 17 shows a drawing of the welding lead cable connector holding apparatus shown in FIG. 13 and FIG. 16 with the outer housing removed to reveal internal components wherein a bar of the engagement member is situated in a locked (first) position and a rotation member is situated in a first orientation.
Figure 18:
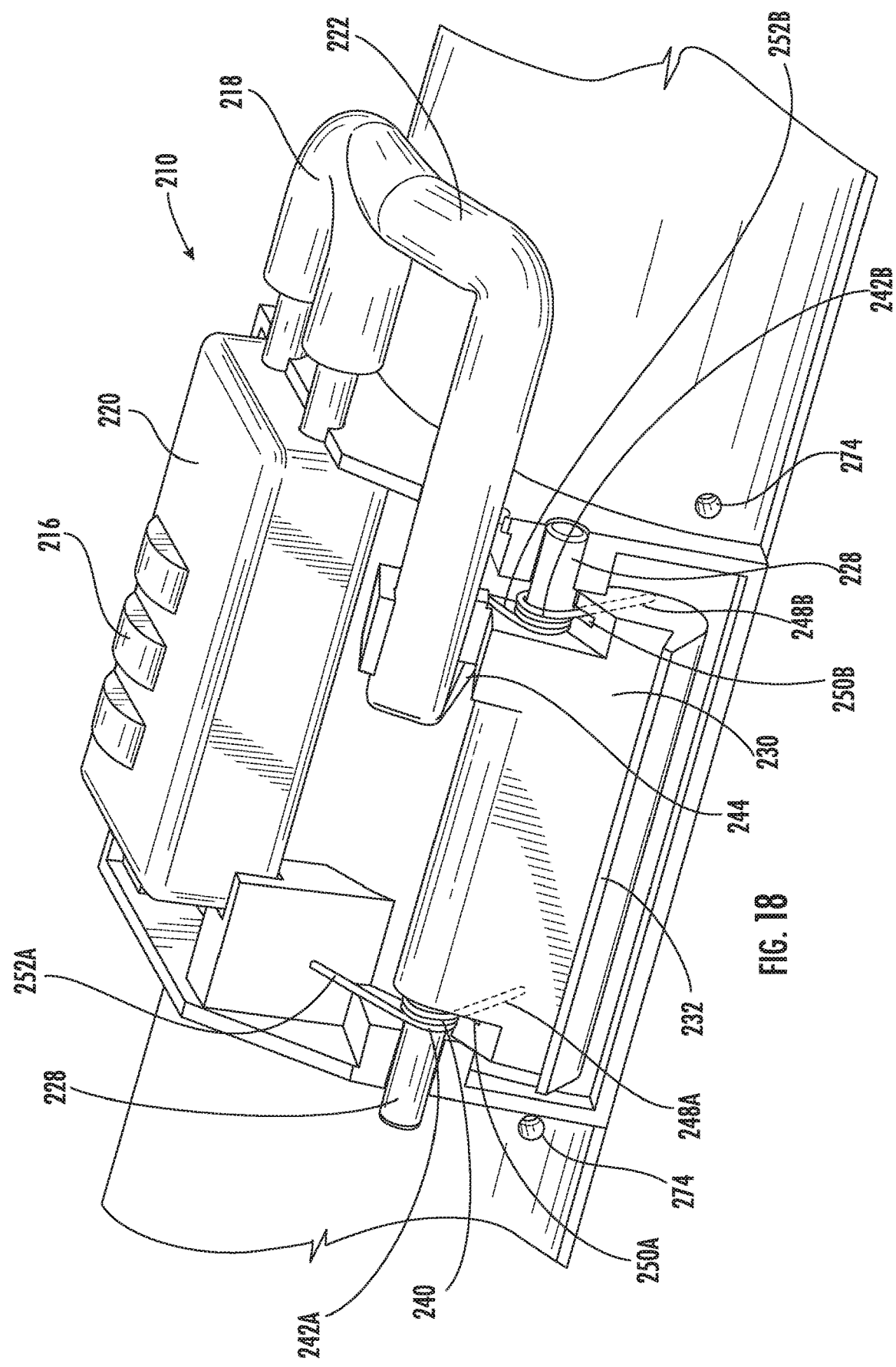
FIG. 18 shows a drawing of the welding lead cable connector holding apparatus shown in FIG. 13, FIG. 16 and FIG. 17 with the outer housing removed to reveal internal components wherein the bar of the engagement member is situated in an unlocked (second) position and the rotation member is situated in a second orientation.

Appendage 208 (shown by itself in FIGS. 21A-21B) preferably includes a hinge joint 254 including an appendage pin 256 for attaching the solid strip 214 to the first shell member 206A as shown in FIGS. 13 and 19-20. The hinge joint 254 can be attached to the first shell member 206A by welding, screws, glue or other similar attachment means known to persons having ordinary skill in the art. The first shell member 206A is preferably attached to the second shell member 206B via a hinge mechanism including a shell pin 258 extending through a shell borehole 260 formed by combining interlocking projections 262 from the first shell member 206A and the second shell member 206B. The appendage pin 256 and the shell pin 258 are both preferably ⅛ inches in diameter but other pin sizes can be used in this and other embodiments.

Figure 22A:
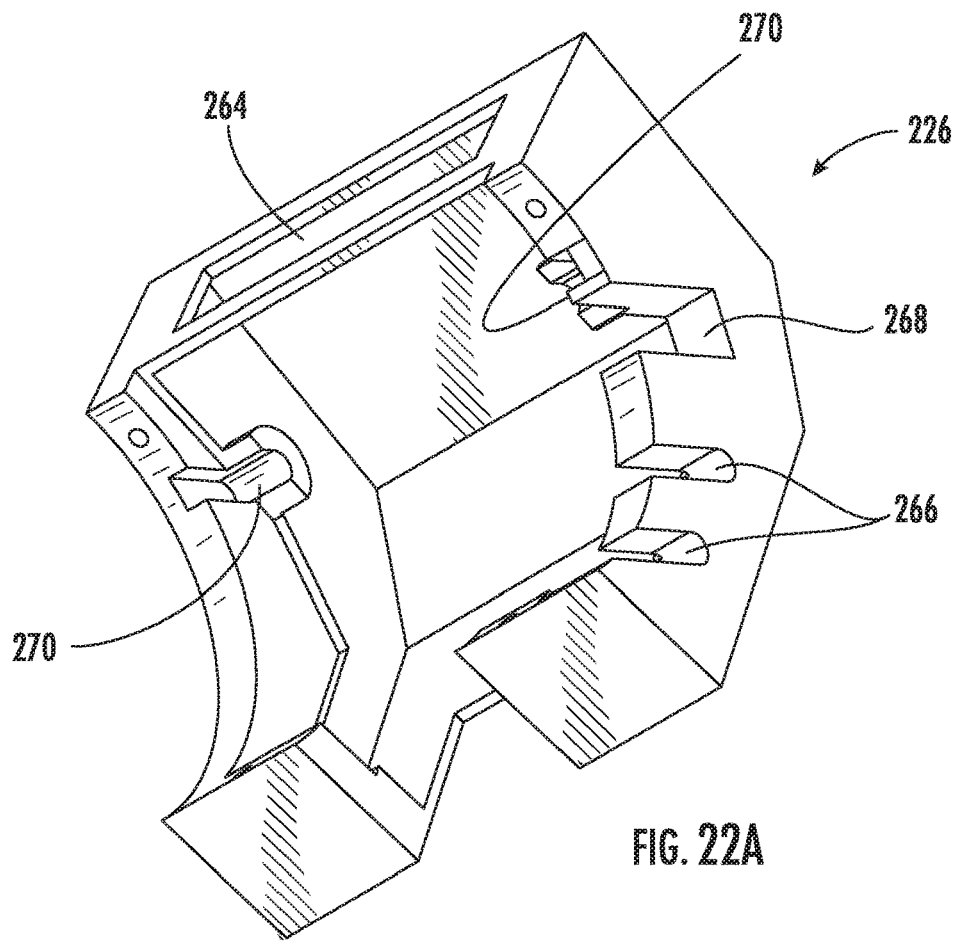
FIG. 22A shows a drawing of a perspective view of an embodiment of the outer housing used with the welding lead cable connector holding apparatus shown in FIG. 13.
Figure 22B:
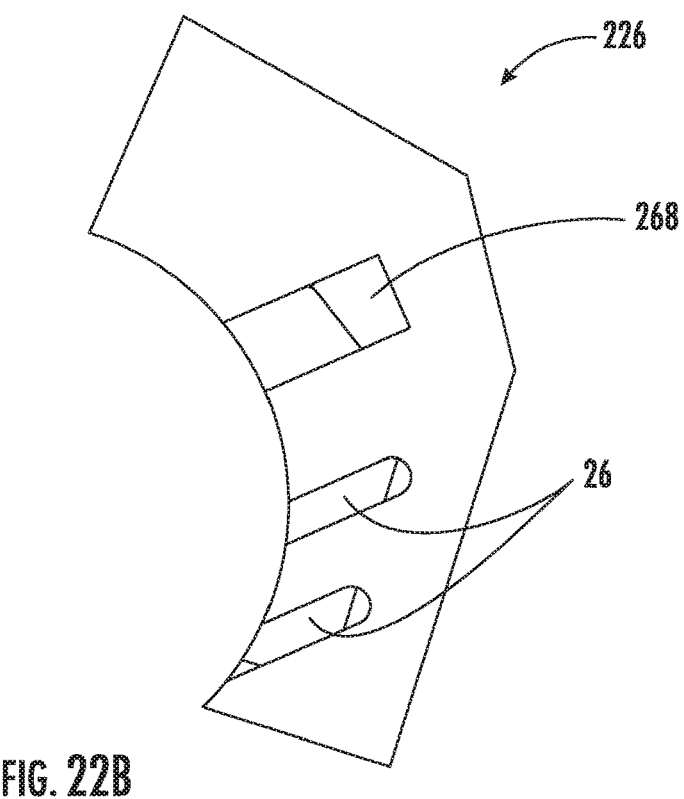
FIG. 22B shows a drawing of a side view of an embodiment of the outer housing used with the welding lead cable connector holding apparatus shown in FIG. 13.
Figure 23A:
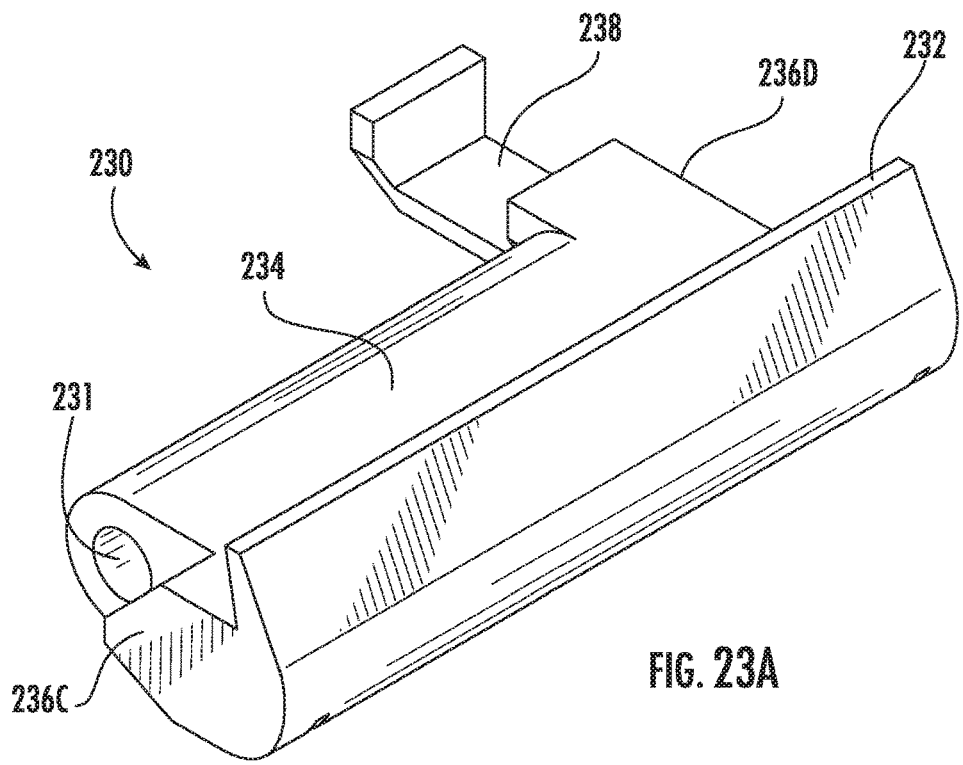
FIG. 23A shows a drawing of a perspective view of an embodiment of a rotation member used with the welding lead cable connector holding apparatus shown in FIG. 13.
Figure 23B:
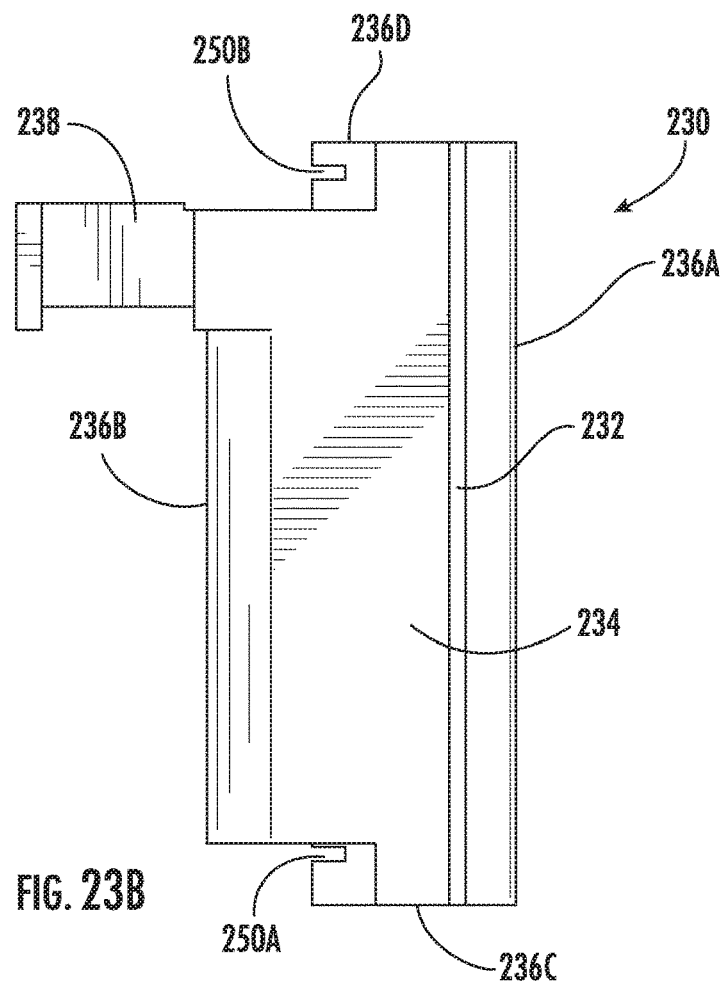
FIG. 23B shows a drawing of a plan view of an embodiment of the rotation member used with the welding lead cable connector holding apparatus shown in FIG. 13.
Figure 23C:
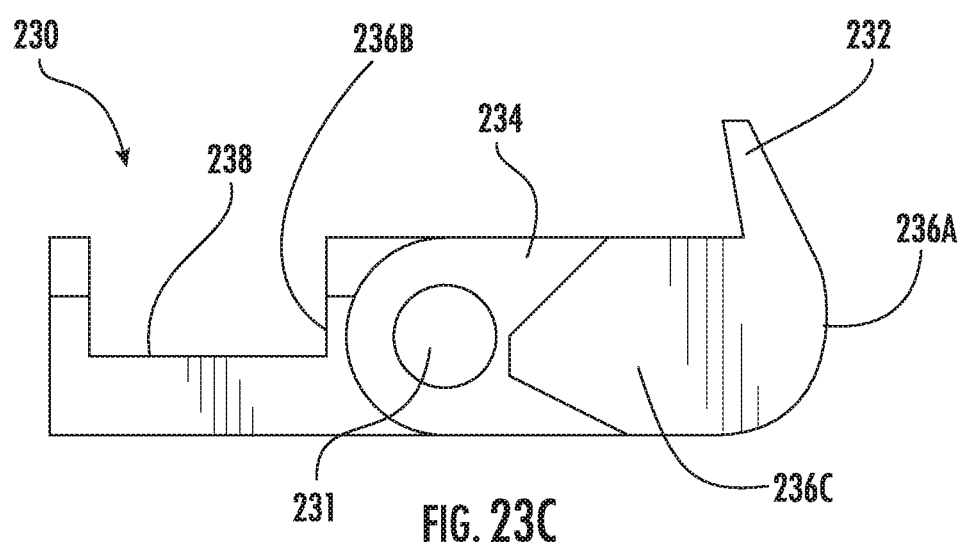
FIG. 23C shows a drawing of an end view of an embodiment of the rotation member used with the welding lead cable connector holding apparatus shown in FIG. 13.
Figure 24A:
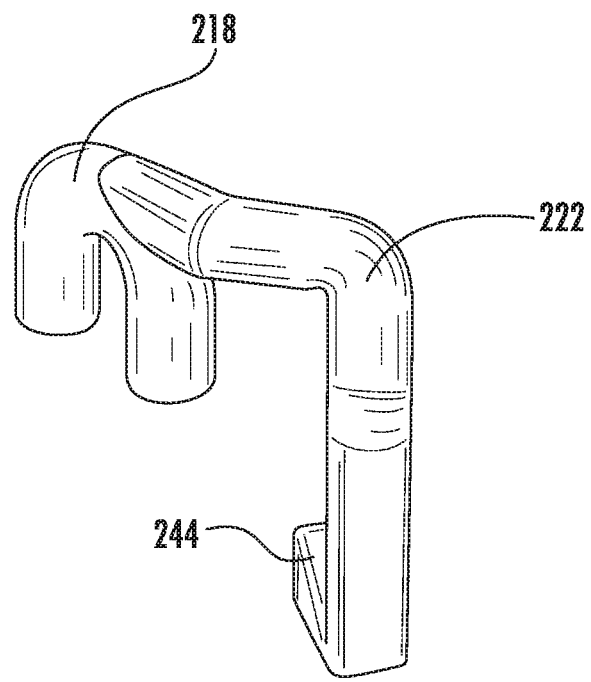
FIG. 24A shows a first perspective view of an embodiment of a bar and associated arm shown in FIG. 17 and FIG. 18.
Figure 24B:
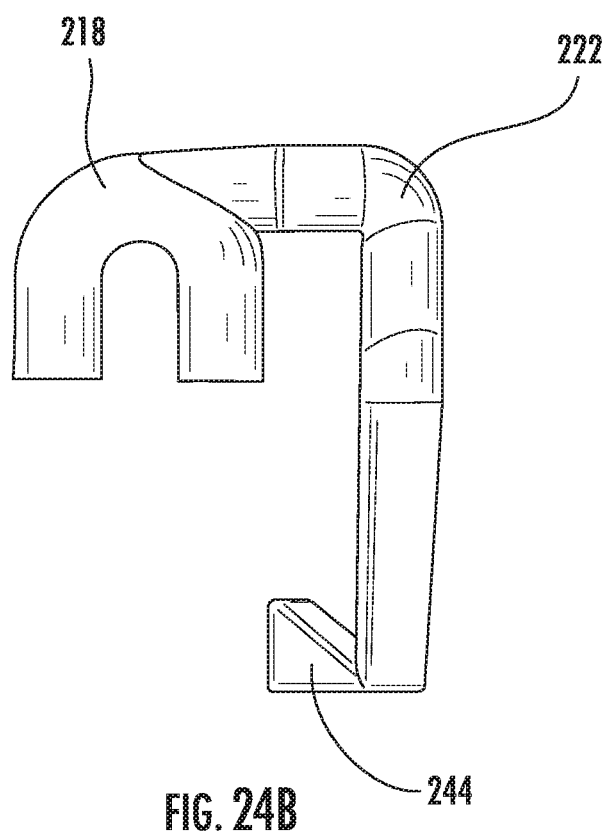
FIG. 24B shows a second perspective view of an embodiment of a bar and associated arm shown in FIG. 17 and FIG. 18.

FIGS. 22A-22B show an embodiment of the lock housing 226 by itself including a first lock housing slot 264 through which part of the solid strip 214 extends. Also shown are a plurality of second lock housing slots 266 through which the bar 218 extends. A third lock housing slot 268 is shown through which the arm 222 extends. Finally, a pair of fourth lock housing slots 270 are shown on opposite sides of the housing 226 wherein the rod 228 extends into each of the fourth lock housing slots 270. Images of the rotation member 230 are shown in FIGS. 23A-23C providing more detail on the shape of the preferred embodiment shown in FIGS. 23A-23C. FIGS. 24A and 24B show different views of the bar 218 and arm 222.

When screws 272 are used to attach features of various embodiments described here, holes 274 for such screws 272 are preferably countersunk so that the holes 274 can be filled with silicone to disrupt or otherwise block any electric flow from welding leads to the screws 272 as shown, for example, in FIG. 25.

Most if not all of the components of the welding lead cable connector holding apparatus (100, 200, 300 or 400), the welding lead cable connector securing apparatus 500, and the welding lead cable connector securing apparatus 600, as well as other embodiments described herein are preferably made of non-conductive materials such as, for example, polymeric materials such as plastics. However, metal(s) or metal alloy(s) can also be used in some embodiments for all or some of the features of the overall device. One benefit of nonmetals is that such materials are often less conductive than metals. At least the exterior of the welding lead cable connector holding apparatuses is preferably made from non-conductive materials. The dimensions of the components of the welding lead cable connector holding apparatuses can vary depending on the sizes of welding leads that are to be held in place by the shell (102, 202, 302, 402, 502 or 602). Preferably, the length of the first shell member (106A, 206A, 306A, 406A, or 506A) ranges from about 9.5 to about 11.5 inches and each of the outer regions (or tapered regions) preferably have a length of from about 1.5 inches to about 2.5 inches. Similarly, the length of the second shell member (106B, 206B, 306B, 406B, or 506B) ranges from about 9.5 to about 11.5 inches and each of the outer regions (or tapered regions) preferably have a length of from about 1.5 inches to about 2.5 inches.

Figure 26:
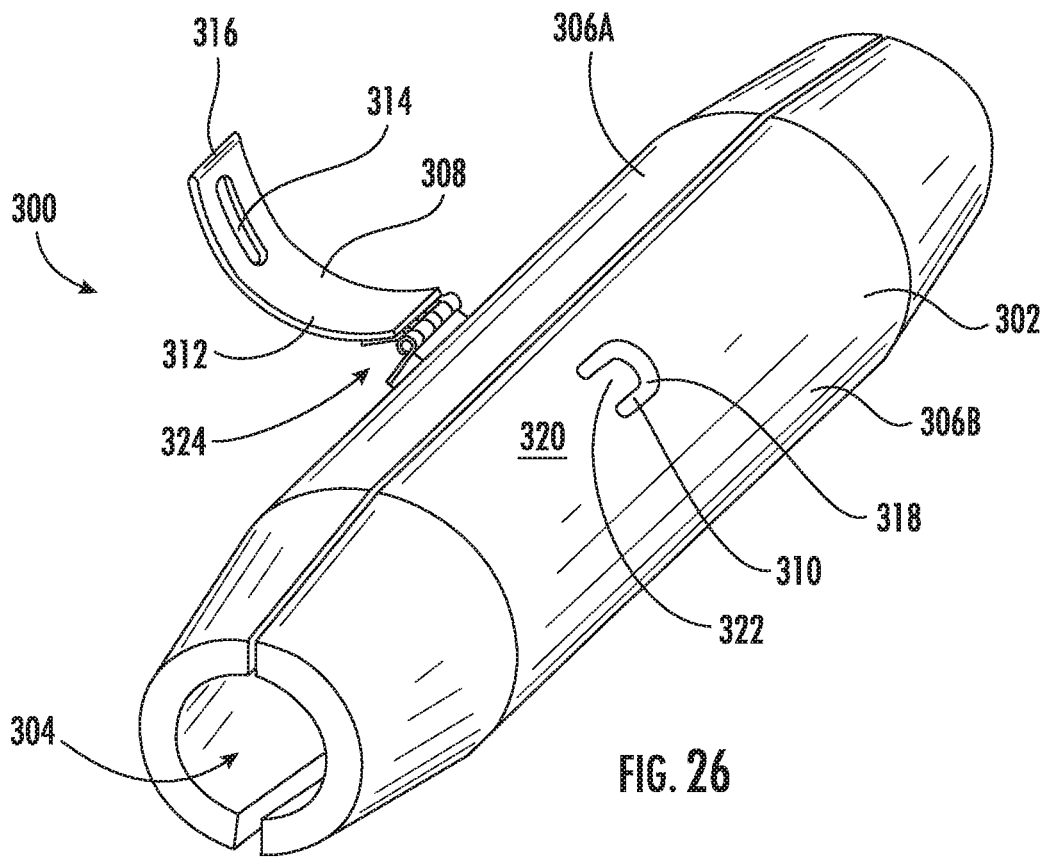
FIG. 26 shows a drawing of an embodiment of a welding lead cable connector holding apparatus shown in a closed but unlocked position.
Figure 27:
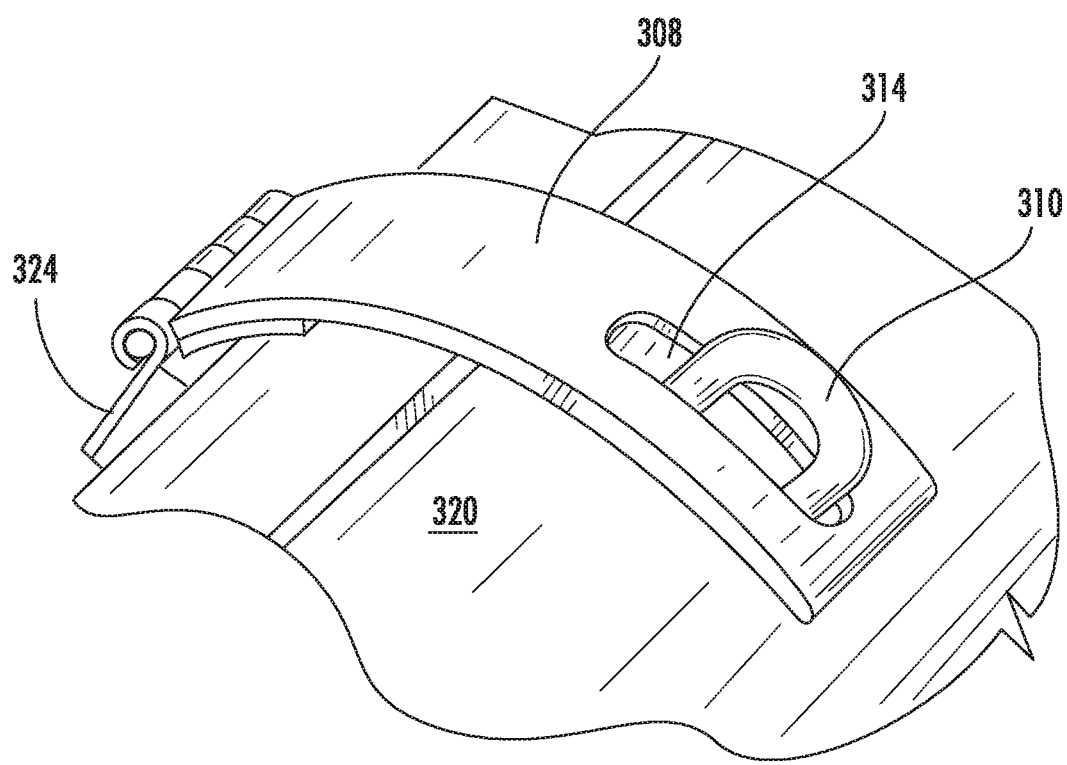
FIG. 27 shows a drawing of a close-up view of an embodiment of an appendage and an engagement member of the welding lead cable connector holding apparatus shown in FIG. 26.
Figure 28:
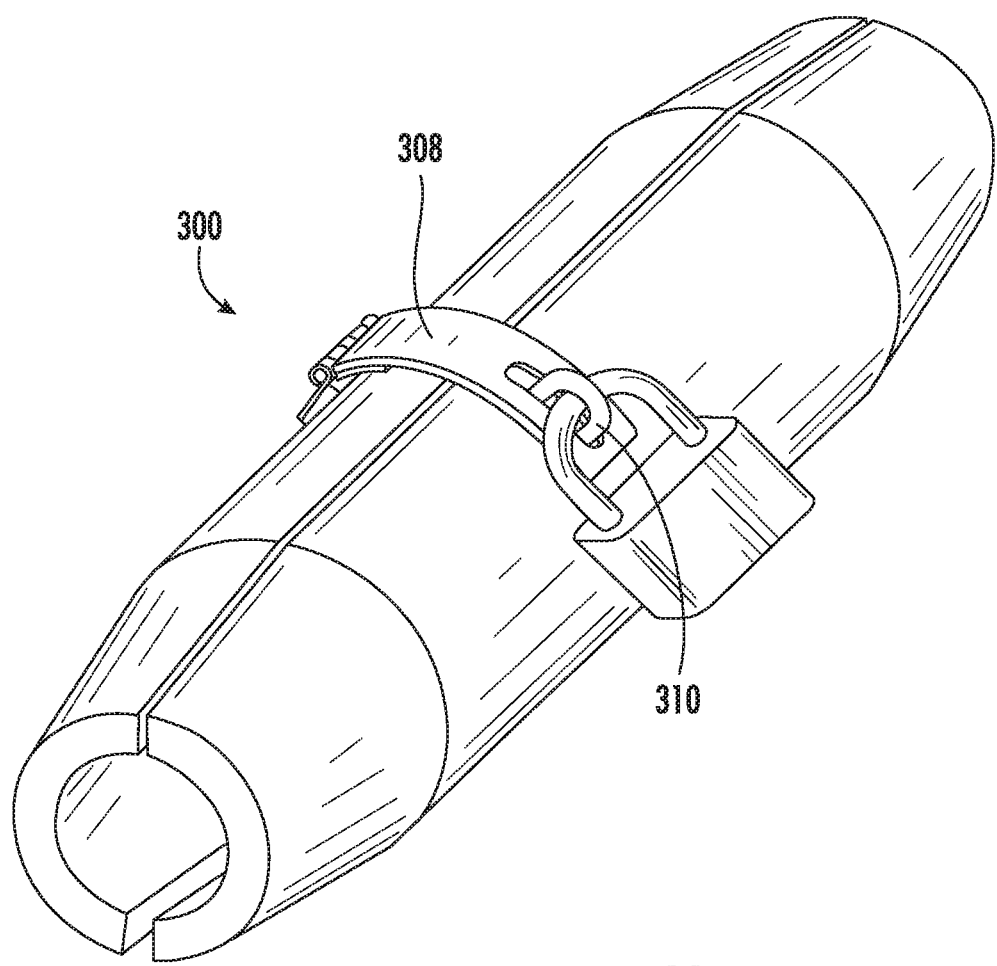
FIG. 28 shows a drawing of an embodiment a drawing of a close-up view of an appendage and an engagement member of the welding lead cable connector holding apparatus shown in FIG. 26 and FIG. 27 wherein the appendage and the engagement member are engaged together and locked together using a separate lock.

FIGS. 26-28 show a welding lead cable connector holding apparatus 300 which includes a shell 302 defining a cavity 304 wherein the shell 302 further includes a first shell member 306A and a second shell member 306B. The apparatus 300 further includes an appendage 308 attached to the first shell member 306A and an engagement member 310 attached to the second shell member 306B wherein the apparatus 300 is configured to engage the engagement member 310 with the appendage 308 in order to lock the first shell member 306A and the second shell member 306B together so that the apparatus 300 is in a closed position. If welding lead cable connectors are present inside the primary cavity 304, such welding lead cable connectors are effectively locked inside the shell 302, thereby locking and protecting the associated welding leads.

In the embodiment shown in FIGS. 26-28, the appendage 308 includes a solid strip 312 including a solid strip aperture 314 proximate to a distal end 316 of the solid strip 312. The engagement member 310 further includes an extension 318 extending out from an outer surface 320 of the second shell member 306B wherein the extension includes an extension aperture 322. The appendage 316 is preferably attached to the first shell member 306A via a hinge joint 324 so that the appendage can be maneuvered to a position in which the extension 318 extends at least partially through the solid strip aperture 314. When in this position, a bar from a separate lock (e.g., a common padlock) can be inserted through the extension aperture 322 and used to lock the appendage 308 to the engagement member 310, thereby locking the first shell member 306A and the second shell member 306B together so that the apparatus 300 is in a closed position.

Figure 29:
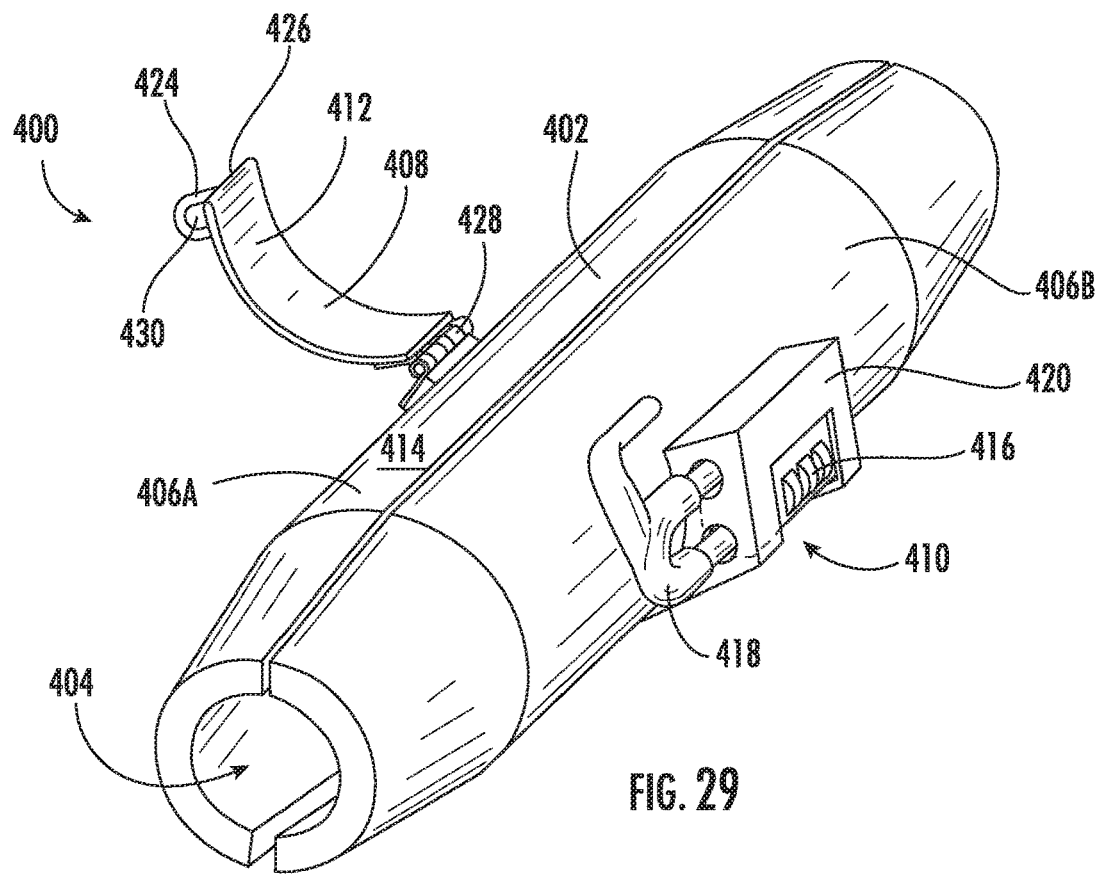
FIG. 29 shows a drawing of an embodiment of a welding lead cable connector holding apparatus shown in a closed but unlatched and unlocked position.
Figure 30:
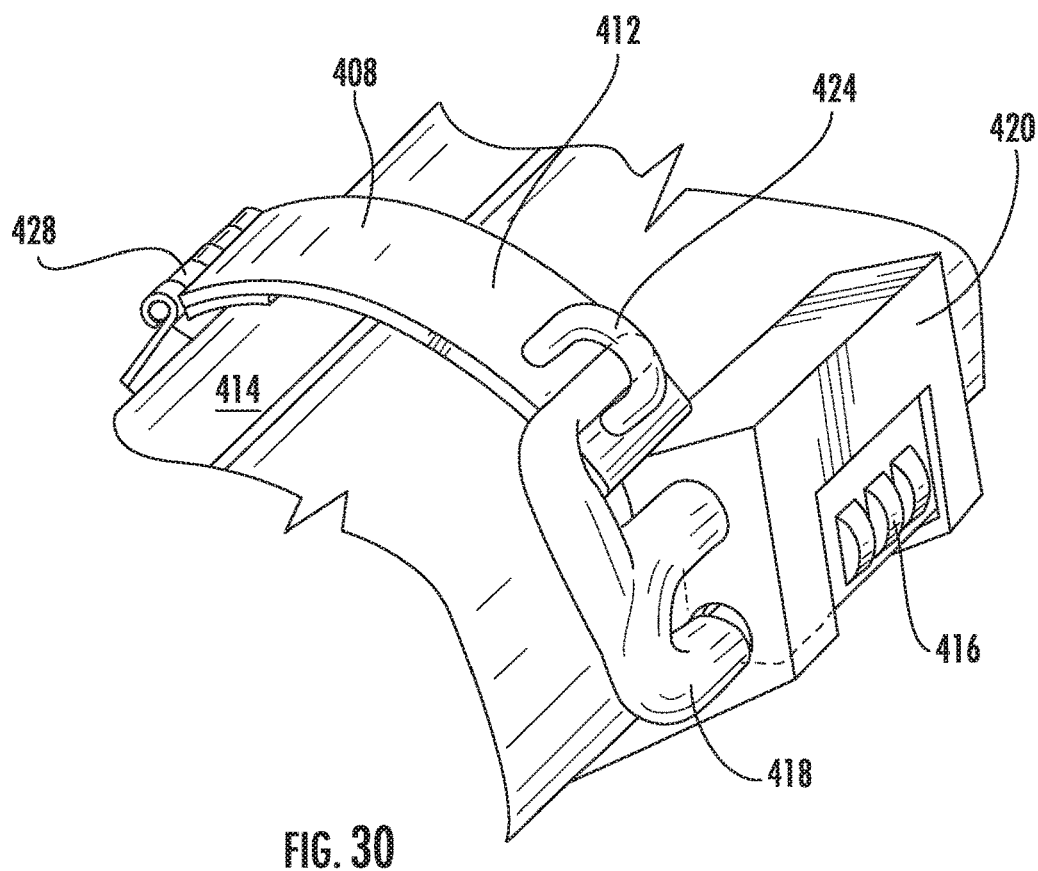
FIG. 30 shows a drawing of a close-up view of an embodiment of an appendage and an engagement member of the welding lead cable connector holding apparatus shown in FIG. 29 wherein a bar of the engagement member is shown in an unlocked (second) position.
Figure 31:
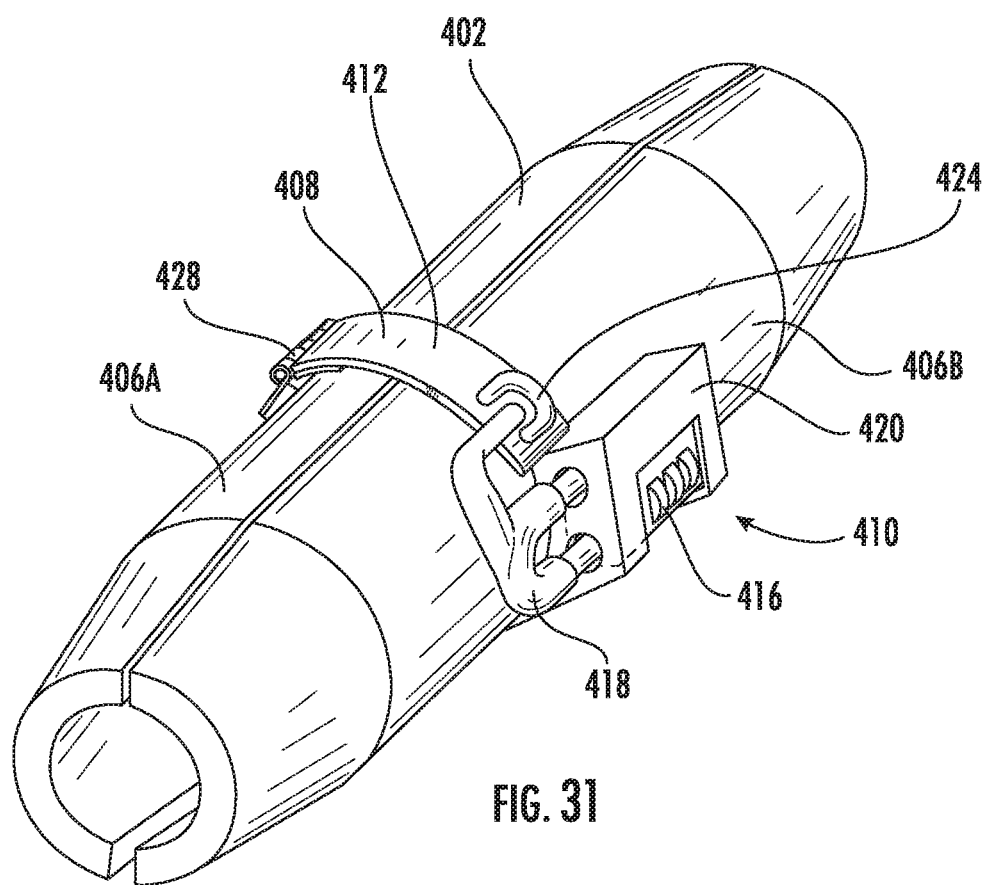
FIG. 31 shows a drawing of a close-up view of an embodiment of an appendage and an engagement member of the welding lead cable connector holding apparatus shown in FIG. 29 and FIG. 30 wherein the bar of the engagement member is shown in a locked (first) position.

FIGS. 29-31 show a welding lead cable connector holding apparatus 400 which includes a shell 402 defining a cavity 404 wherein the shell 402 further includes a first shell member 406A and a second shell member 406B. The apparatus 400 further includes an appendage 408 attached to the first shell member 406A and an engagement member 410 attached to the second shell member 406B wherein the apparatus 400 is configured to engage the engagement member 410 with the appendage 408 in order to lock the first shell member 406A and the second shell member 406B together so that the welding lead cable connector holding apparatus 400 is in a closed position. If welding lead cable connectors are present inside the primary cavity 404, such welding lead cable connectors are effectively locked inside the shell 402, thereby locking and protecting the associated welding leads.

In the embodiment shown in FIGS. 29-31, the appendage 408 includes a solid strip 412 that is preferably attached to the first shell member 406A and is configured to extend beyond the first shell member 406A when the appendage 408 is oriented adjacent to an outer surface 414 of the first shell member 406A. The solid strip 412 is preferably shaped to curve with the outer surface 414 of the first shell member 406A. The engagement member 410 is configured to receive and engage with the appendage 408. The example engagement member 410 shown in FIGS. 28-30 includes a combination lock 416. A close-up view of the engagement member 410 including the combination lock 416 is shown in FIGS. 30-31. The combination features and associated mechanical components of such combination features of combination locks are well-known to a person having ordinary skill in the art and, therefore, such features are not described in detail here. In addition to such basic internal combination mechanical features, the combination lock 416 includes a bar 418 extending from a main body 420 of the combination lock 416 wherein the combination lock 416 is configured so that the bar 418 can be moved from a locked position (a first position; see FIG. 30) to an unlocked position (a second position; see FIG. 31) if a proper combination is input to the combination lock 416. The combination lock 416 further includes an arm 422 extending from the bar 418 of the combination lock 416 wherein if the bar 418 is in the first position, the arm 422 engages with the appendage 408, thereby locking the appendage 408 to the engagement member 410 and, if two welding lead cable connectors are located in the primary cavity, locking the two welding lead cable connectors inside the shell 402.

As shown in FIGS. 29-31, the appendage 408 includes a solid strip extension 424 extending out proximate to a distal end 426 of the solid strip 412. The appendage 408 is preferably attached to the first shell member 406A via a hinge joint 428 so that the appendage 408 can be maneuvered to a position in which at least part of the bar 418 can be inserted through an extension aperture 430 located in the solid strip extension 424. When at least part of the bar 418 is inserted through the extension aperture 430, the combination lock 416 is in the locked (first) position shown in FIG. 30 and the appendage 408 is prevented from being easily released from the engagement member 410, thereby locking the first shell member 406A and the second shell member 406B together so that the apparatus 400 is in a closed position. If welding lead cable connectors are present inside the primary cavity 404, such welding lead cable connectors are effectively locked inside the shell 402, thereby locking and protecting the associated welding leads. To unlock the welding lead cable connector holding apparatus 400, a proper combination can be input to the combination lock 416, thereby releasing the bar 418 to the unlocked (second) position which, in turn, causes the bar 418 to exit the extension aperture 430.

FIGS. 33-38 show a preferred embodiment of a welding lead cable connector securing apparatus 500 which includes a shell 502 defining a primary cavity 504 wherein the shell 502 further includes a first shell member 506A and a second shell member 506B. The apparatus 500 further includes an appendage 508 extending from the first shell member 506A. At least part of the appendage 508 extends through a shell member hole 510 in the second shell member 506B when the shell 502 is in a closed configuration shown, for example, in FIG. 33, FIG. 35 and FIG. 36. The appendage 508 includes an appendage aperture 512 through which a pivoted hook 514 of a padlock 516 can be inserted to lock and secure the welding lead cable connector securing apparatus 500 in the closed configuration as shown, for example, in FIG. 34. The padlock 516 is shown with dashed lines because, depending on the embodiment, a padlock does not necessarily form part of Applicant's invention. Padlocks are used in conjunction with embodiments of Applicant's invention and many different types of padlocks can be used to lock the welding lead cable connector securing apparatus 500 in the closed configuration.

Figure 38:
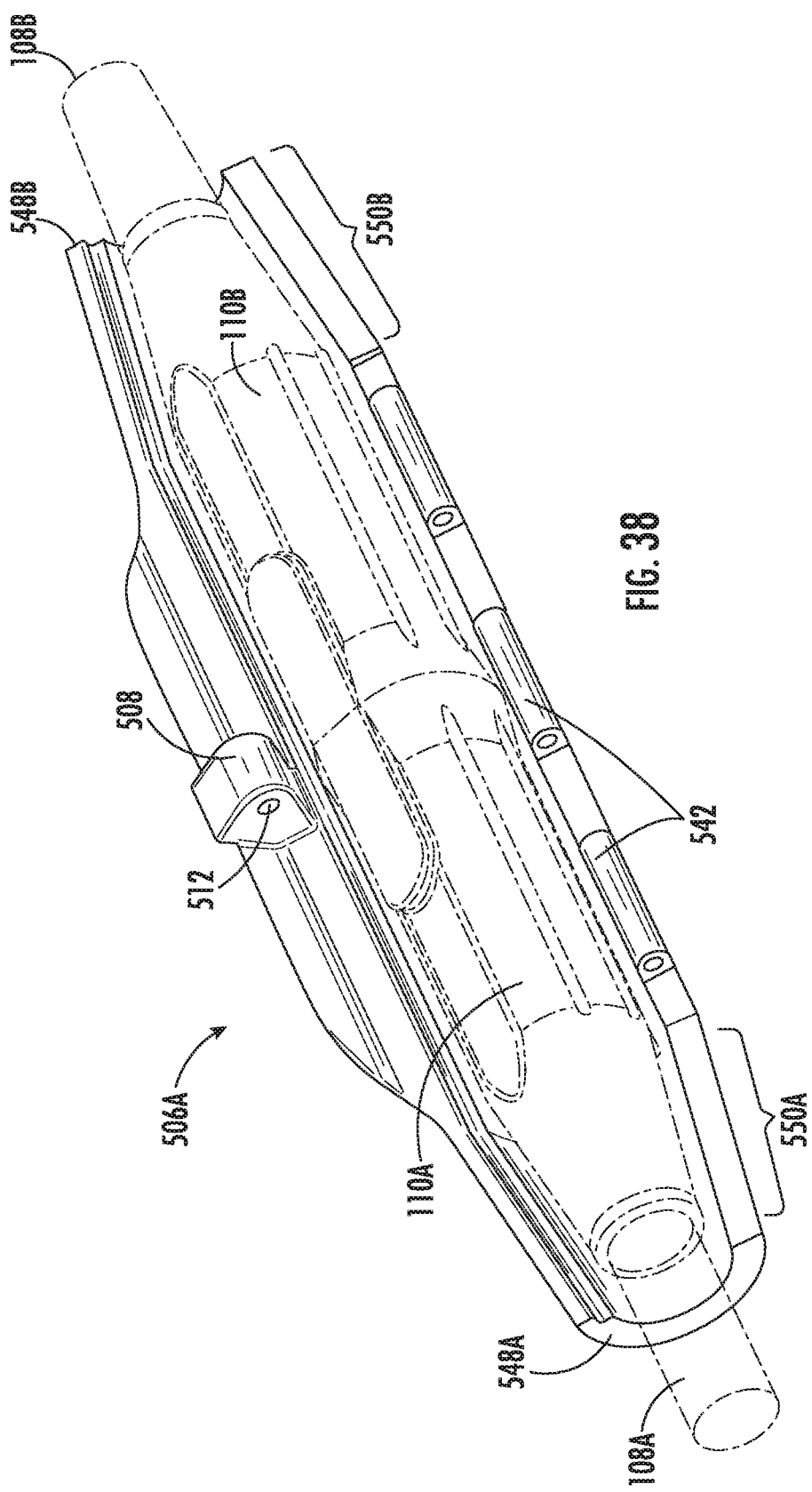
FIG. 38 shows a drawing of a perspective view of a first shell member which forms part of a shell of the embodiment of the welding lead cable connector securing apparatus shown in FIGS. 33-36 wherein a pair of welding lead cable connectors are shown in dashed lines attached together inside the first shell member.

If welding lead cable connectors 110 (110A and 110B) are present inside the primary cavity 504 as shown for example in FIG. 38, such welding lead cable connectors 110 are effectively locked inside the shell 502 when the welding lead cable connector securing apparatus 500 is in the closed configuration, thereby confining and protecting the associated welding leads 108. It is important to note that welding lead cable connectors are not considered part of Applicant's claimed embodiments which is why they are shown with dashed lines. However, Applicant's embodiments are designed, shaped, and sized to house such devices.

The welding lead cable connector securing apparatus 500 preferably includes a secondary cavity 518 preferably along an outside surface 520 of the second shell member 506B. The secondary cavity 518 is shaped and configured to house a padlock such as the padlock 516 shown in FIG. 34. The welding lead cable connector securing apparatus 500 preferably further includes a lid 522 which is preferably hingedly attached to the second shell member 506B and which can be opened to an open position shown for example in FIG. 34 or a closed position as shown for example in FIG. 33, FIG. 35, and FIG. 36. When in the closed position, the lid 522 preferably conceals the secondary cavity 518. The lid 522 is preferably attached to the second shell member 506B via a hinge joint 524 which preferably includes interconnected tubular hinge members 526 from the second shell member 506B and the lid 522 connected together using a pin 528 inserted therein. The lid 522 preferably includes an attachment extension 530 including an attachment ridge 532 which is configured to releasably snap into an attachment aperture 534 located in the second shell member 506B.

Figure 33:
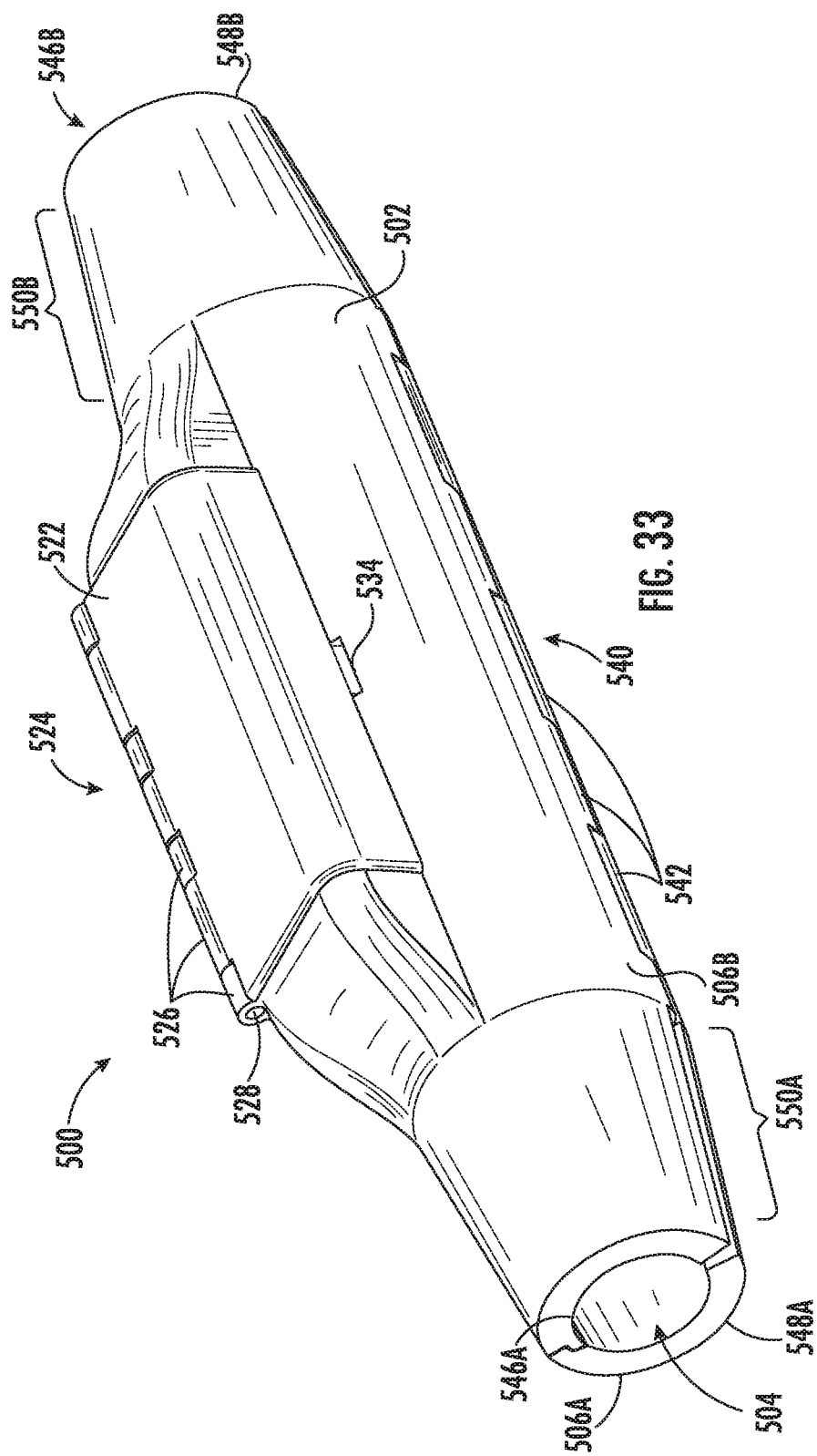
FIG. 33 shows a drawing of a perspective view of an embodiment of a welding lead cable connector securing apparatus shown in a closed configuration.
Figure 34:
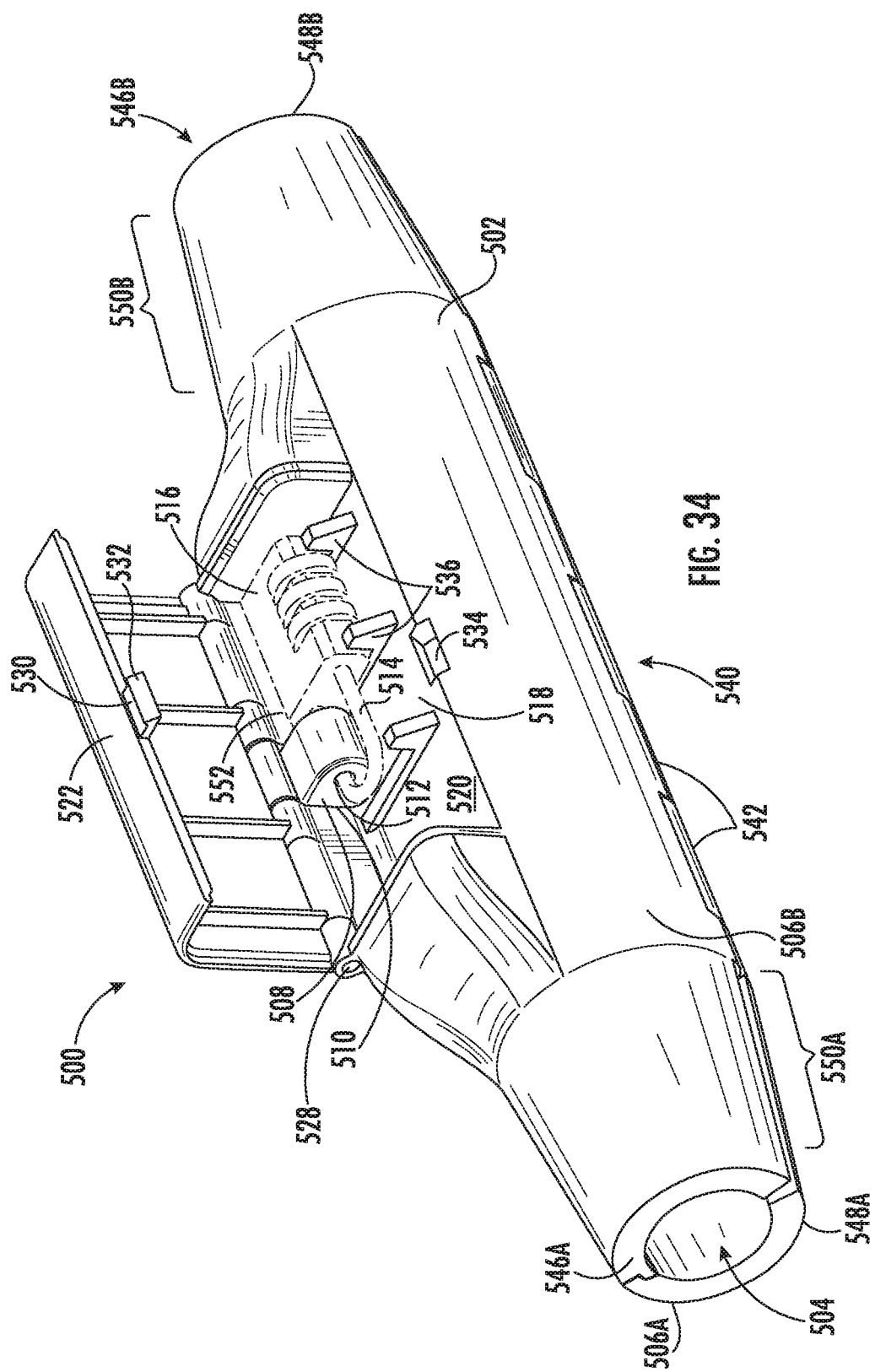
FIG. 34 shows a drawing of a perspective view of the embodiment of the welding lead cable connector securing apparatus shown in FIG. 33 wherein the apparatus includes a lid shown in an open position.
Figure 35:
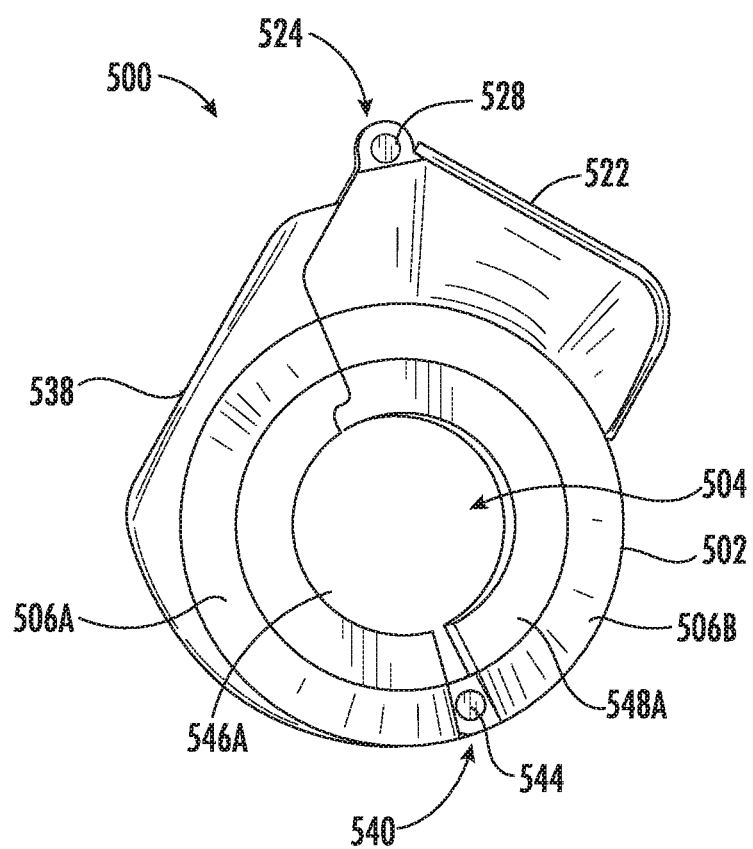
FIG. 35 shows a drawing of an end view of the embodiment of the welding lead cable connector securing apparatus shown in FIG. 33 and FIG. 34.
Figure 36:
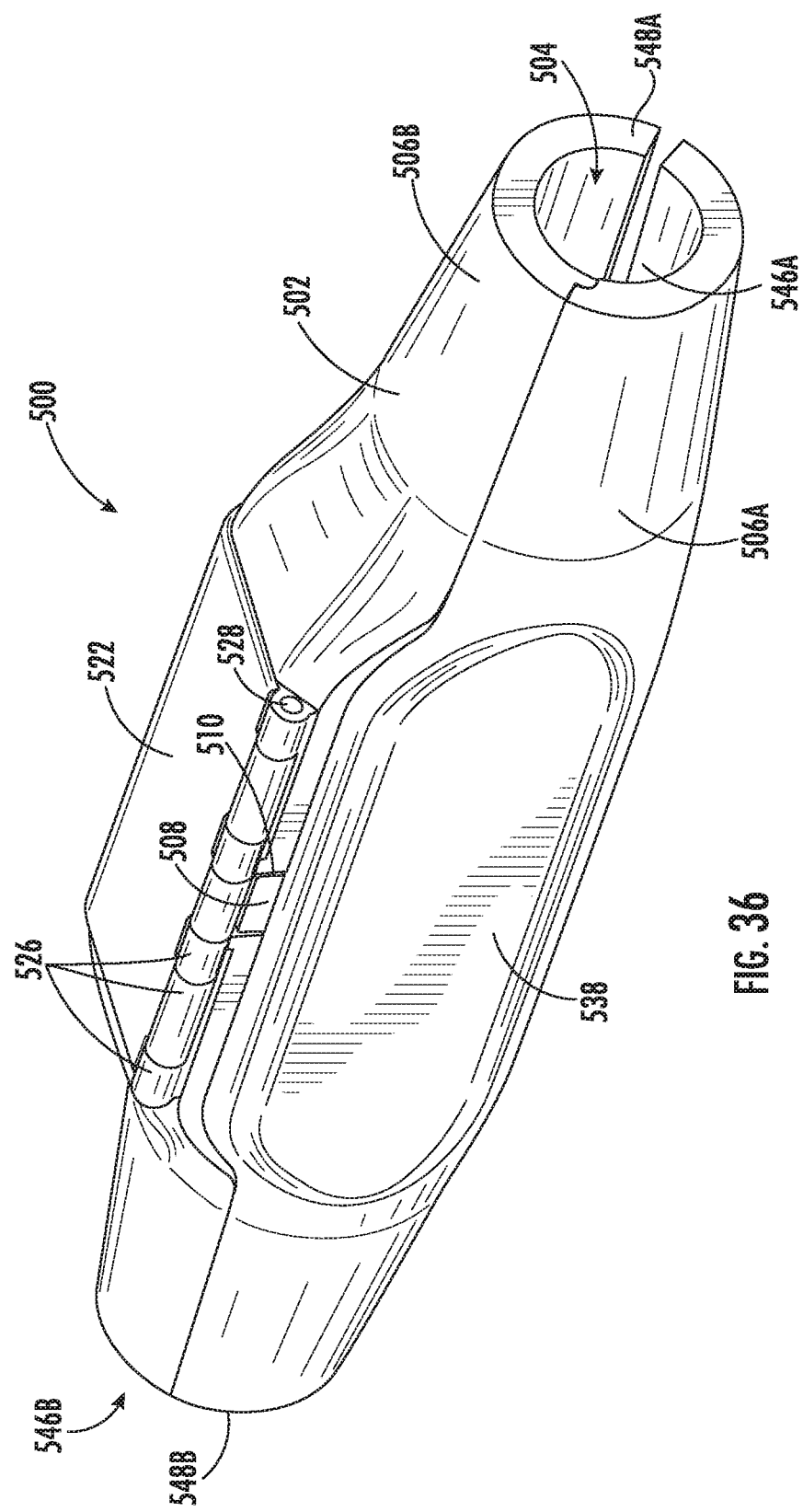
FIG. 36 shows a drawing of a different perspective view of the embodiment of the welding lead cable connector securing apparatus shown in FIGS. 33-35.
Figure 37:
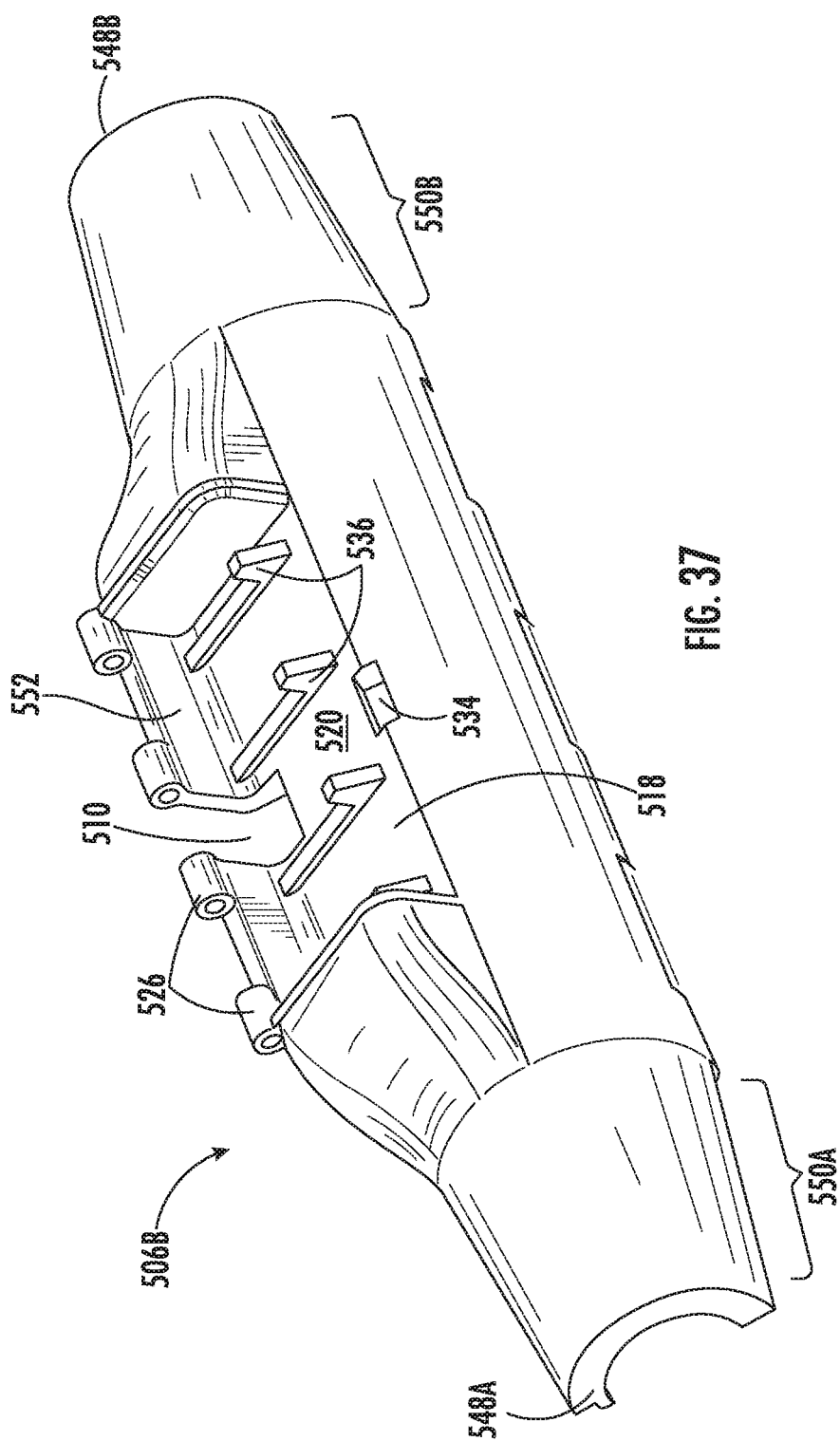
FIG. 37 shows a drawing of a perspective view of a second shell member which forms part of a shell of the embodiment of the welding lead cable connector securing apparatus shown in FIGS. 33-36.

FIG. 33 shows a perspective view of the welding lead cable connector securing apparatus 500 shown in the closed configuration with the lid 522 in the closed position. FIG. 34 shows a perspective view of the welding lead cable connector securing apparatus 500 shown in the closed configuration with the lid 522 in an open position, revealing the padlock 516. In a preferred embodiment, the second shell member 506B includes a plurality of padlock ridges 536 in the secondary cavity 518 for supporting and holding a padlock in place inside the secondary cavity 518. FIG. 35 shows an end view of the welding lead cable connector securing apparatus 500 shown in the closed configuration with the lid 522 in the closed position. FIG. 36 shows a different perspective view of the welding lead cable connector securing apparatus 500 shown in the closed configuration with the lid 522 in the closed position. In the preferred embodiment shown in FIG. 36 a substantially flat face 538 along a side of the outer surface of the first shell member 506A is shown. FIG. 37 shows a perspective view of a preferred embodiment of the second shell member 506B with the lid 522 removed. Finally, FIG. 38 shows a preferred embodiment of the first shell member 506A with the welding lead cable connectors 510 located therein.

The first shell member 506A is preferably hingedly attached to the second shell member 506B via a hinge joint 540. The hinge joint 540 preferably includes interconnected tubular hinge members 542 from the first shell member 506A and the second shell member 506B connected together using a pin 544 inserted therein. The shell 502 can be rotated about the hinge joint 540 from the closed configuration to an open configuration and vice versa so that welding lead cable connectors can be inserted into or removed from the shell 502. The welding lead cable connector securing apparatus 500 further includes a first shell aperture 546A along a first end 548A of the welding lead cable connector securing apparatus 500 and a second shell aperture 546B along a second end 548B of the welding lead cable connector securing apparatus 500. The primary cavity 504 is configured for holding a first welding lead cable connector 110A of a first welding lead cable 108A and a second welding lead cable connector 110B of a second welding lead cable 108B together in a manner wherein the first welding lead cable 108A extends out the first shell aperture 546A, the second welding lead cable 108B extends out the second shell aperture 546B, and the first welding lead cable 108A and the second welding lead cable 108B remain attached to one another so that electricity can flow from the first welding lead cable 108A to the second welding lead cable 108B.

The shell 502 preferably further includes a first tapered region 550A tapering down to the first end 548A of the welding lead cable connector securing apparatus 500 and a second tapered region 550B tapering down to the second end 548B of the welding lead cable connector securing apparatus 500. The tapering is so that the shell 502 fits the contour of welding lead cable connectors so that two welding lead cable connectors (110A and 110B) can be confined within the shell 502 when the shell 502 is in the closed configuration.

When the lid 522 is attached to the second shell member 506B, the shell member hole 510 is fully defined. The appendage 508 is sized and shaped to fit through the shell member hole 510. If a padlock 516 is locked to the appendage 508 through the appendage aperture 512, the size and presence of the padlock 516 located up against a secondary cavity interior wall 552 prevents the appendage 508 from releasing out of the shell member hole 510, thereby locking the shell 502 in the closed configuration with any welding lead connectors located therein confined and protected inside the shell 502.

In addition to the welding lead cable connector securing apparatus 500 described above, a method of locking two welding leads together inside a welding lead cable connector securing apparatus (such as, for example, the welding lead cable connector securing apparatus 500) is also disclosed. Such method includes a first step of attaching a first welding lead cable connector to a second welding lead cable connector to form combined welding lead cable connectors. A second step includes placing the combined welding lead cable connectors into a shell of a welding lead cable connector securing apparatus (such as, for example, the shell 502 described above). A third step includes closing the shell to a closed configuration wherein a primary cavity is defined inside the shell, wherein an appendage extends from the first shell member at least partially through a shell member hole in the second shell member when the shell is in the closed configuration, and wherein the appendage includes an appendage aperture through which a pivoted hook of a padlock can be inserted to lock and secure the welding lead cable connector securing apparatus in the closed configuration, thereby confining the combined welding lead cable connectors inside the shell. Additional steps may include inserting a pivoted hook of a padlock through the appendage aperture and locking the padlock, thereby locking the combined welding lead cable connectors inside the shell.

FIGS. 39-44 show a preferred embodiment of a welding lead cable connector securing apparatus 600 which includes a shell 602 defining a primary cavity 604 wherein the shell 602 further includes a first shell member 606A and a second shell member 606B. The apparatus 600 further includes an appendage 608 extending from the first shell member 606A. At least part of the appendage 608 extends through a shell member hole 610 in the second shell member 606B when the shell 602 is in a closed configuration shown, for example, in FIGS. 39-41. The appendage 608 includes an appendage aperture 612 through which a pivoted hook 514 of a padlock 516 can be inserted to lock and secure the welding lead cable connector securing apparatus 600 in the closed configuration as shown, for example, in FIG. 40. The padlock 516 is shown with dashed lines because, depending on the embodiment, a padlock does not necessarily form part of Applicant's invention. Padlocks are used in conjunction with embodiments of Applicant's invention and many different types of padlocks can be used to lock the welding lead cable connector securing apparatus 600 in the closed configuration.

Figure 43:
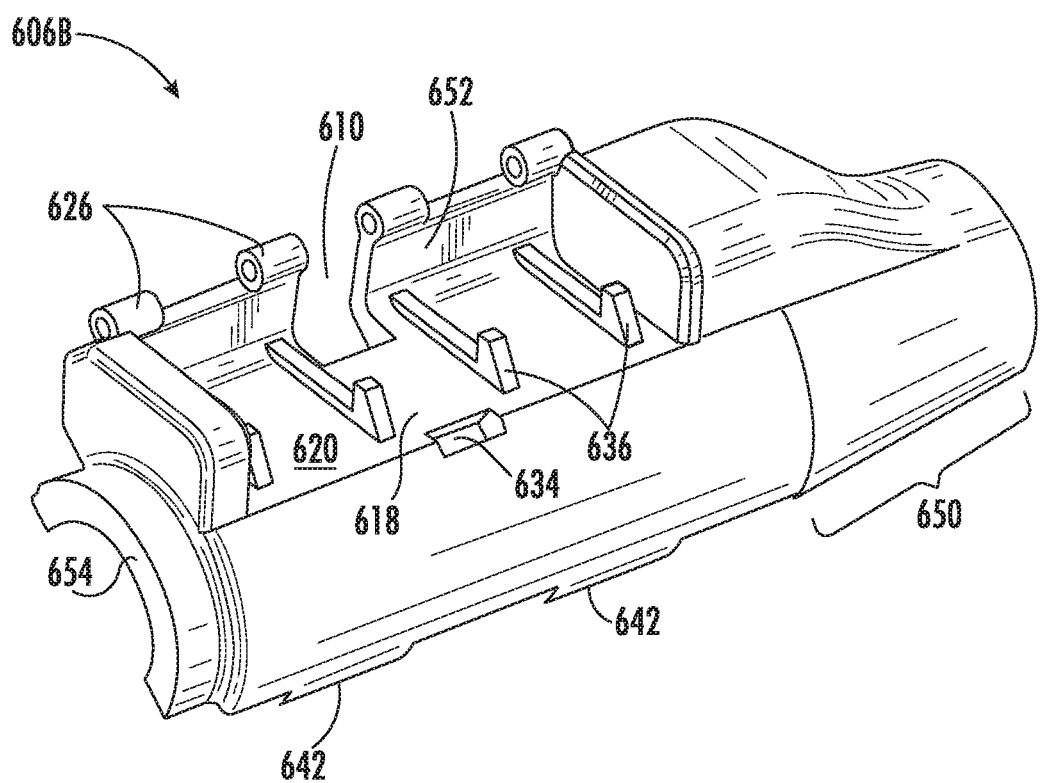
FIG. 43 shows a drawing of a perspective view of a second shell member which forms part of a shell of the embodiment of the welding lead cable connector securing apparatus shown in FIGS. 39-42.

If a welding lead cable connector 110A and a main body 614 of a welding machine terminal connector 616 are present inside the primary cavity 604 as shown for example in FIG. 43, such devices are effectively locked inside the shell 602 when the welding lead cable connector securing apparatus 600 is in the closed configuration, thereby confining and protecting the welding lead cable connector 110A and the main body 614 of the welding machine terminal connector 616. It is important to note that welding lead cable connectors and welding machine terminal connectors are not considered part of Applicant's claimed embodiments which is why they are shown with dashed lines. However, Applicant's embodiments are designed, shaped, and sized to house such devices.

The welding lead cable connector securing apparatus 600 preferably includes a secondary cavity 618 preferably along an outside surface 620 of the second shell member 606B. The secondary cavity 618 is shaped and configured to house a padlock such as the padlock 516 shown in FIG. 40. The welding lead cable connector securing apparatus 600 preferably further includes a lid 622 which is preferably hingedly attached to the second shell member 606B and which can be opened to an open position shown for example in FIG. 40 or a closed position as shown for example in FIG. 39. When in the closed position, the lid 622 preferably conceals the secondary cavity 618. The lid 622 is preferably attached to the second shell member 606B via a hinge joint 624 which preferably includes interconnected tubular hinge members 626 from the second shell member 606B and the lid 622 connected together using a pin 628 inserted therein. The lid 622 preferably includes an attachment extension 630 including an attachment ridge 632 which is configured to releasably snap into an attachment aperture 634 located in the second shell member 606B.

Figure 39:
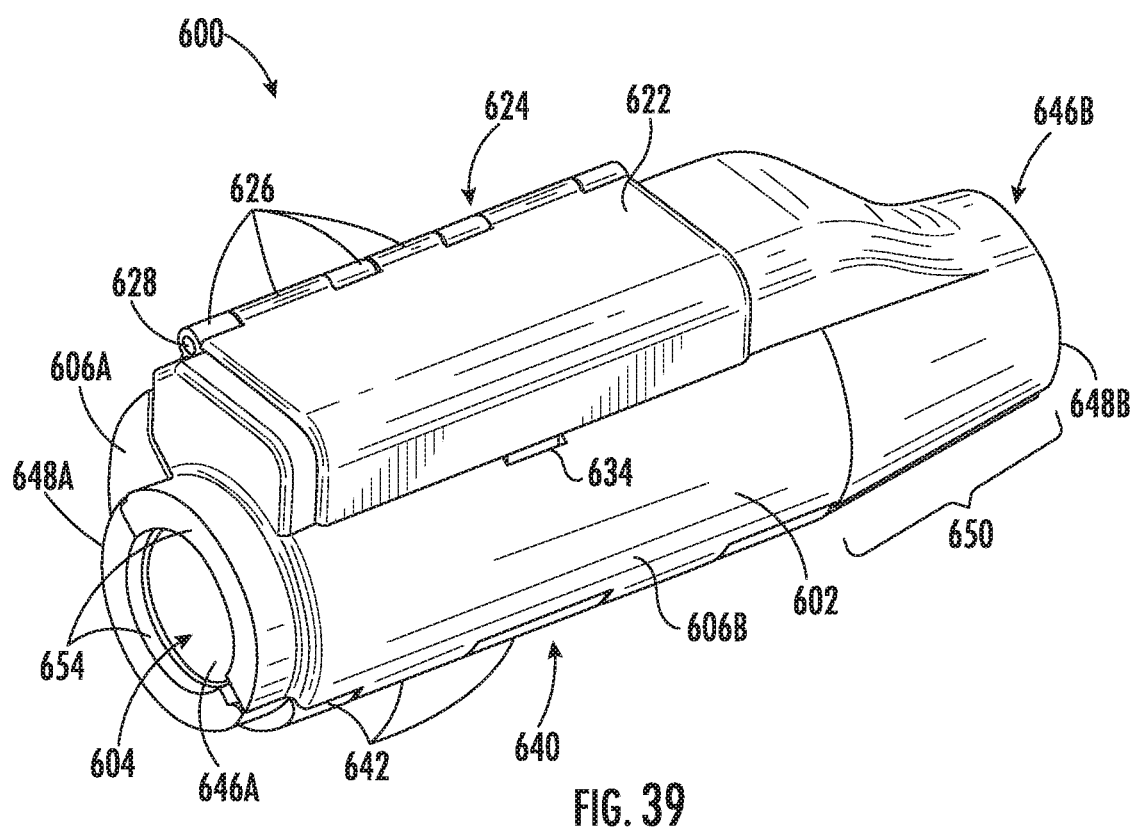
FIG. 39 shows a drawing of a perspective view of an embodiment of a welding lead cable connector securing apparatus shown in a closed configuration.
Figure 40:
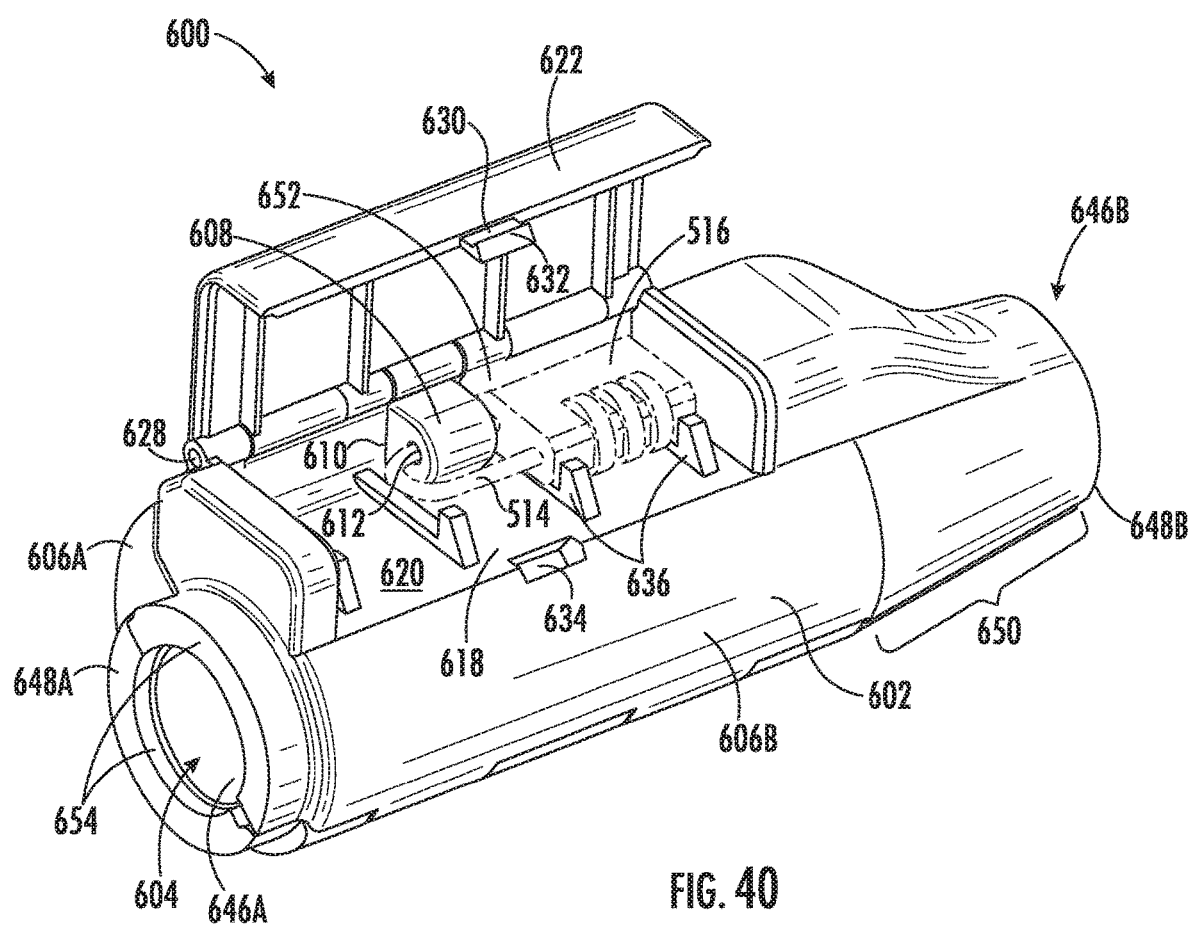
FIG. 40 shows a drawing of a perspective view of the embodiment of the welding lead cable connector securing apparatus shown in FIG. 39 wherein the apparatus includes a lid shown in an open position.
Figure 41:
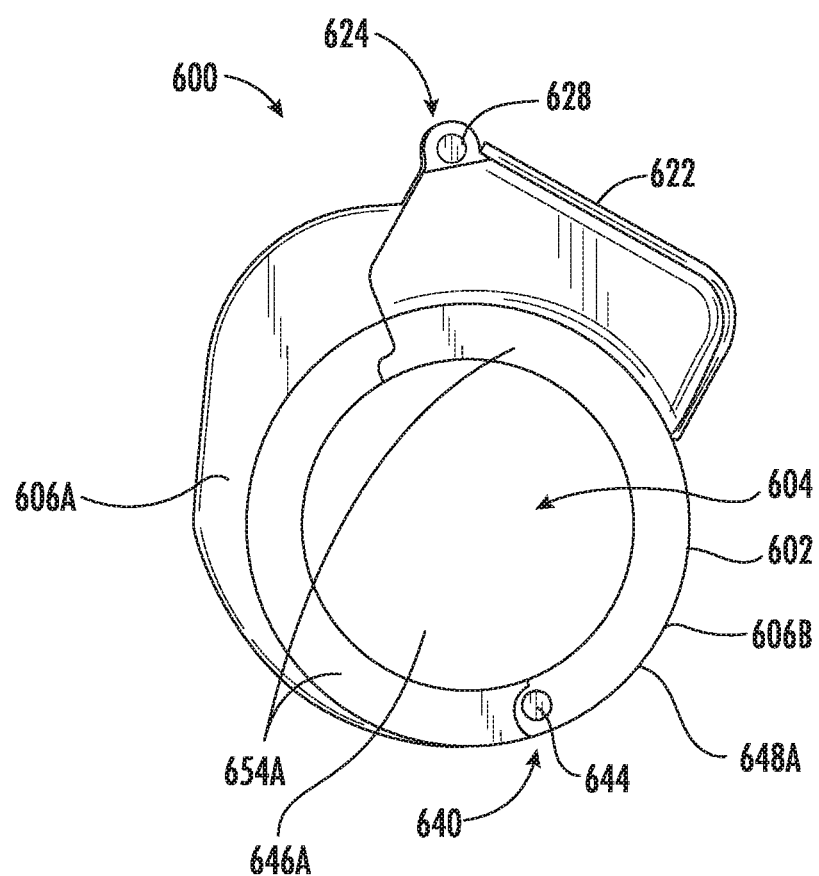
FIG. 41 shows a drawing of an end view of the embodiment of the welding lead cable connector securing apparatus shown in FIG. 39 and FIG. 40.
Figure 42:
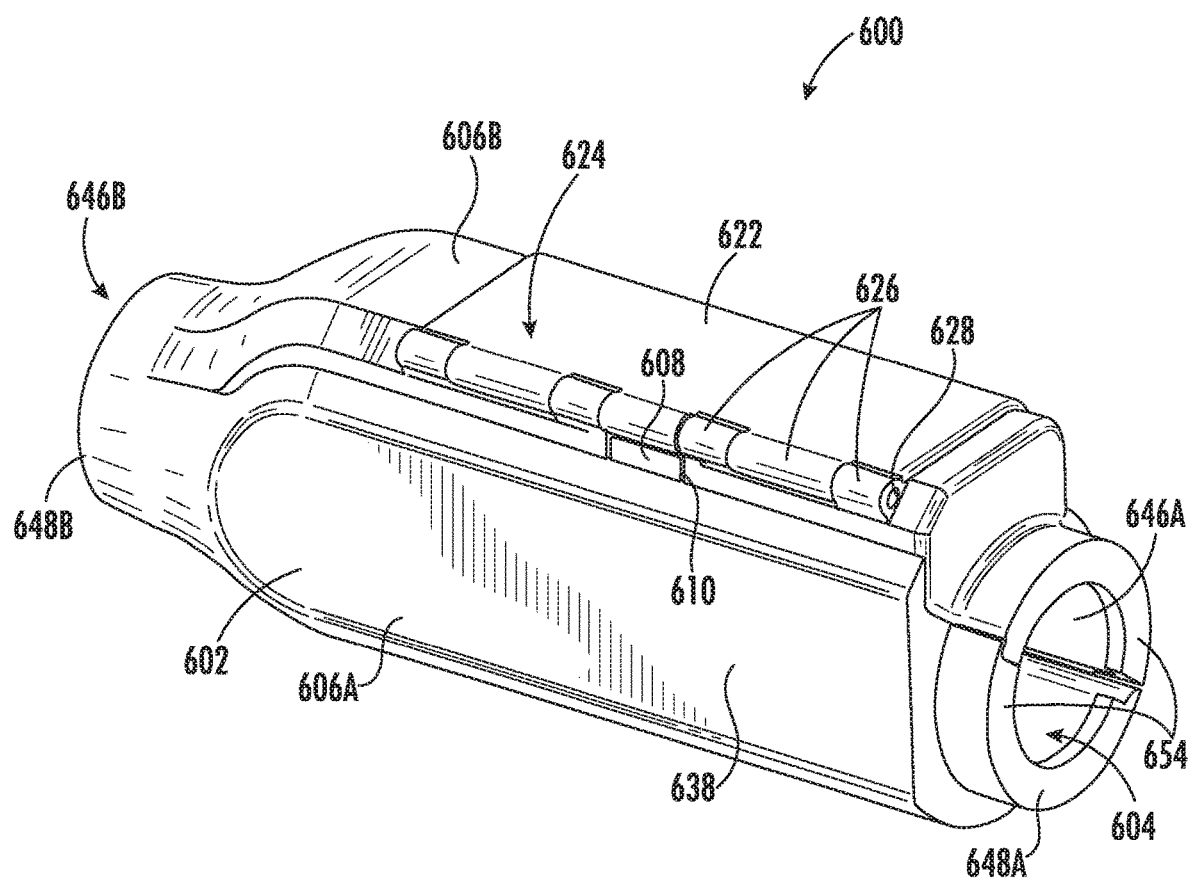
FIG. 42 shows a drawing of a different perspective view of the embodiment of the welding lead cable connector securing apparatus shown in FIGS. 39-41.
Figure 44:
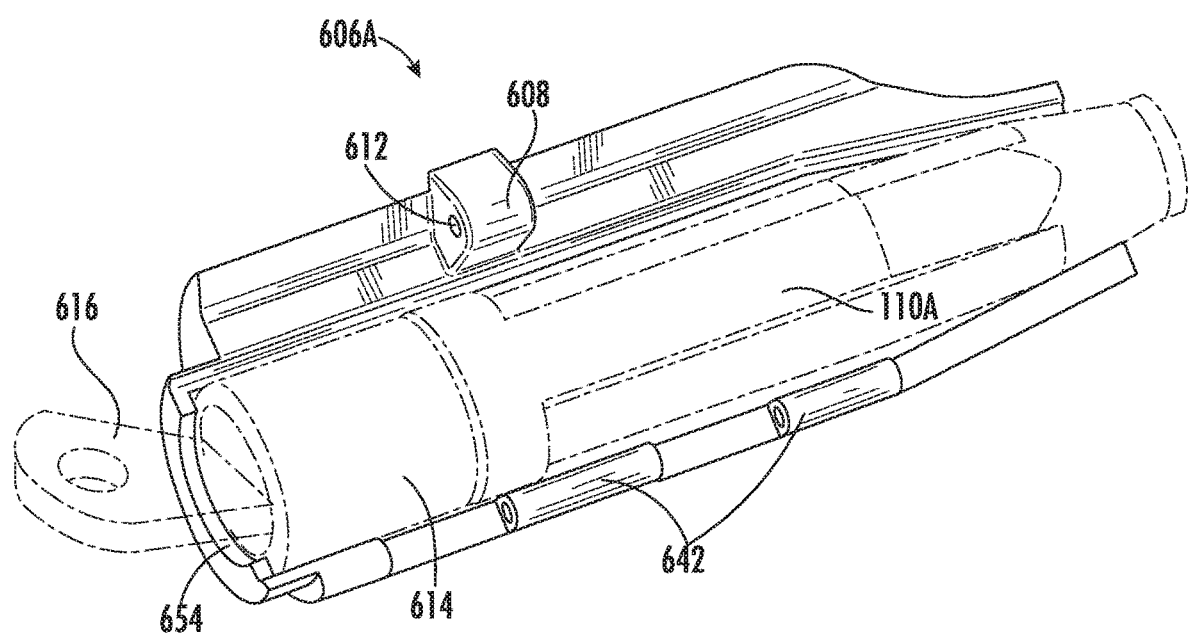
FIG. 44 shows a drawing of a perspective view of a first shell member which forms part of a shell of the embodiment of the welding lead cable connector securing apparatus shown in FIGS. 39-42 wherein a welding lead cable connector and welding machine terminal connector are shown in dashed lines attached together inside the first shell member.
Figure 45:
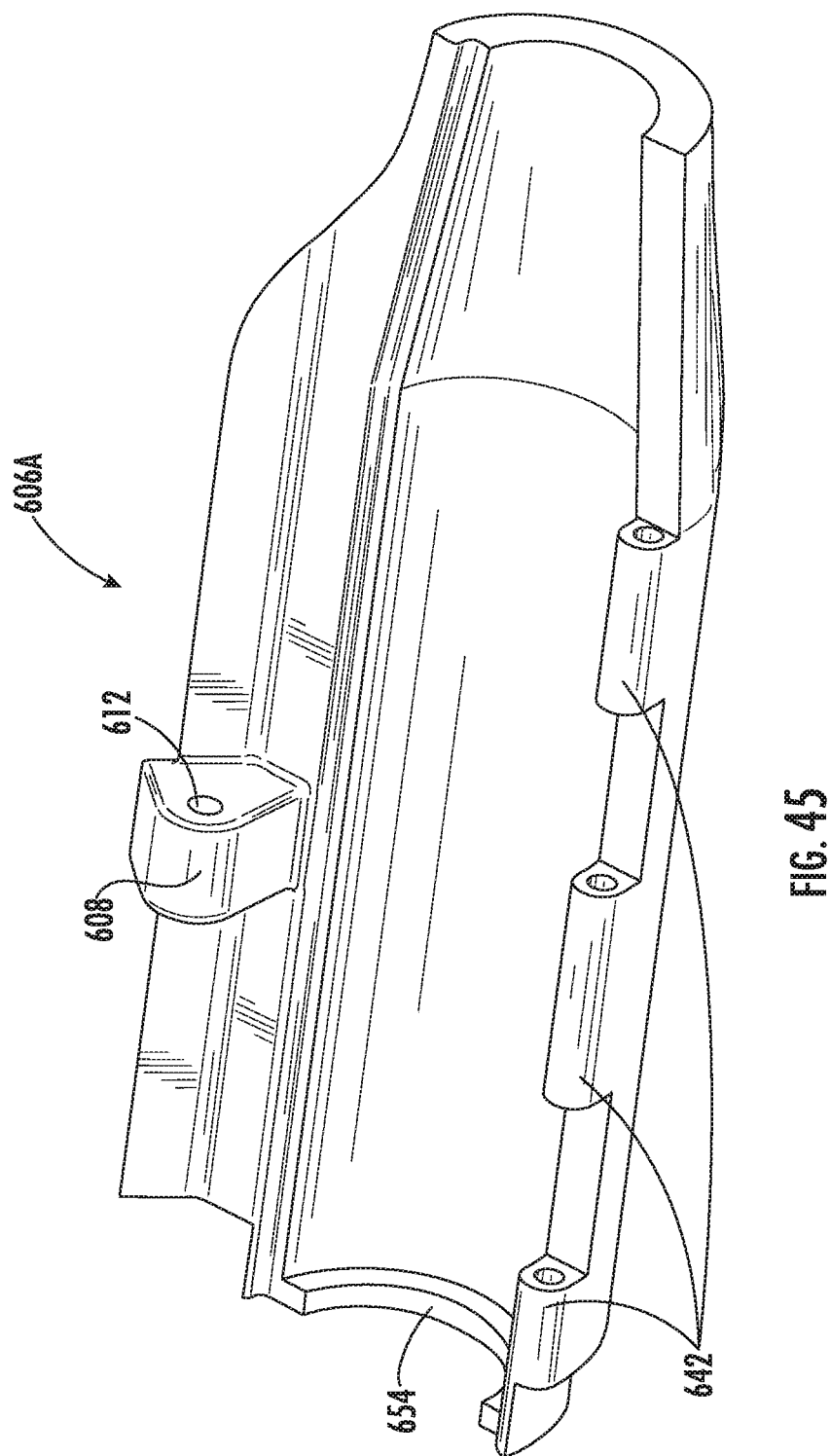
FIG. 45 shows a drawing of a perspective view of the first shell member shown in FIG. 44 but with the dashed line welding lead cable connector and welding machine terminal connector removed.
Figure 46:
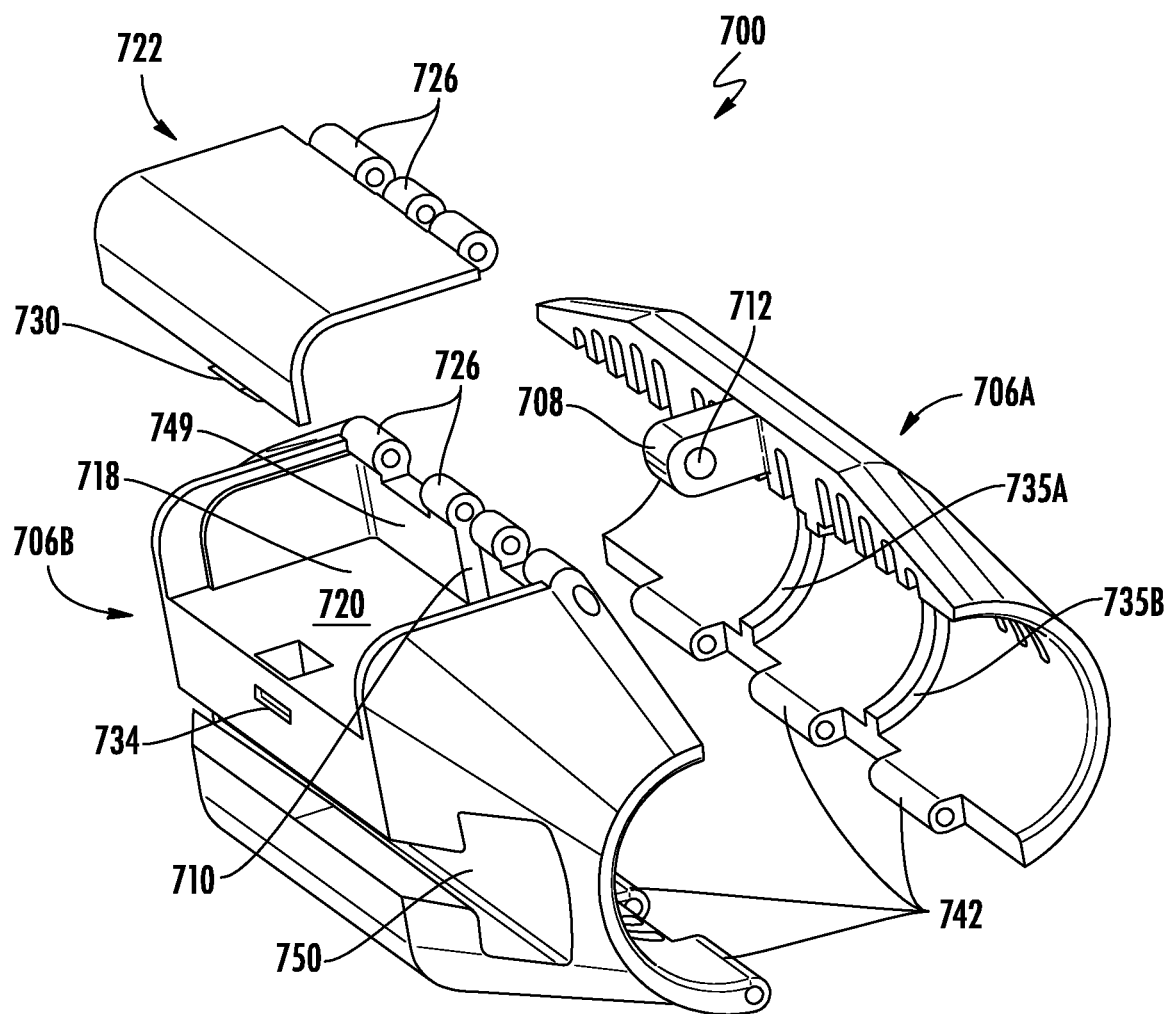
FIG. 46 shows a drawing of a partially exploded view of an air hose coupling securing apparatus.
Figure 47:
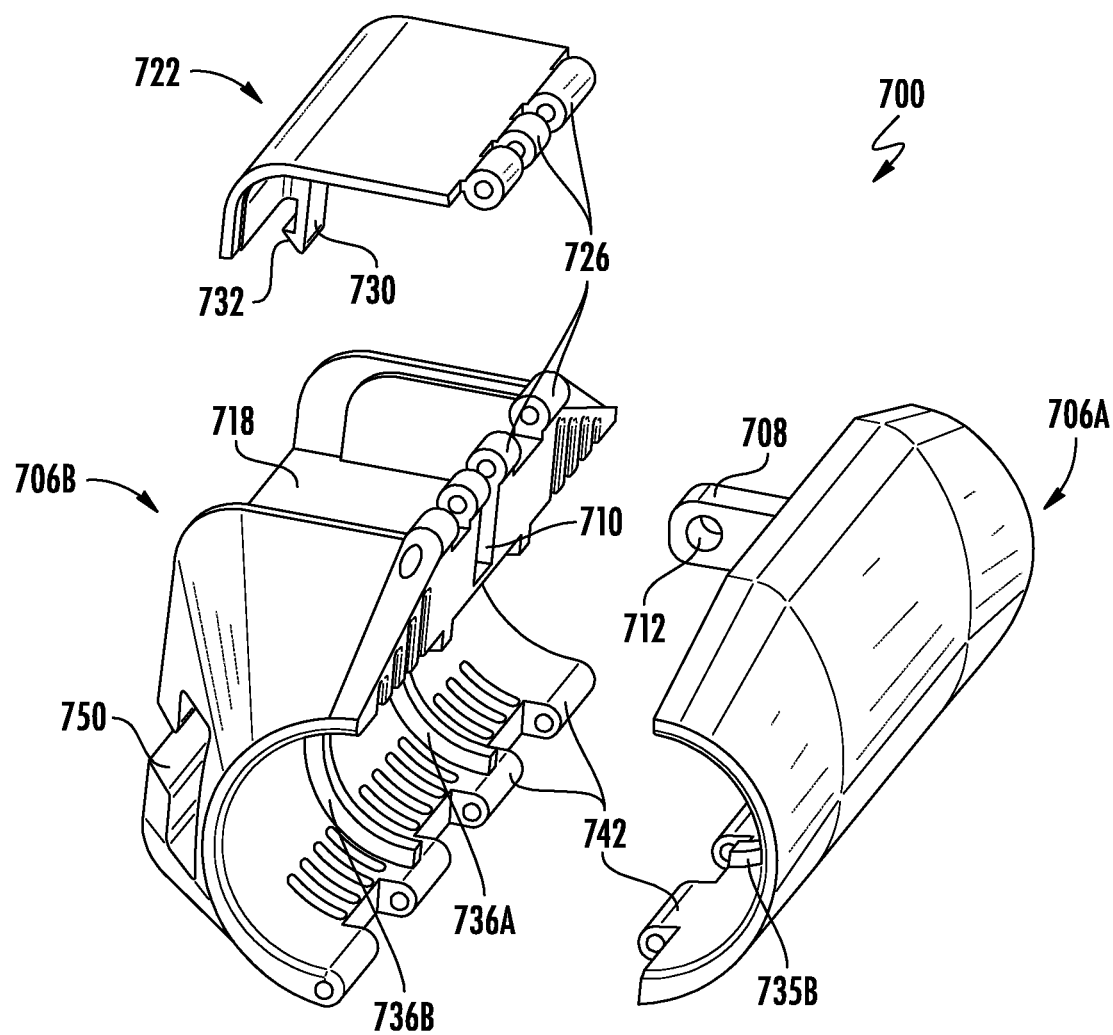
FIG. 47 shows a drawing of another partially exploded view of the air hose coupling securing apparatus shown in FIG. 46.
Figure 48:
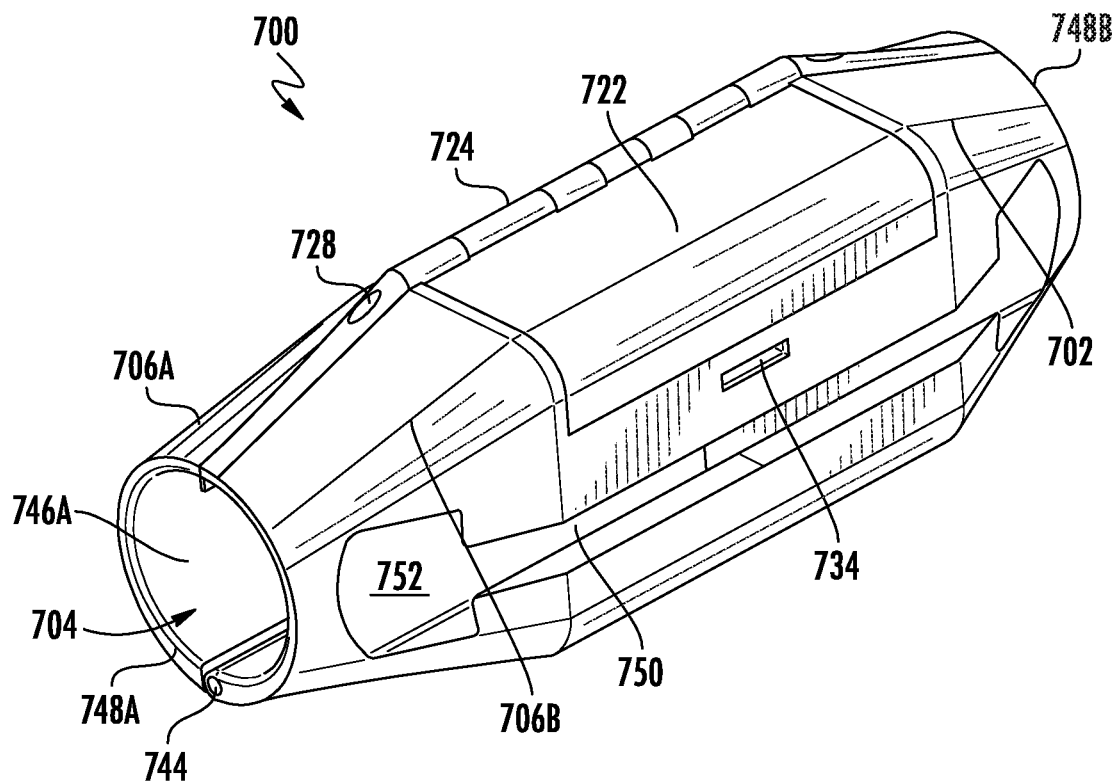
FIG. 48 shows a drawing of a perspective view of an air hose coupling securing apparatus wherein the air hose coupling securing apparatus is in a closed configuration.
Figure 49:
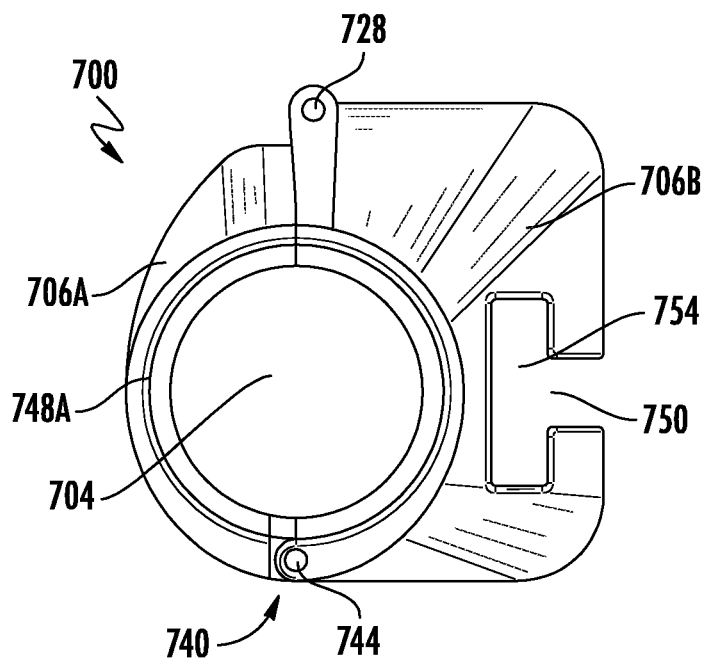
FIG. 49 shows a drawing of an end view of the air hose coupling securing apparatus shown in FIG. 48.
Figure 50:
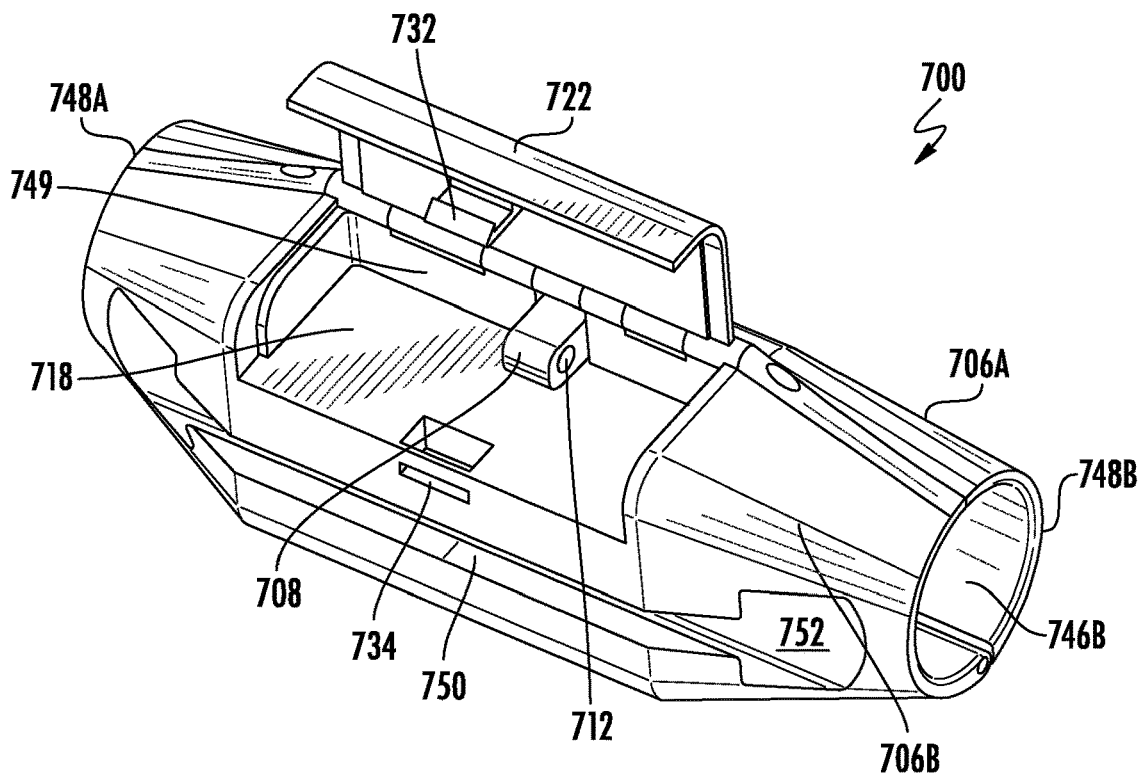
FIG. 50 shows a drawing of a perspective view of the air hose coupling securing apparatus shown in FIG. 49 including a lid shown in an open position.
Figure 51:
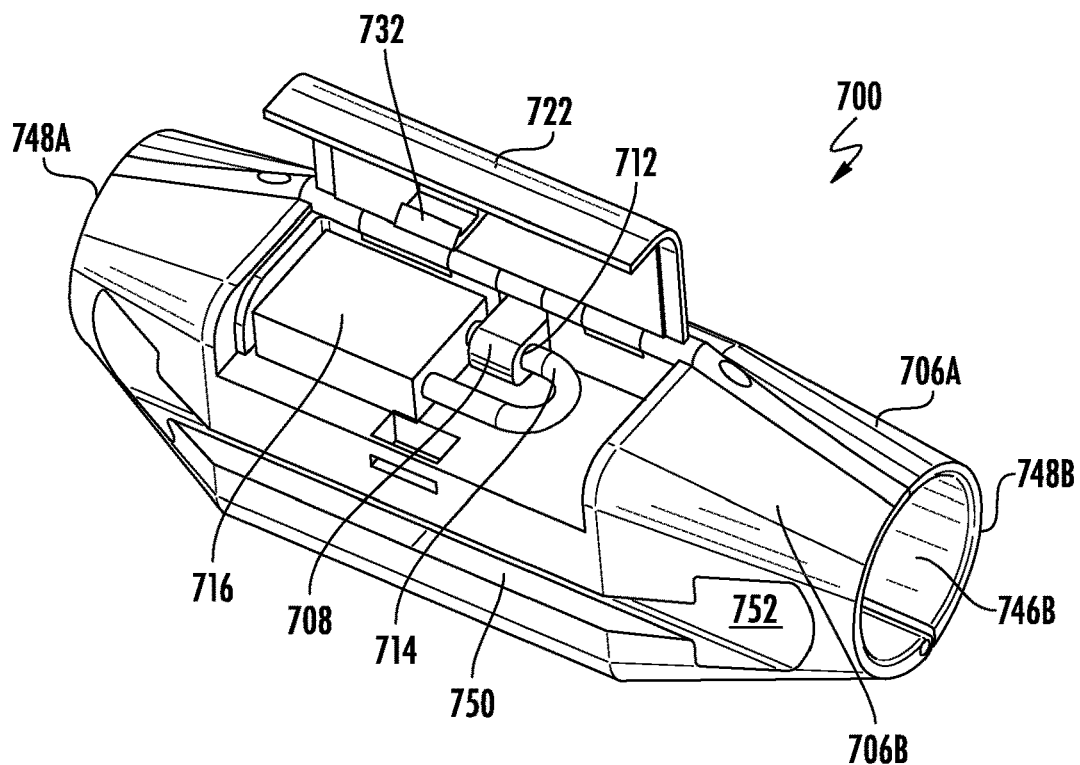
FIG. 51 shows a drawing of the perspective view of the air hose coupling securing apparatus shown in FIG. 50 further showing a padlock engaged with the air hose coupling securing apparatus, locking the air hose coupling securing apparatus in the closed configuration.
Figure 52:
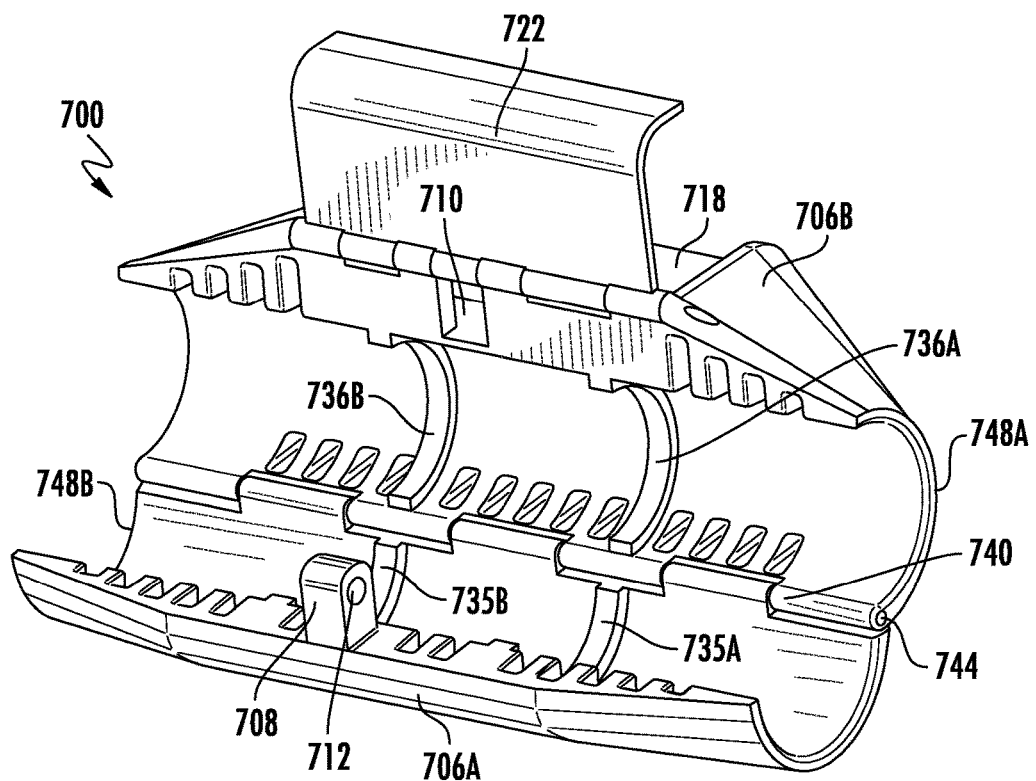
FIG. 52 shows a drawing of a perspective view of an air hose coupling securing apparatus in an open configuration including a lid in an open position.
Figure 53:
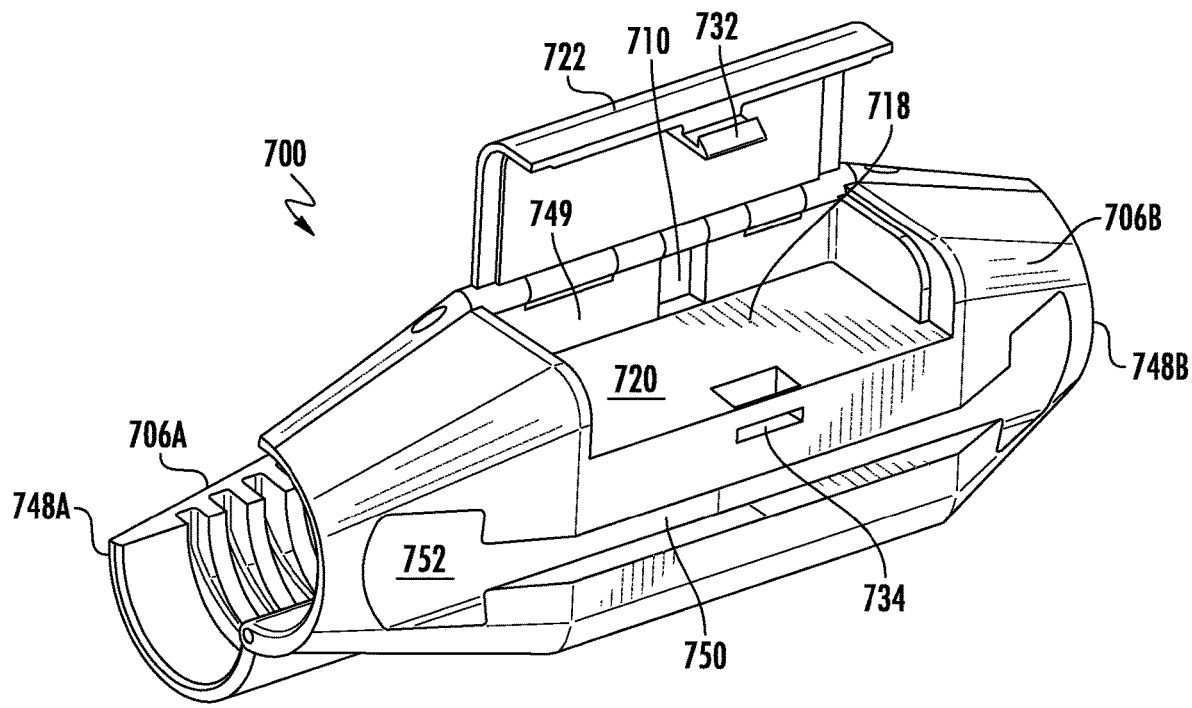
FIG. 53 shows a drawing of a different perspective view of the air hose coupling securing apparatus from FIG. 52 in an open configuration including a lid in an open position.

FIG. 39 shows a perspective view of the welding lead cable connector securing apparatus 600 shown in the closed configuration with the lid 622 in the closed position. FIG. 40 shows a perspective view of the welding lead cable connector securing apparatus 600 shown in the closed configuration with the lid 622 in an open position, revealing the padlock 516. In a preferred embodiment, the second shell member 606B includes a plurality of padlock ridges 636 in the secondary cavity 618 for supporting and holding a padlock in place inside the secondary cavity 618. FIG. 41 shows an end view of the welding lead cable connector securing apparatus shown in FIG. 39 and FIG. 40. FIG. 42 shows a different perspective view of the welding lead cable connector securing apparatus 600 shown in the closed configuration with the lid 622 in the closed position. In the preferred embodiment shown in FIG. 42 a substantially flat face 638 along a side of the outer surface of the first shell member 606A is shown. FIG. 43 shows a perspective view of a preferred embodiment of the second shell member 606B with the lid 622 removed. FIG. 44 shows a preferred embodiment of the first shell member 606A with the welding lead cable connector 108A and main body 614 of the welding machine terminal connector 616 located therein. FIG. 45 is the same view as FIG. 44 with the exception that the welding lead cable connector 108A and main body 614 of the welding machine terminal connector 616 have been removed.

The first shell member 606A is preferably hingedly attached to the second shell member 606B via a hinge joint 640. The hinge joint 640 preferably includes interconnected tubular hinge members 642 from the first shell member 606A and the second shell member 606B connected together using a pin 644 inserted therein. The shell 602 can be rotated about the hinge joint 640 from the closed configuration to an open configuration and vice versa so that welding lead cable connectors and welding machine terminal connectors can be inserted into or removed from the shell 602. The welding lead cable connector securing apparatus 600 further includes a first shell aperture 646A along a first end 648A of the welding lead cable connector securing apparatus 600 and a second shell aperture 646B along a second end 648B of the welding lead cable connector securing apparatus 500. The primary cavity 604 is configured for holding a first welding lead cable connector 110A of a first welding lead cable 108A and a main body 614 of a welding machine terminal connector 616 together in a manner wherein the first welding lead cable 108A extends out the second shell aperture 646B, the welding machine terminal connector 616 extends out the first shell aperture 646A, and the first welding lead cable 108A and the main body 614 of the welding machine terminal connector 616 remain attached to one another so that electricity can flow from one device to the other.

The shell 602 preferably further includes a tapered region 650 tapering down to the second end 648B of the welding lead cable connector securing apparatus 500. The tapering is so that the shell 602 fits the contour of welding lead cable connectors so that the welding lead cable connector 110A can be confined within the shell 602 when the shell 602 is in the closed configuration.

When the lid 622 is attached to the second shell member 606B, the shell member hole 610 is fully defined. The appendage 608 is sized and shaped to fit through the shell member hole 610. If a padlock 516 is locked to the appendage 608 through the appendage aperture 612, the size and presence of the padlock 516 located up against a secondary cavity interior wall 652 prevents the appendage 608 from releasing out of the shell member hole 610, thereby locking the shell 602 in the closed configuration with any welding lead connectors located therein confined and protected inside the shell 602.

In order to confine a main body 614 of a welding machine terminal connector 616 in the shell 602 when the shell 602 is in the closed configuration, the welding lead cable connector securing apparatus 600 further includes an inward facing ridge 654 defining the first shell aperture 646A. Because many if not all main bodies of welding machine terminal connectors would be wider than the first shell aperture 646A, such main bodies of welding machine terminal connectors would be prevented from escaping the primary cavity 604 when the shell 602 is in the closed configuration.

In addition to the welding lead cable connector securing apparatus 600 described above, a method of locking together a welding lead cable connector and a main body of a welding machine terminal connector inside a welding lead cable connector securing apparatus (such as, for example, the welding lead cable connector securing apparatus 600) is also disclosed. Such method includes a first step of attaching a welding lead cable connector to a main body of a welding machine terminal connector to form a combined welding lead cable connector and main body of a welding machine terminal connector. A second step includes placing the combined welding lead cable connector and main body of a welding machine terminal connector into a shell of a welding lead cable connector securing apparatus, the shell including a first shell member hingedly attached to a second shell member (such as, for example, the shell 602 described above). A third step includes closing the shell to a closed configuration wherein a primary cavity is defined inside the shell, wherein an appendage extends from the first shell member at least partially through a shell member hole in the second shell member when the shell is in the closed configuration, and wherein the appendage includes an appendage aperture through which a pivoted hook of a padlock can be inserted to lock and secure the welding lead cable connector securing apparatus in a closed configuration, thereby confining the combined welding lead cable connector and main body of a welding machine terminal connector inside the shell. Additional steps may include inserting a pivoted hook of a padlock through the appendage aperture and locking the padlock, thereby locking the combined welding lead cable connector and main body of a welding machine terminal connector inside the shell.

Figure 32:
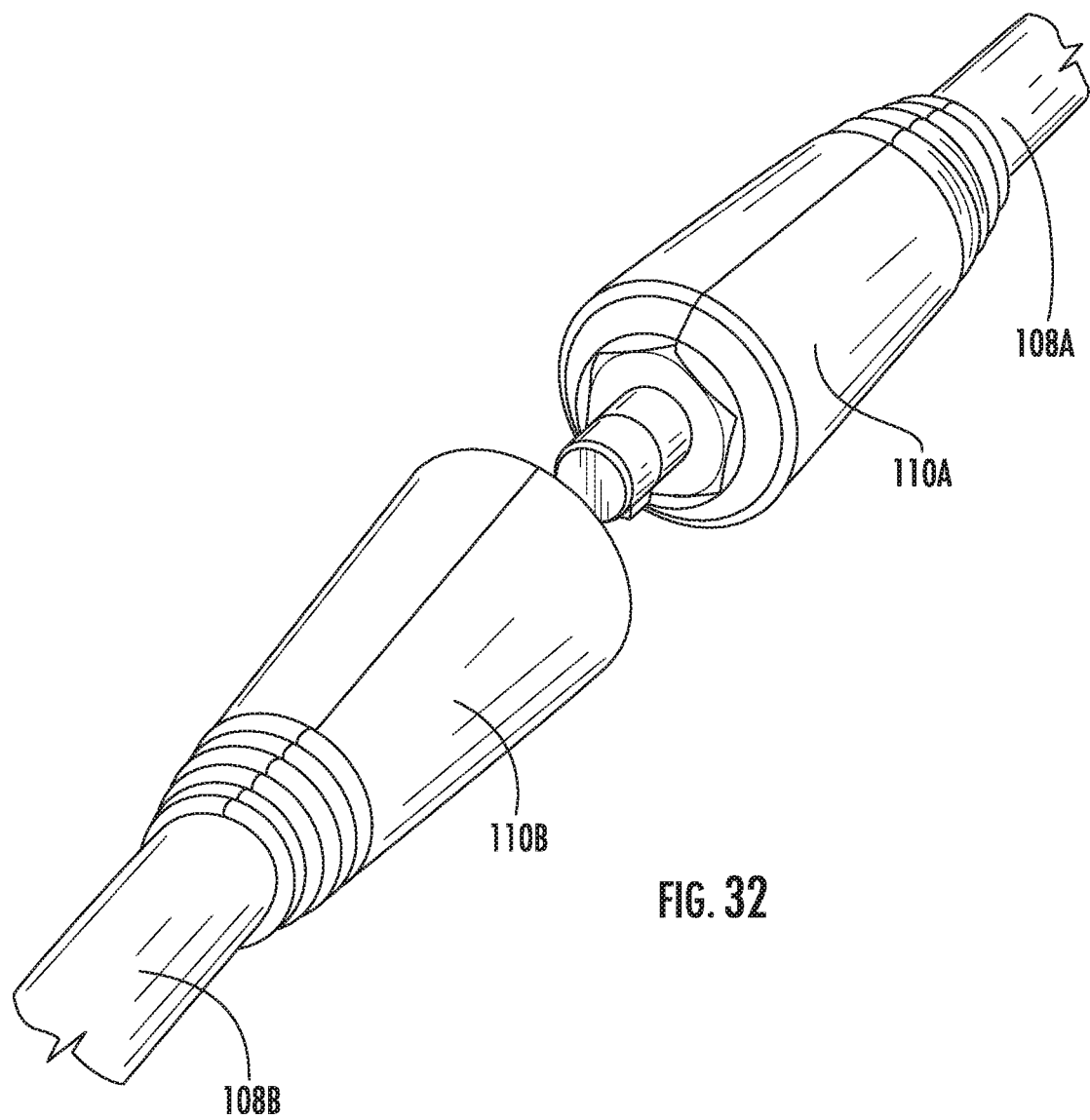
FIG. 32 shows a drawing of a first cable connector of a first welding lead attached to a second cable connector of a second welding lead.

The previously described embodiments of the present disclosure have many advantages. FIG. 32 shows the first welding lead 108A attached to the second welding lead 108B without use of a welding lead cable connector holding apparatus. Without a welding lead cable connector holding/securing apparatus, such welding leads 108 can be easily completely or partially disengaged, prone to exposure of electrical current outside the device (electrocution risk), and easily stolen. The locking of the first shell member to the second shell member in various embodiments disclosed herein secures welding lead cable connectors inside the shell of a welding lead cable connector holding/securing apparatus, thereby preventing many of these drawbacks. Additionally, in certain embodiments, the ratchet track (152 or 246) allows for the shell members (106 or 206) to be tightened or loosened from one another intermittently as needed based on the size of welding lead cable connectors and other factors.

FIGS. 46-54 show a preferred embodiment of an air hose coupling securing apparatus 700 for securing an air hose coupling to another air hose coupling wherein the air hose coupling securing apparatus 700 includes a shell 702 defining a primary cavity 704 wherein the shell 702 further includes a first shell member 706A and a second shell member 706B. The apparatus 700 further includes an appendage 708 extending from the first shell member 706A. At least part of the appendage 708 extends through a shell member hole 710 in the second shell member 706B when the shell 702 is in a closed configuration shown, for example, in FIG. 48 and FIG. 49. The appendage 708 includes an appendage aperture 712 through which a pivoted hook 714 of a padlock 716 can be inserted to lock and secure the air hose coupling securing apparatus 700 in the closed configuration as shown, for example, in FIG. 51. Depending on the embodiment, a padlock does not necessarily form part of Applicant's invention and could be purchased separately. Padlocks are used in conjunction with embodiments of Applicant's invention and many different types of padlocks can be used to lock the air hose coupling securing apparatus 700 in the closed configuration.

Figure 54:
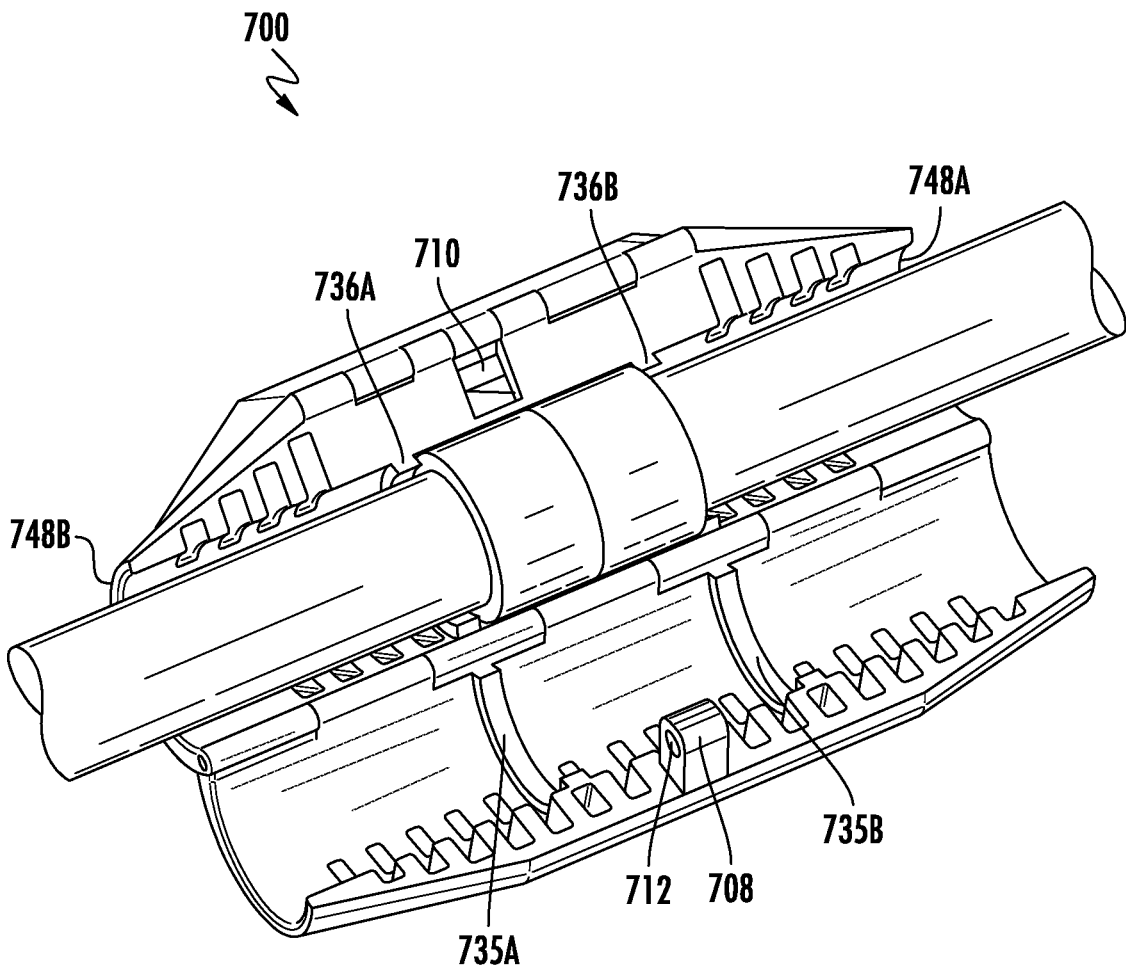
FIG. 54 shows a drawing of a perspective view of an air hose coupling securing apparatus in an open configuration further showing a first air hose coupling attached to a second air hose coupling inside the air hose coupling securing apparatus.
Figure 55:
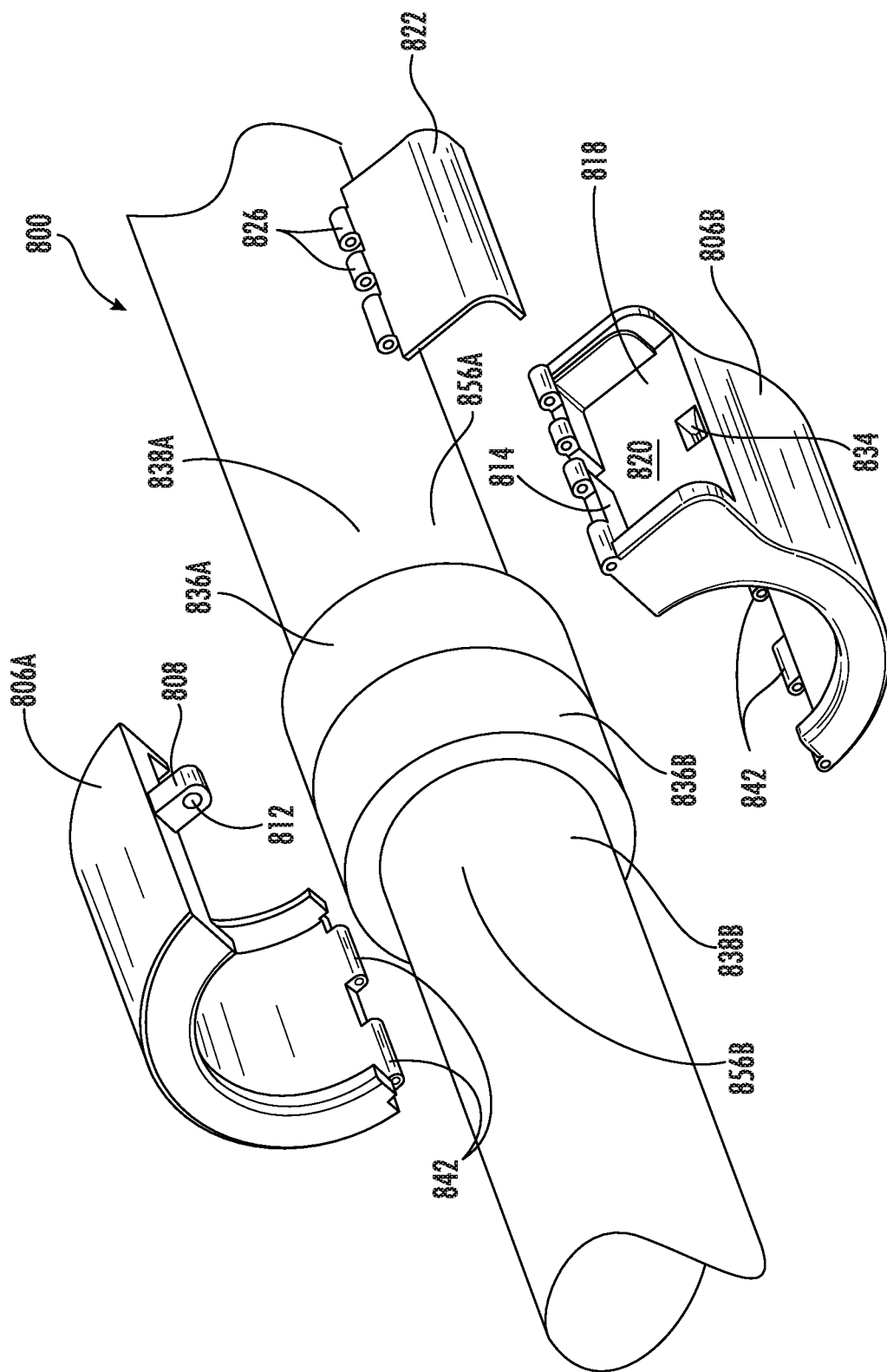
FIG. 55 shows an exploded view of an electrical connector securing apparatus centered around a pair of 480 volt three phase power cords and associated connectors.

If air hose couplings are present inside the primary cavity 704 as shown for example in FIG. 54, such air hose couplings are effectively locked inside the shell 702 when the air hose coupling securing apparatus 700 is in the closed configuration, thereby confining and protecting the associated air hose couplings. Applicant's embodiments can be designed, shaped, and sized to house various types and sizes of air hose couplings which are attached to one another. If the air hose couplings are attached to air hoses, respectively, then the two air hoses can be effectively secured together using the air hose coupling securing apparatus 700.

The air hose coupling securing apparatus 700 preferably includes a secondary cavity 718 preferably along an outside surface 720 of the second shell member 706B. The secondary cavity 718 is shaped and configured to house a padlock such as the padlock 716 shown in FIG. 51. The air hose coupling securing apparatus 700 preferably further includes a lid 722 which is preferably hingedly attached to the second shell member 706B and which can be opened to an open position shown for example in FIG. 50, FIG. 51, and FIG. 53 or a closed position as shown for example in FIG. 48 and FIG. 49. When in the closed position, the lid 722 conceals the secondary cavity 718. The lid 722 is preferably attached to the second shell member 706B via a hinge joint 724 which preferably includes interconnected tubular hinge members 726 from the second shell member 706B and the lid 722 connected together using a pin 728 inserted therein. The lid 722 preferably includes an attachment extension 730 including an attachment ridge 732 which is configured to releasably snap into an attachment aperture 734 located in the second shell member 706B.

With reference to FIG. 46, FIG. 47, FIG. 52, FIG. 54, the inside surface (facing the primary cavity 704 when the shell 702 is in the closed configuration) of the first shell member 706A preferably includes a first shell member first ridge 735A and a first shell member second ridge 735B. Similarly, the inside surface (facing the primary cavity 704 when in the shell 702 is in the closed configuration) of the second shell member 706B preferably includes a second shell member first ridge 736A and a second shell member second ridge 736B. The first shell member ridges 735 and the second shell member ridges 736 block and prevent air hose couplings from escaping the shell 702 when the air hose coupling securing apparatus 700 is in the closed configuration, thereby securing a pair of air hose couplings inside the shell 702. The air hose coupling securing apparatus 700 can be locked by inserting a lock through the shell member hole 710 when the air hose coupling securing apparatus 700 is in the closed configuration as shown, for example, in FIG. 51. By locking the air hose coupling securing apparatus 700 while air hose couplings are inside the shell 702, such air hose couplings are locked inside the shell 702. If the locked air hose couplings are attached to air hoses, the air hoses are effectively locked together.

The first shell member 706A is preferably hingedly attached to the second shell member 706B via a hinge joint 740. The hinge joint 740 preferably includes interconnected tubular hinge members 742 from the first shell member 706A and the second shell member 706B connected together using a pin 744 inserted therein. The shell 702 can be rotated about the hinge joint 740 from the closed configuration (see e.g., FIG. 48) to an open configuration (see e.g., FIG. 52) and vice versa so that air hoses and associated air hose couplings can be inserted into or removed from the shell 702. The air hose coupling securing apparatus 700 further includes a first shell aperture 746A along a first end 748A of the air hose coupling securing apparatus 700 and a second shell aperture 746B along a second end 748B of the air hose coupling securing apparatus 700. As shown in FIG. 54, the primary cavity 704 is configured for holding together a first air hose coupling attached to a first air hose and a second air hose coupling attached to a second air hose in a manner wherein the first air hose extends out the first shell aperture 746A, the second air hose extends out the second shell aperture 746B, and the first air hose and the second air hose remain attached to one another via the air hose couplings so that air can flow from the first air hose to the second air hose.

The appendage 708 is sized and shaped to fit through the shell member hole 710. If a padlock 716 is locked to the appendage 708 through the appendage aperture 712, the size and presence of the padlock 716 located up against a secondary cavity interior wall 749 prevents the appendage 708 from releasing out of the shell member hole 710, thereby locking the shell 702 in the closed configuration with any air hose couplings located therein confined and protected inside the shell 702.

The air hose coupling securing apparatus 700 also preferably includes a channel 750 which runs along at least a portion of an outer surface 752 of the second shell member 706B. The channel 750 preferably includes an enlarged zone 754. The channel 750 can be used to house at least part of a whip check safety device known to persons having ordinary skill in the art for preventing or minimizing injury if a connection between air hose couplings is unexpectedly lost for any reason.

In addition to the air hose coupling securing apparatus 700 described above, a method of locking two air hose couplings together inside an air hose coupling securing apparatus (such as, for example, the air hose coupling securing apparatus 700) is also disclosed. Such method includes a first step of attaching a first air hose coupling to a second air hose coupling to form combined air hose couplings. A second step includes placing the combined air hose couplings into a shell of an air hose coupling securing apparatus (such as, for example, the shell 702 described above). A third step includes closing the shell to a closed configuration wherein a primary cavity is defined inside the shell, wherein an appendage extends from the first shell member at least partially through a shell member hole in the second shell member when the shell is in the closed configuration, and wherein the appendage includes an appendage aperture through which, for example, a pivoted hook of a padlock can be inserted to lock and secure the air hose coupling securing apparatus in the closed configuration, thereby confining the combined air hose couplings inside the shell. Additional steps may include inserting a pivoted hook of a padlock through the appendage aperture and locking the padlock, thereby locking the combined air hose couplings inside the shell.

In addition to welding lead cable connectors which are one type of electrical connector described above, 480 volt three phase power cords and associated connectors also pose challenges for safety and security. One apparatus to address this is an electrical connector securing apparatus 800 shown in FIGS. 55-63. The electrical connector securing apparatus 800 includes a shell 802 defining a primary cavity 804 wherein the shell 802 further includes a first shell member 806A and a second shell member 806B. The apparatus 800 further includes an appendage 808 extending from the first shell member 806A. At least part of the appendage 808 extends through a shell member hole 810 in the second shell member 806B when the shell 802 is in a closed configuration shown, for example, in FIG. 57 and FIG. 58. The appendage 808 includes an appendage aperture 812 through which a pivoted hook 514 of a padlock 516 can be inserted to lock and secure the welding lead cable connector securing apparatus 800 in the closed configuration as shown, for example, in FIG. 56. Depending on the embodiment, a padlock does not necessarily form part of Applicant's invention but one is shown here for reference. Padlocks are used in conjunction with embodiments of Applicant's invention and many different types of padlocks can be used to lock the electrical connector securing apparatus 800 in the closed configuration.

The electrical connector securing apparatus 800 preferably includes a secondary cavity 818 preferably along an outside surface 820 of the second shell member 806B. The secondary cavity 818 is shaped and configured to house a padlock such as the padlock 516 shown in FIG. 56. The electrical connector securing apparatus 800 preferably further includes a lid 822 which is preferably hingedly attached to the second shell member 806B and which can be opened to an open position shown for example in FIG. 56 and FIGS. 60-63 or a closed position as shown for example in FIG. 57, FIG. 58 and FIG. 59. When in the closed position, the lid 822 preferably conceals the secondary cavity 818. The lid 822 is preferably attached to the second shell member 806B via a hinge joint 824 which preferably includes interconnected tubular hinge members 826 from the second shell member 806B and the lid 822 connected together using a pin 828 inserted therein. The lid 822 preferably includes an attachment extension 830 including an attachment ridge 832 which is configured to releasably snap into an attachment aperture 834 located in the second shell member 806B.

When the lid 822 is attached to the second shell member 806B, the shell member hole 810 is fully defined. The appendage 808 is sized and shaped to fit through the shell member hole 810. If a padlock 516 is locked to the appendage 808 through the appendage aperture 812, the size and presence of the padlock 516 located up against a secondary cavity interior wall 814 prevents the appendage 808 from releasing out of the shell member hole 810, thereby locking the shell 802 in the closed configuration with any electrical connectors located therein confined and protected inside the shell 802.

Figure 56:
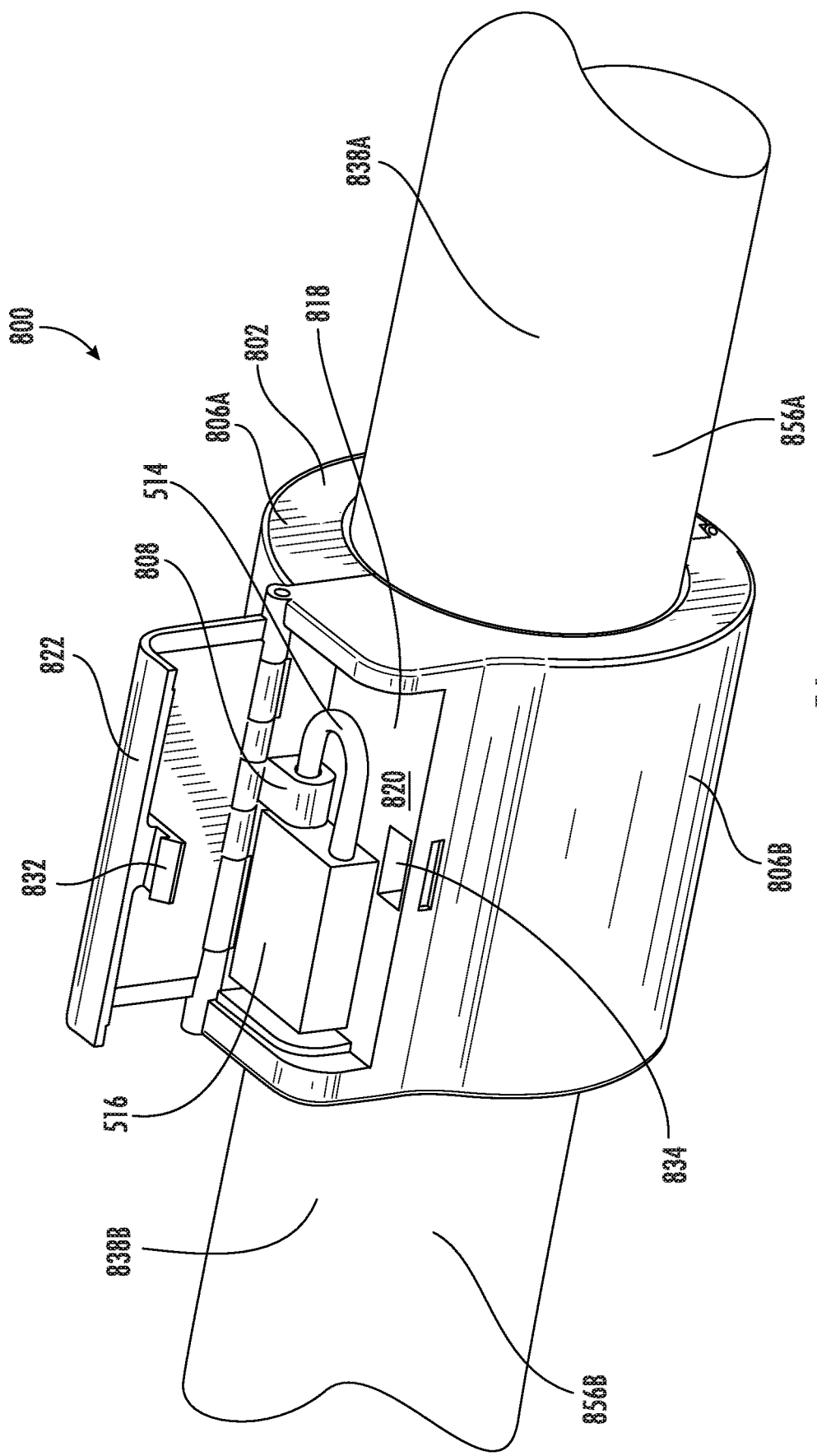
FIG. 56 shows a perspective view of an assembled electrical connector securing apparatus from FIG. 55 including a lid in an open position and with a 480 volt three phase power cord extending out of one end of the electrical connector securing apparatus.
Figure 57:
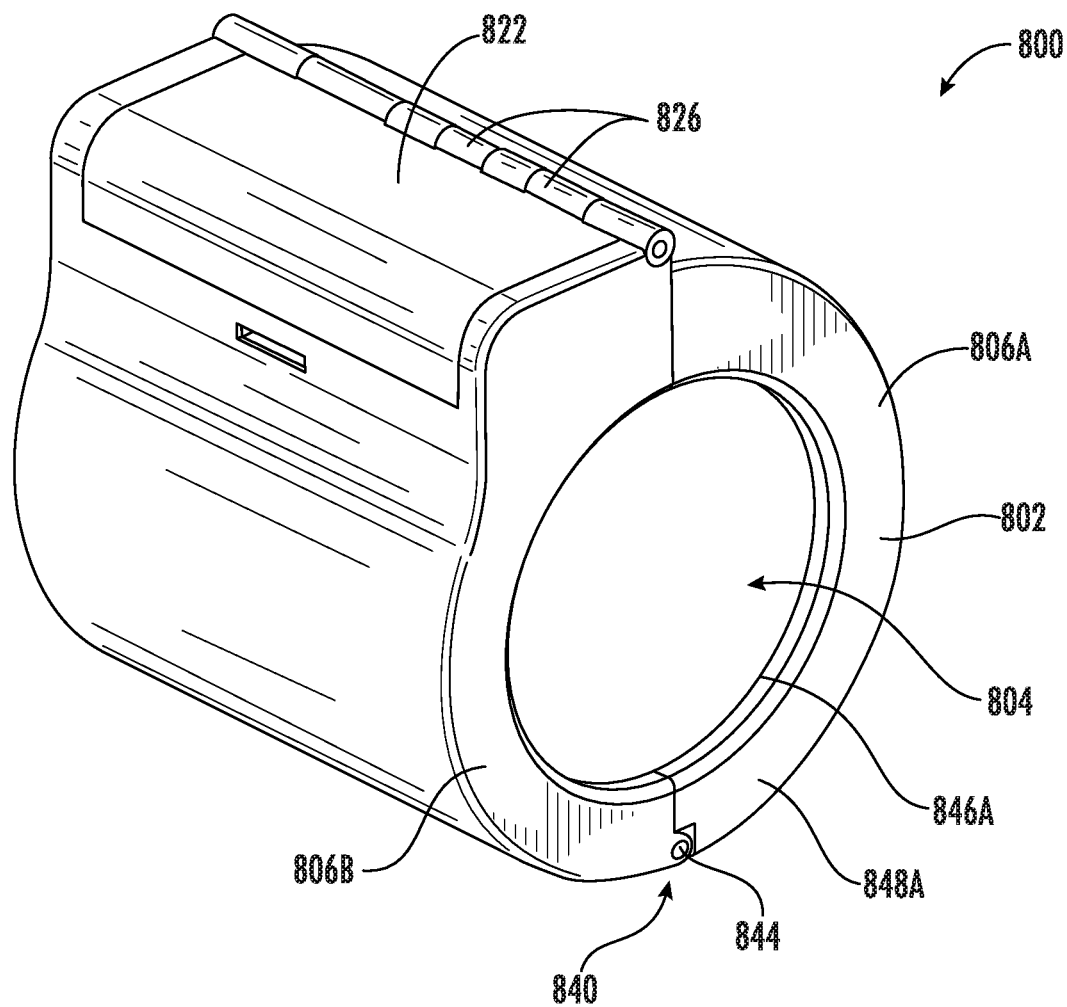
FIG. 57 shows a perspective view of the electrical connector securing apparatus from FIG. 56 showing the lid in a closed position and showing a shell in a closed configuration.
Figure 58:
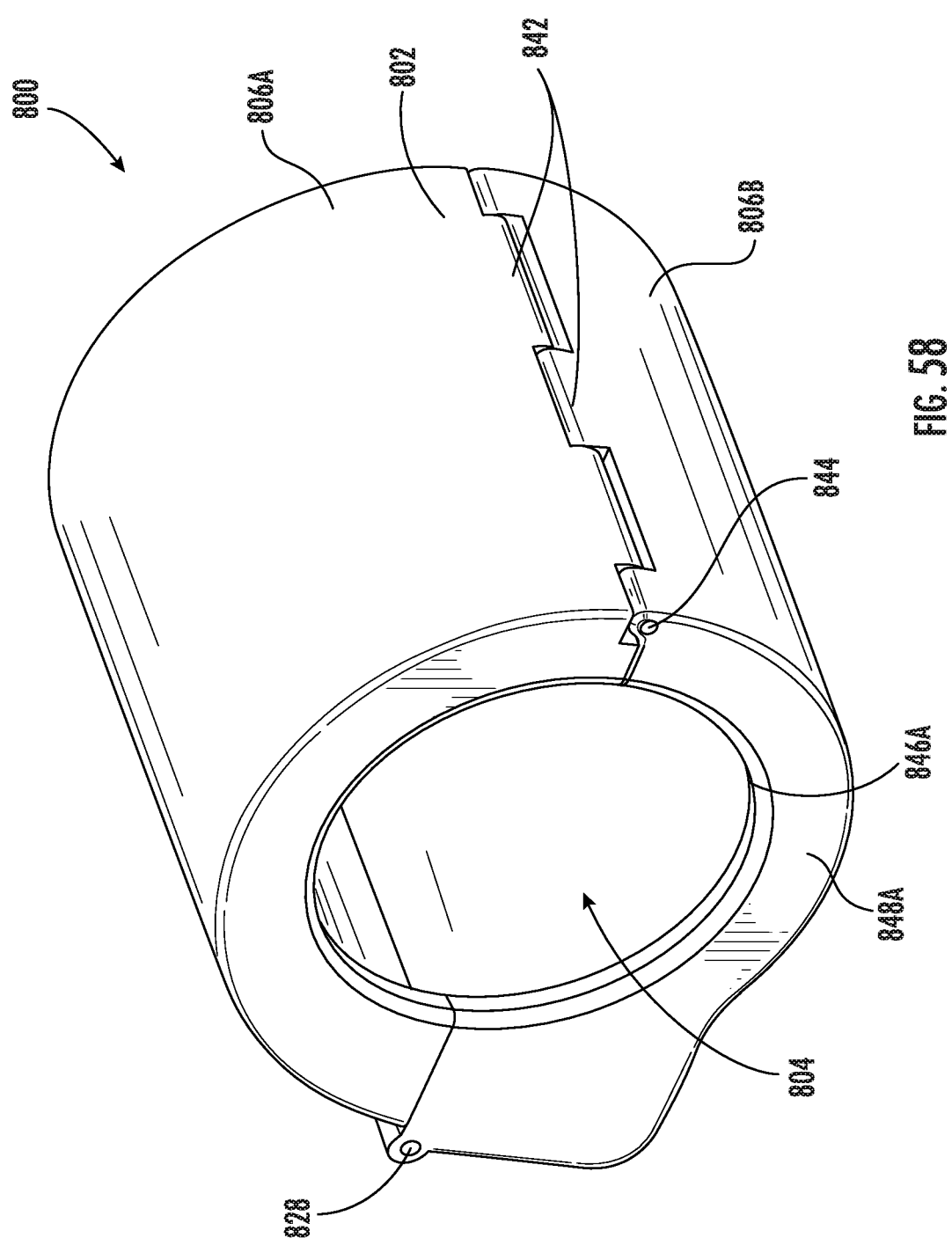
FIG. 58 shows another perspective view of the electrical connector securing apparatus from FIG. 56 and FIG. 57 showing a shell in a closed configuration.
Figure 63:
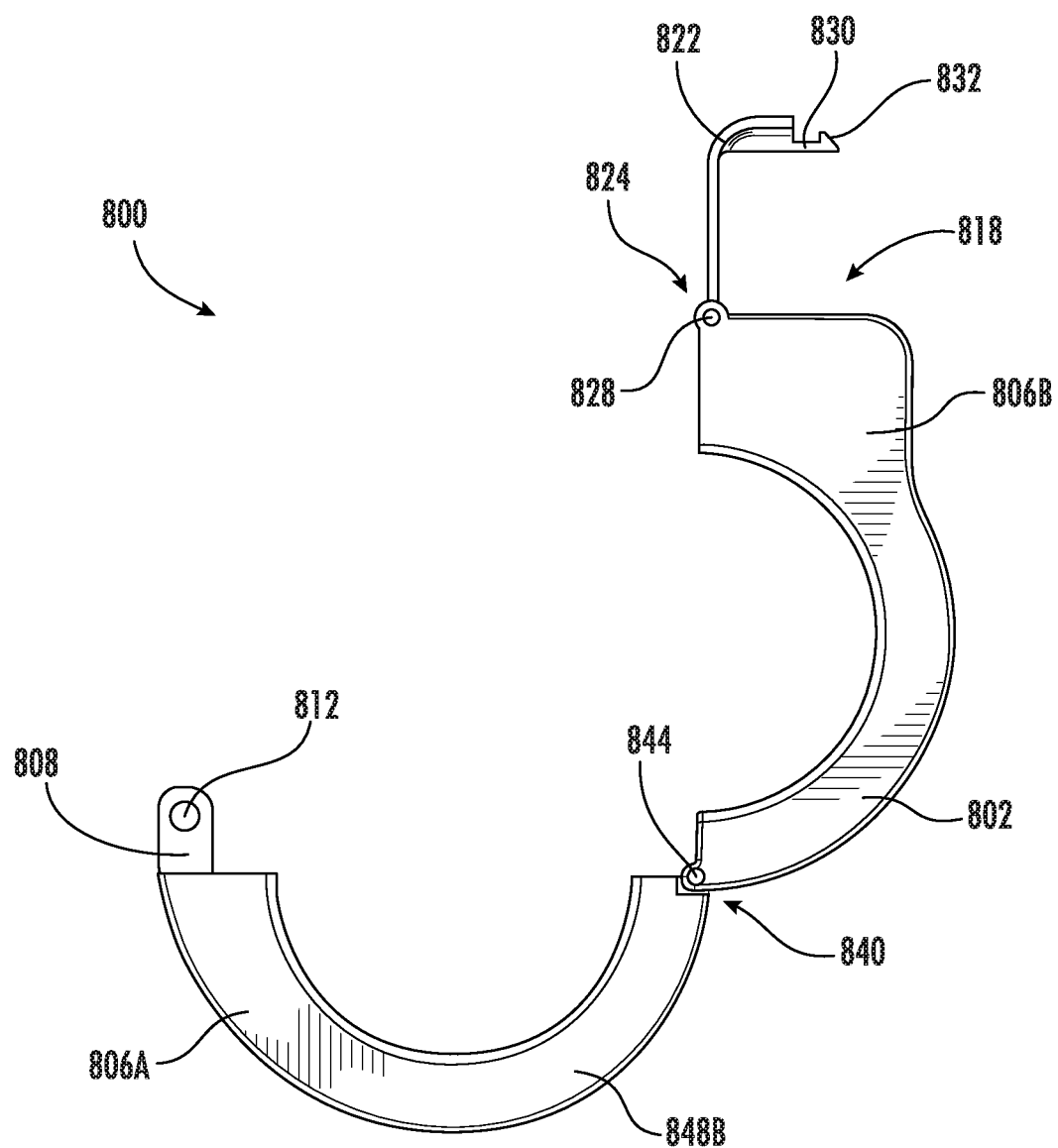
FIG. 63 shows an end view of the electrical connector securing apparatus from FIGS. 56-62 shown in an open configuration with a lid in an open position.

FIG. 57 shows a perspective view of the electrical connector securing apparatus 800 shown in the closed configuration with the lid 822 in the closed position. FIG. 56 shows a perspective view of the electrical connector securing apparatus 800 shown in the closed configuration with the lid 822 in an open position, revealing the padlock 516. FIG. 63 shows an end view of the electrical connector securing apparatus 800.

The first shell member 806A is preferably hingedly attached to the second shell member 806B via a hinge joint 840. The hinge joint 840 preferably includes interconnected tubular hinge members 842 from the first shell member 806A and the second shell member 806B connected together using a pin 844 inserted therein. The shell 802 can be rotated about the hinge joint 840 from the closed configuration to an open configuration and vice versa so that electrical connectors (836A and 836B) can be inserted into or removed from the shell 802. The electrical connector securing apparatus 800 further includes a first shell aperture 846A along a first end 848A of the electrical connector securing apparatus 800 and a second shell aperture 846B along a second end 848B of the electrical connector securing apparatus 800. The primary cavity 804 is configured for holding a first electrical connector 836A of a first electrical cable 838A and a second electrical connector 836B of a second electrical cable 838B together in a manner wherein the first electrical cable 838A extends out the first shell aperture 846A, the second electrical cable 838B extends out the second shell aperture 846B, and the first electrical cable 838A and the second electrical cable 838B remain attached to one another along the first electrical connector 836A and the second electrical connector 836B so that electricity can flow from one device to the other.

Figure 59:
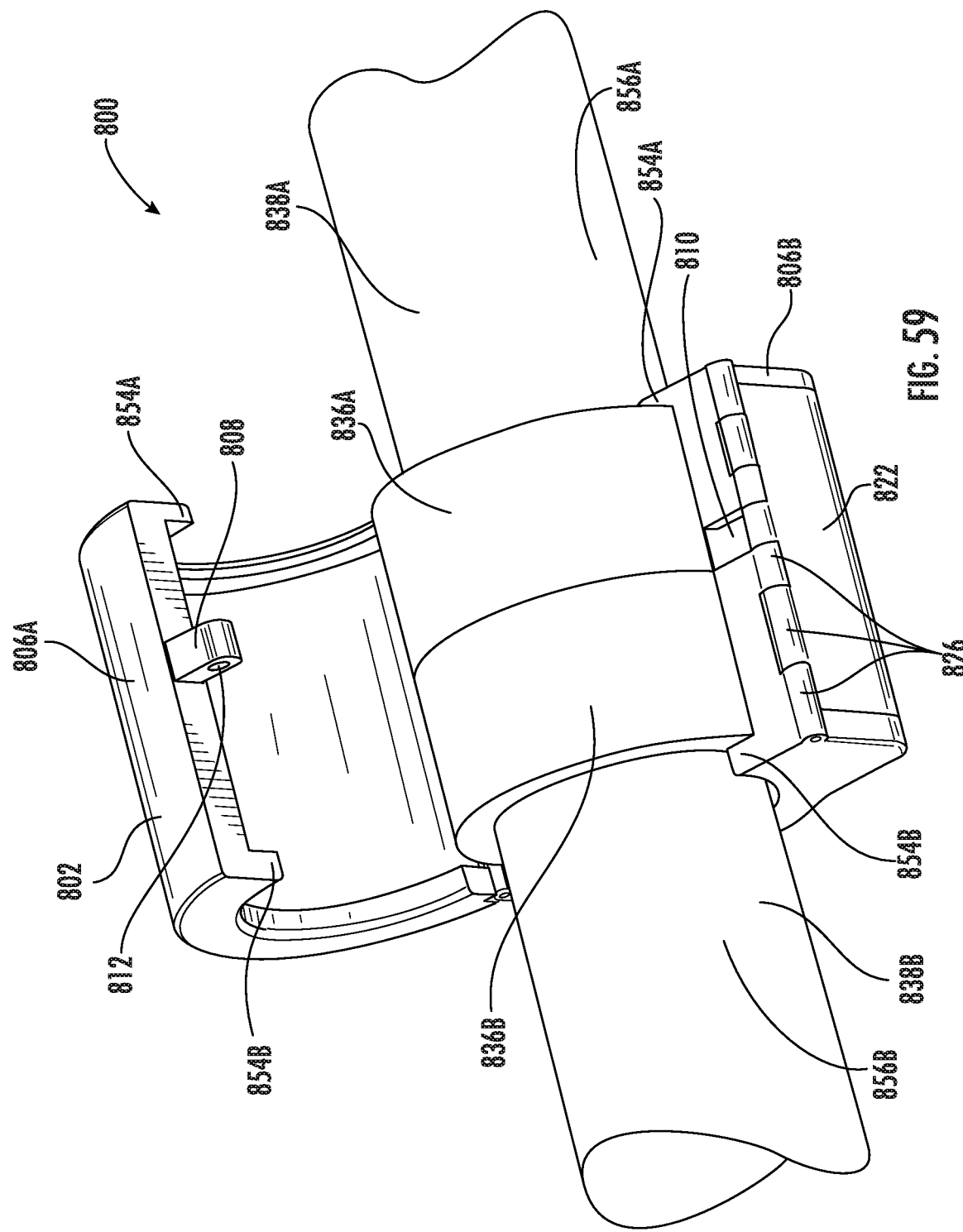
FIG. 59 shows another perspective view of the electrical connector securing apparatus from FIGS. 56-58 showing a shell in an open configuration.
Figure 60:
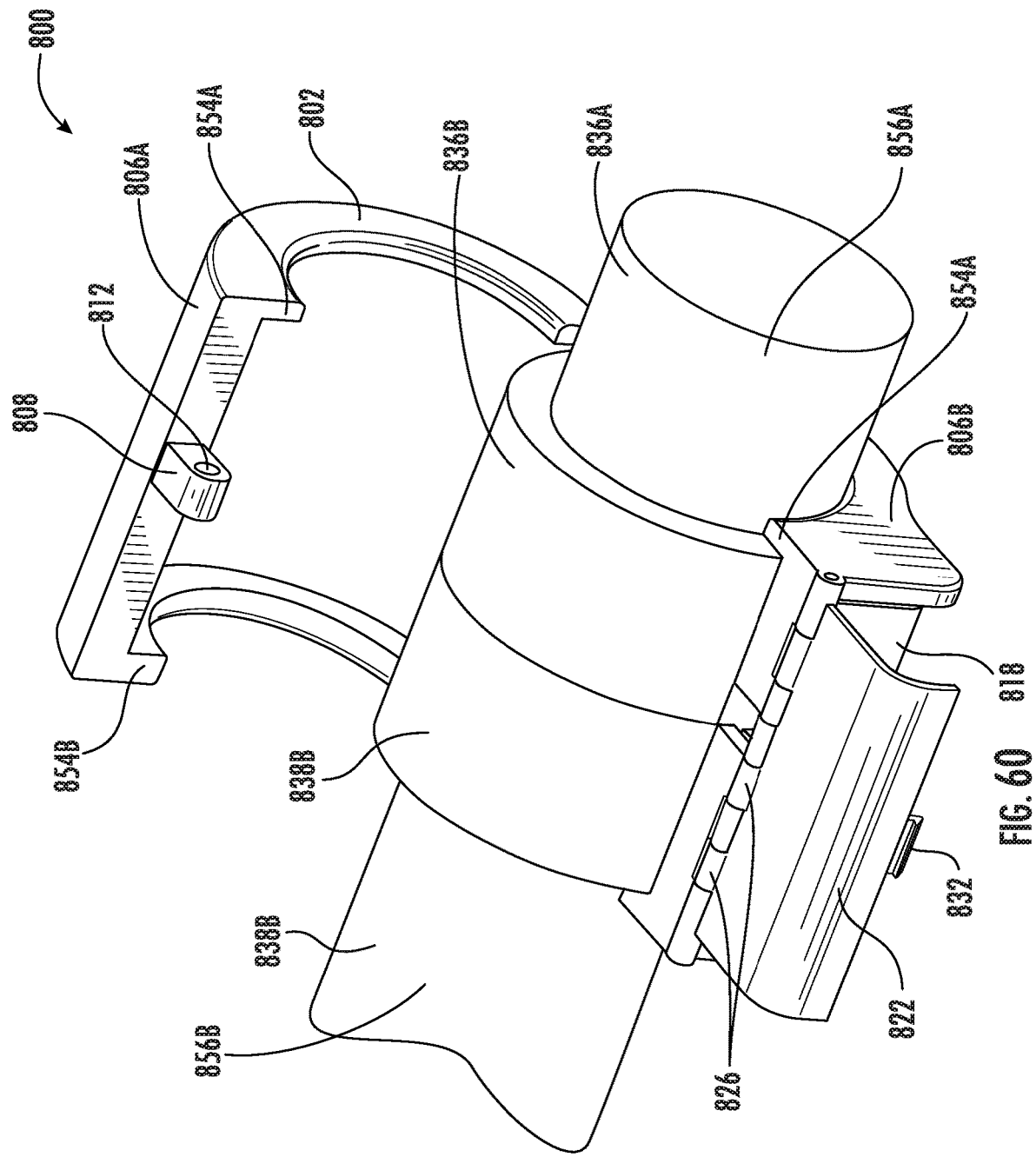
FIG. 60 shows another perspective view of the electrical connector securing apparatus from FIGS. 56-59 shown in an open configuration revealing a first 480 volt three phase power cord including a first connector and a second 480 volt three phase power cord and including a second connector.
Figure 61:
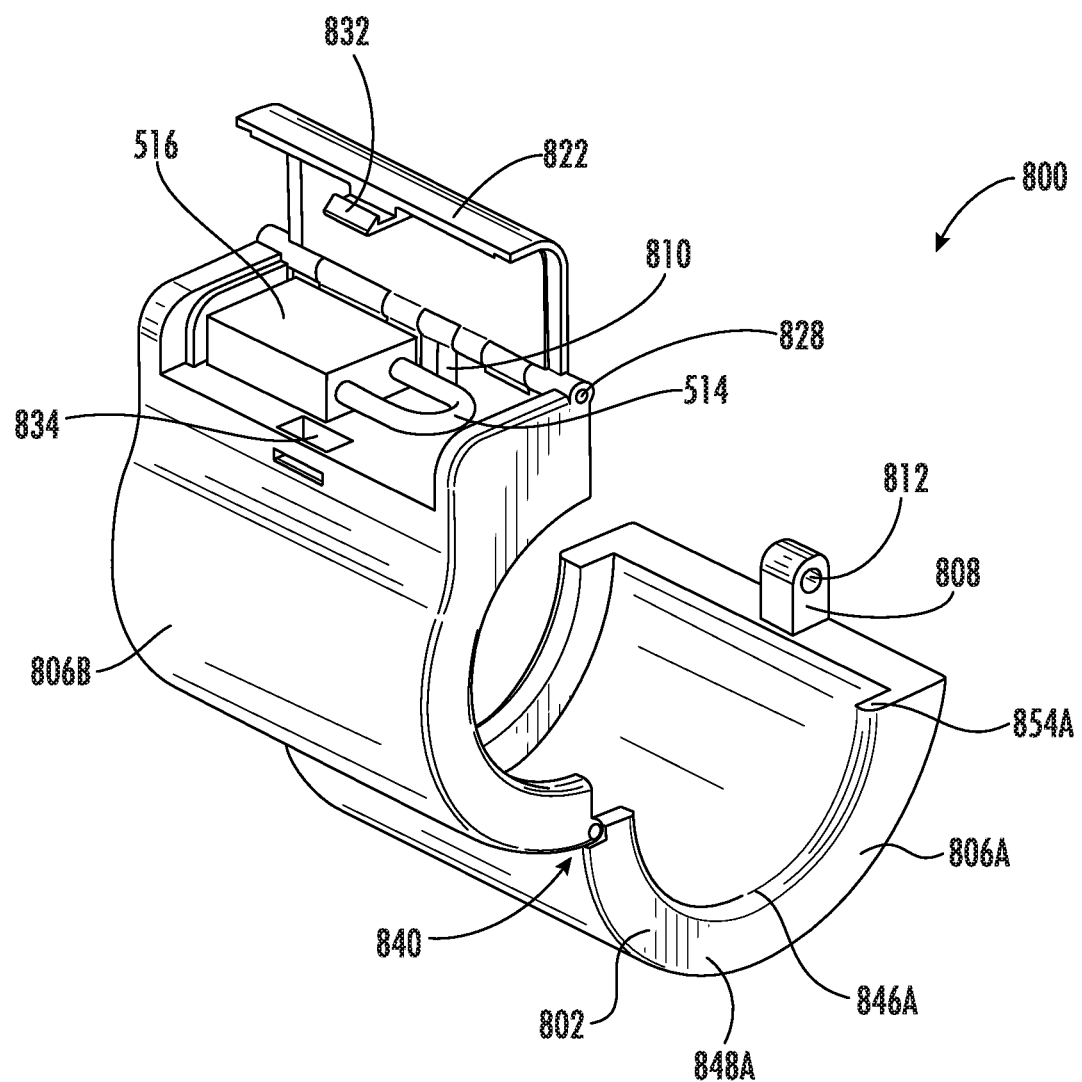
FIG. 61 shows another perspective view of the electrical connector securing apparatus from FIGS. 56-60 shown in an open configuration with a lid in an open position.
Figure 62:
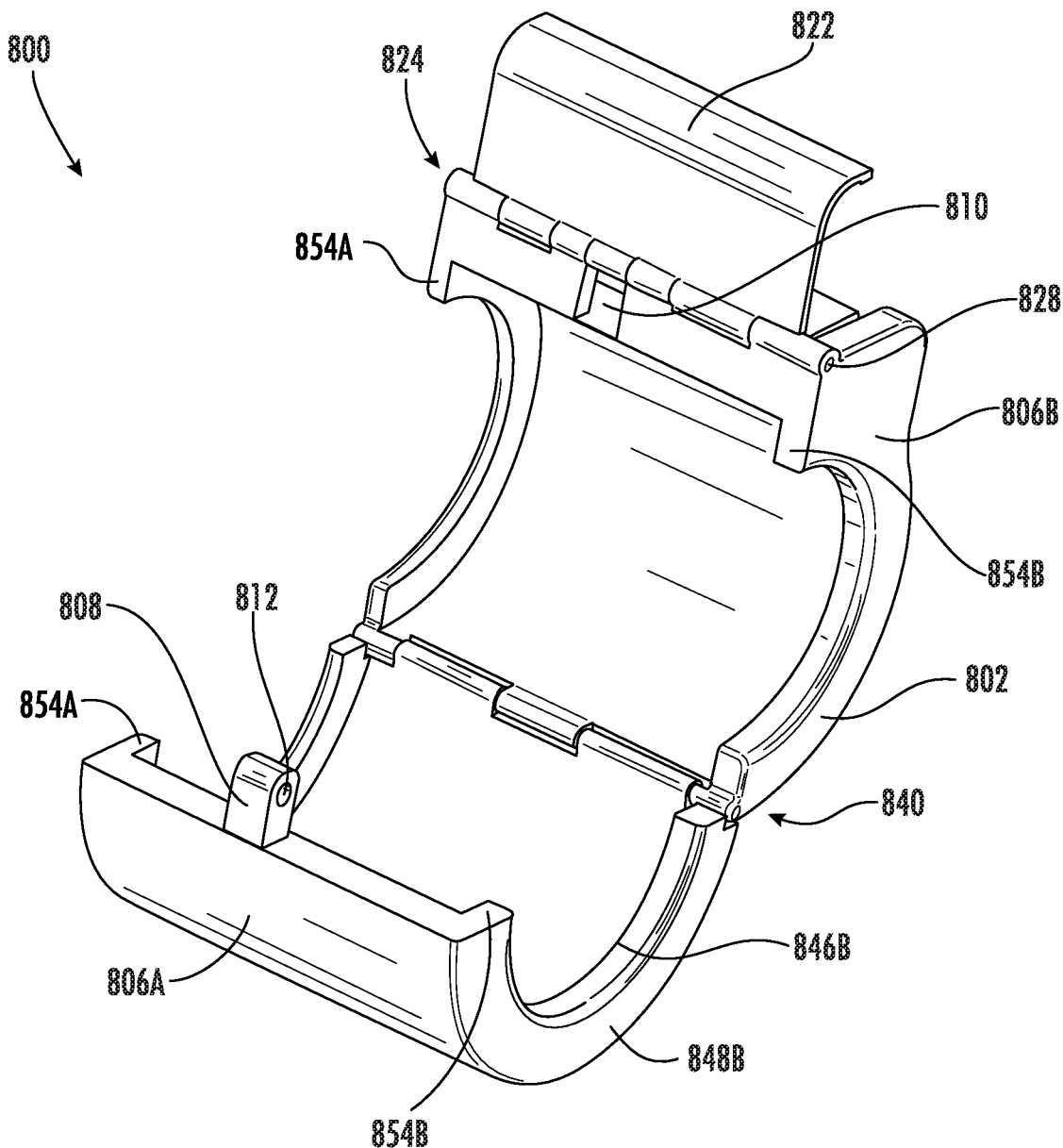
FIG. 62 shows another perspective view of the electrical connector securing apparatus from FIGS. 56-61 shown in an open configuration with a lid in an open position.

The electrical connectors 836 shown in FIG. 56 and FIGS. 59-60 include 480 volt three phase power cord connectors. The shell 802 is preferably sized and physically configured so that 480 volt three phase power cord connectors can be secured inside the shell 802. Persons having ordinary skill in the art are familiar with the size and shape of 480 volt three phase power cord connectors. In order to confine a 480 volt three phase power cord connector in the shell 802 when the shell 802 is in the closed configuration, the electrical connector securing apparatus 800 further includes a first inward facing ridge 854A defining the first shell aperture 846A and a second inward facing ridge 854B defining the second shell aperture 846B. The first inward facing ridge 854A and the second inward facing ridge 854B have a diameter smaller than the diameter of a standard 480 volt three phase power cord connector but larger than a cord portion of a 480 volt three phase power cord. Therefore, when the shell 802 is in a closed configuration, as shown in FIG. 56, the electrical connectors 836 are prevented from escaping the shell 802 and are held together so that electricity can flow from the first electrical connector 836A to the second electrical connector 836B or vice versa. However, a cord portion 856A of the first electrical cable 838A extends out the first shell aperture 846A and a cord portion 856B of the second electrical cable 838B extends out the second shell aperture 846B.

In addition to the electrical cable connector securing apparatuses described above, a method of locking two electrical cable connectors together inside an electrical connector securing apparatus is also disclosed. Such method includes a first step of attaching a first electrical connector to a second electrical connector to form combined electrical connectors. A second step includes placing the combined electrical connectors into a shell of an electrical connector securing apparatus. A third step includes closing the shell to a closed configuration wherein a primary cavity is defined inside the shell, wherein an appendage extends from the first shell member at least partially through a shell member hole in the second shell member when the shell is in the closed configuration, and wherein the appendage includes an appendage aperture. A pivoted hook of a padlock can be inserted through the appendage aperture to lock and secure the electrical connector securing apparatus in the closed configuration, thereby confining the combined electrical connectors inside the shell. Additional steps may include inserting a pivoted hook of a padlock through the appendage aperture and locking the padlock, thereby locking the combined electrical connectors inside the shell.

Various embodiments described herein can be used to secure and hold electrical connectors together including the welding lead cable connector securing apparatus 500 shown in FIGS. 33-38 and the electrical connector securing apparatus 800 shown in FIGS. 55-63. Depending on the type of electrical connector being securing, the sizing and shape of the shell can be modified appropriately with either tapered regions 550A and 550B as used with the welding lead cable connector securing apparatus 500 shown in FIGS. 33-38 or the inward facing ridges 854 as used with the electrical connector securing apparatus 800 shown in FIGS. 55-63. Some embodiments like the welding lead cable connector securing apparatus 600 shown in FIGS. 39-45 may use both a tapered region 650 and an inward facing ridge 654 to secure devices therein. The term "electrical connector" as used herein may be used to indicate, for example, a welding lead cable connector or, as another example, a 480 volt three phase power cord connector.

The previously described embodiments of the present disclosure have many advantages. Without an electrical connector holding/securing apparatus, combined electrical connectors can be easily completely or partially disengaged, prone to exposure of electrical current outside the device (electrocution risk), and easily stolen. The locking of the first shell member to the second shell member in various embodiments disclosed herein secures electrical connectors inside the shell of an electrical connector holding/securing apparatus, thereby preventing many of these drawbacks.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An electrical connector securing apparatus for securing a first 480 volt three phase power cord connector to second 480 volt three phase power cord connector and for protecting the connectors, the apparatus comprising:
   a. a shell defining a primary cavity therein, the shell further comprising a first shell member and a second shell member wherein the first shell member is hingedly attached to the second shell member and wherein the primary cavity is configured for holding a first 480 volt three phase power cord connector of a first 480 volt three phase power cord and a second 480 volt three phase power cord connector of a second 480 volt three phase power cord; and
   b. an appendage extending from the first shell member wherein at least part of the appendage extends through a shell member hole in the second shell member when the shell is in a closed configuration, and wherein the appendage includes an appendage aperture; and
   c. a secondary cavity along an outer surface of the second shell member wherein the secondary cavity is configured to house a padlock for locking and securing the connector securing apparatus in the closed configuration.

2. The electrical connector securing apparatus of claim 1 further comprising a lid hingedly attached to the second shell member, wherein the lid can be in an open position or a closed position and wherein the lid conceals the secondary cavity when the lid is in the closed position.

3. The electrical connector securing apparatus of claim 1 wherein the first shell member further comprises a substantially flat face along one side of the outer surface of the first shell member.

4. The electrical connector securing apparatus of claim 1 further comprising a first shell aperture along a first end of the electrical connector securing apparatus and a second shell aperture along a second end of the electrical connector securing apparatus and wherein, if present, (a) the first 480 volt three phase power cord would extend out the first shell aperture, (b) the second 480 volt three phase power cord would extend out the second shell aperture, and (c) electricity would be able to flow from the first 480 volt three phase power cord to the second 480 volt three phase power cord.

5. The electrical connector securing apparatus of claim 4 further comprising a first inward facing ridge defining the first shell aperture along the first end of the electrical connector securing apparatus and a second inward facing ridge defining the second shell aperture along the second end of the electrical connector securing apparatus, wherein the first inward facing ridge helps confine the first 480 volt three phase power cord connector inside the primary cavity and wherein the second inward facing ridge helps confine the second 480 volt three phase power cord connector inside the primary cavity.

6. A method of locking two electrical connectors together inside an electrical connector securing apparatus, the method comprising the steps of:
   a. attaching a first electrical connector to a second electrical connector to form combined electrical connectors;
   b. placing the combined electrical connectors into a shell of an electrical connector securing apparatus, the electrical connector securing apparatus further comprising:
      i. the shell defining a primary cavity therein, the shell further comprising a first shell member and a second shell member wherein the first shell member is hingedly attached to the second shell member;
      ii. an appendage extending from the first shell member wherein at least part of the appendage extends through a shell member hole in the second shell member when the shell is in a closed configuration, and wherein the appendage includes an appendage aperture; and
      iii. a secondary cavity along an outer surface of the second shell member wherein the secondary cavity is configured to house a padlock for locking and securing the connector securing apparatus in the closed configuration; and
   c. closing the shell to the closed configuration, wherein the appendage extends from the first shell member at least partially through the shell member hole in the second shell member when the shell is in the closed configuration.

7. The method of claim 6 further comprising the steps of d. inserting a pivoted hook of a padlock through the appendage aperture and e. locking the padlock, thereby locking the combined welding lead cable connectors inside the shell.

8. The method of claim 6 wherein the first electrical connector and the second electrical connector comprises welding lead cable connectors.

9. The method of claim 6 wherein the first electrical connector and the second electrical connector comprises 480 volt three phase power cord connectors.

* * * * *